(12) United States Patent
Sekimoto et al.

(10) Patent No.: US 7,669,959 B2

(45) Date of Patent: Mar. 2, 2010

(54) DROPLET EJECTION DEVICE

(75) Inventors: Masahiko Sekimoto, Kanagawa (JP); Koichi Saitoh, Kanagawa (JP); Hiroaki Satoh, Kanagawa (JP); Susumu Kibayashi, Kanagawa (JP); Satoshi Mohri, Kanagawa (JP); Toru Nishida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 748 days.

(21) Appl. No.: 11/503,890

(22) Filed: Aug. 14, 2006

(65) Prior Publication Data

US 2007/0171251 A1 Jul. 26, 2007

(30) Foreign Application Priority Data

Jan. 24, 2006 (JP) ............................ 2006-015381
Feb. 6, 2006 (JP) ............................ 2006-028585
Feb. 7, 2006 (JP) ............................ 2006-029475

(51) Int. Cl.
*B41J 2/165* (2006.01)
*B41J 2/17* (2006.01)
*B41J 2/01* (2006.01)
*G01D 11/00* (2006.01)

(52) U.S. Cl. .......................... 347/22; 347/95; 347/100; 347/104

(58) Field of Classification Search .................. 347/22, 347/33, 31, 95, 100, 104; 106/31.6, 31.13
See application file for complete search history.

(56) References Cited

U.S. PATENT DOCUMENTS 7,441,883 B2 * 10/2008 Makino et al. .............. 347/100

FOREIGN PATENT DOCUMENTS

| | | |
|---|---|---|
| JP | 2873879 | 7/1992 |
| JP | 10-193585 | 7/1998 |
| JP | 2002-145474 | 5/2002 |
| JP | 2003-103857 | 4/2003 |
| JP | 2004-130720 | 4/2004 |
| JP | 2004-137032 | 5/2004 |
| JP | 2004-196505 | 7/2004 |
| JP | 2005-53663 | 3/2005 |

* cited by examiner

*Primary Examiner*—Shih-wen Hsieh
(74) *Attorney, Agent, or Firm*—Fildes & Outland, P.C.

(57) ABSTRACT

A droplet ejection device includes a droplet ejection head, a conveyance member, a cleaning unit and a coating unit. The droplet ejection head ejects droplets. The conveyance member retains a recording medium and conveys the recording medium to oppose the droplet ejection head. The cleaning unit cleans the conveyance member. The coating unit applies a coating liquid, with a characteristic of repelling the liquid that is ejected from the droplet ejection head, onto the conveyance member. A surface tension $\gamma_o$ of the coating liquid, a critical surface tension $\gamma_b$ of the conveyance member, and a surface tension $\gamma_i$ of the liquid that is ejected from the droplet ejection head satisfy the following equations (1) and (2).

$$\gamma_o < \gamma_b \quad (1)$$

$$\gamma_o < \gamma_i \quad (2)$$

29 Claims, 42 Drawing Sheets

DROPLET EJECTION DEVICE

BACKGROUND

1. Technical Field

The present invention relates to a droplet ejection head which ejects droplets and to a droplet ejection device which is provided with a conveyance member, which retains a recording material and conveys the recording material to oppose the droplet ejection head, and with a cleaning unit which cleans the conveyance member.

2. Related Art

In an inkjet printer which is a droplet ejection device, when a paper jam occurs during printing, ink droplets may be ejected from an inkjet recording head (droplet ejection head) in a state in which there is no paper on a conveyance belt (conveyance member), and ink may adhere to the conveyance belt. In addition, the conveyance belt is progressively soiled by ink-misting that occurs when ink droplets are ejected from the inkjet recording head during printing. Further, ink also adheres to the conveyance belt when dummy jetting, that is, ejection of ink droplets unrelated to printing toward the conveyance belt, is carried out with a view to preventing clogging of unused nozzles. Consequently, it is necessary to provide a cleaning unit for cleaning ink that has adhered to the conveyance belt.

SUMMARY OF THE INVENTION

In consideration of the above circumstances, the present invention provides a droplet ejection device.

According to an aspect of the invention, there is provided a droplet ejection device including: a droplet ejection head that ejects droplets; a conveyance member that retains a recording medium and conveys the recording medium to oppose the droplet ejection head; a cleaning unit that cleans the conveyance member; and a coating unit that coats coating liquid, with a characteristic of repelling liquid that is ejected from the droplet ejection head, onto the conveyance member, wherein a surface tension $\gamma_o$ of the coating liquid, a critical surface tension $\gamma_b$ of the conveyance member, and a surface tension $\gamma_i$ of the liquid that is ejected from the droplet ejection head satisfy the following equations (1) and (2):

$$\gamma_o < \gamma_b \quad (1)$$

$$\gamma_o < \gamma_i \quad (2).$$

BRIEF DESCRIPTION OF THE DRAWINGS

Exemplary embodiments of the present invention will be described in detail based on the following figures, wherein.

DETAILED DESCRIPTION

Herebelow, exemplary embodiments of the present invention will be described with reference to the drawings.

Figure 1:
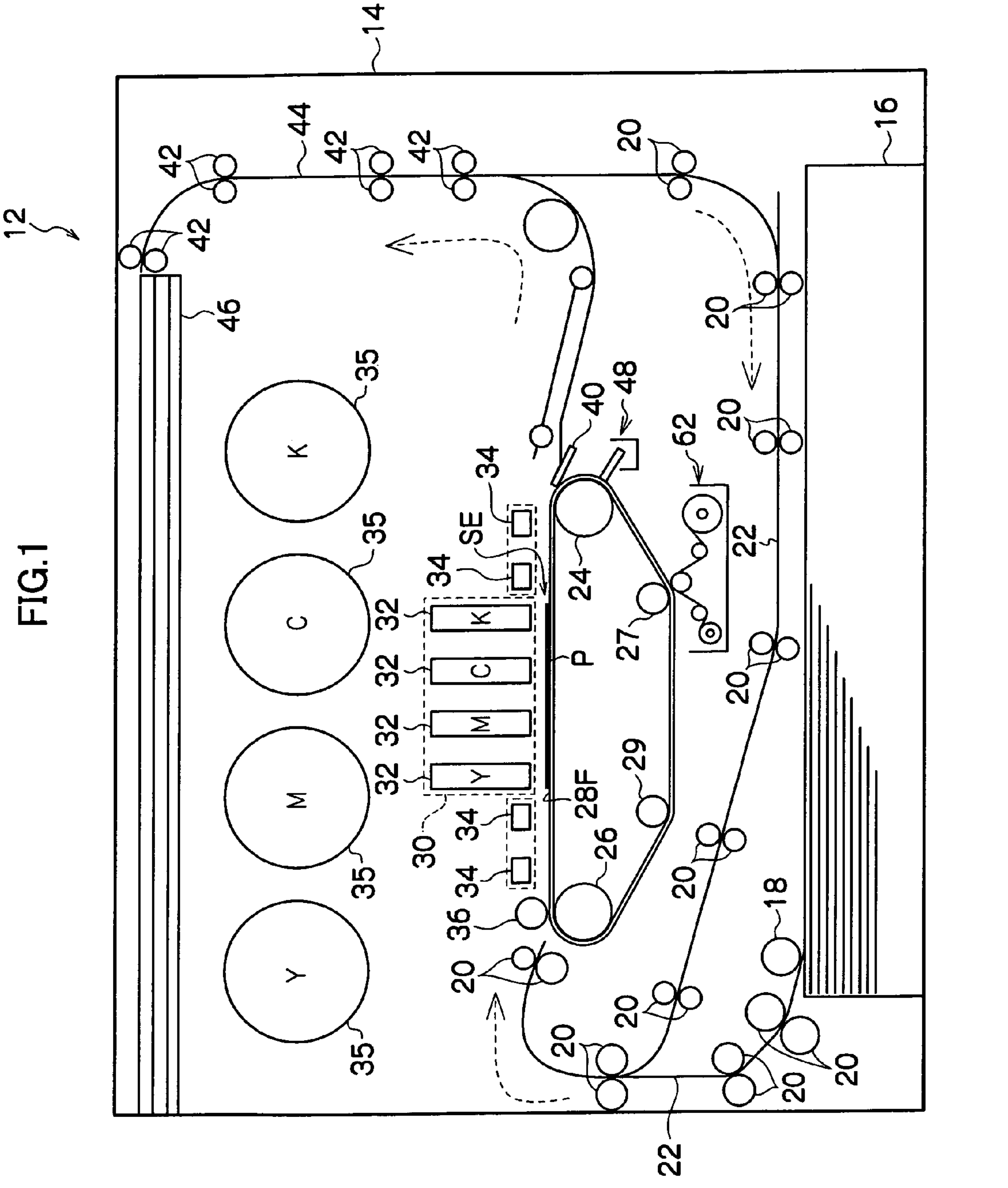
FIG. 1 is a side view showing general structure of an inkjet recording device of a first exemplary embodiment of the present invention.

FIG. 1 shows an inkjet recording device 12 of a present exemplary embodiment. A paper supply tray 16 is provided at a lower portion of the interior of a casing body 14 of the inkjet recording device 12. Paper P, which is stacked in the paper supply tray 16, can be drawn out one sheet at a time by a pickup roller 18. The paper P that is drawn out is conveyed by plural conveyance roller pairs 20, which structure a predetermined conveyance path 22.

Above the paper supply tray 16, the endless-form conveyance belt 28 spans between a driving roller 24 and driven rollers 26, 27 and 29. The driving roller 24 and the driven roller 26 are substantially horizontally arranged and, therebelow, the driven rollers 27 and 29 are substantially horizontally arranged.

A recording head array 30 is disposed above the conveyance belt 28, and opposes a flat portion 28F of the conveyance belt 28 between the driving roller 24 and the driven roller 26. This opposing region serves as an ejection region SE, to which ink drops are ejected from the recording head array 30. The paper P that is conveyed along the conveyance path 22 is retained by the conveyance belt 28 and brought to this ejection region SE, and in a state in which the paper P opposes the recording head array 30, ink droplets from the recording head array 30 are adhered to the paper P in accordance with image information.

In the present exemplary embodiment, an effective recording region of the recording head array 30 has a long form, at least as long as a width of paper P (i.e., a length in a direction intersecting a conveyance direction). Four inkjet recording heads 32 (herebelow referred to as recording heads) which correspond to the four colors yellow (Y), magenta (M), cyan (C) and black (K), respectively, are arranged along the conveyance direction. Thus, recording of full color images is possible.

The recording heads 32 are driven by a head-driving circuit (not shown). The head-driving circuit is a structure which, for example, determines injection timings of ink droplets and which of ink ejection apertures (nozzles) are to be employed in accordance with image information, and sends driving signals to the recording heads 32.

The recording head array 30 may be formed to be stationary in the direction intersecting the conveyance direction. If the recording head 32 is structured so as to move in accordance with requirements, images with higher resolutions may be recorded by image-recording using multipassing, such that faults at the recording heads 32 will not be reflected in results of recording.

Figure 2:
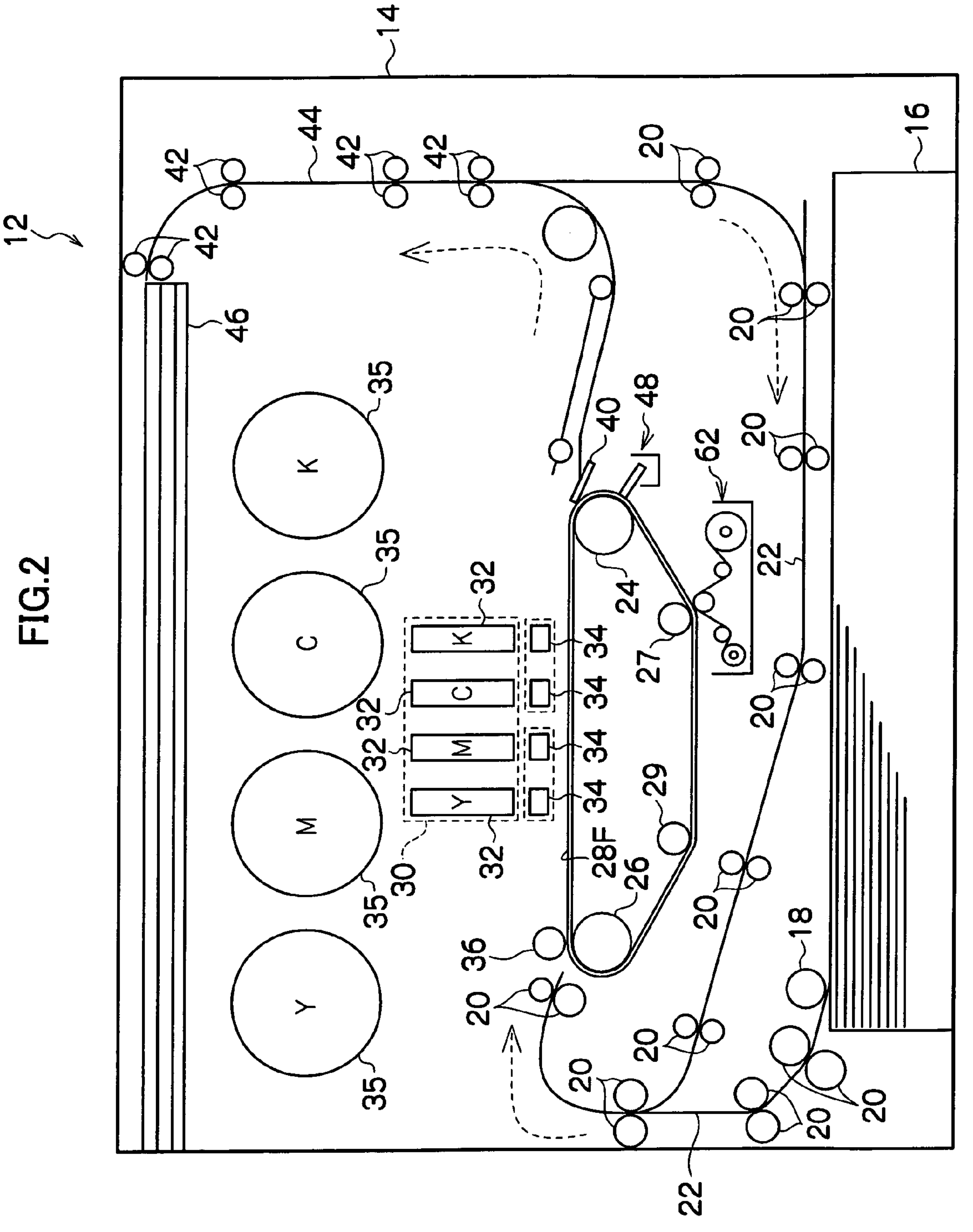
FIG. 2 is a side view showing general structure of the inkjet recording device of the first exemplary embodiment of the present invention.

Four maintenance units 34, corresponding to the respective recording heads 32, are arranged at two sides of the recording head array 30. As shown in FIG. 2, when maintenance is to be performed on the recording heads 32, the recording head array 30 is moved upward and the maintenance units 34 are moved into a gap that is formed between the recording head array 30 and the conveyance belt 28. Then, in a state in which the maintenance units 34 oppose the nozzle faces, predetermined maintenance operations (suction, wiping, capping, etc.) are carried out.

Ink tanks 35 for storing inks of the respective colors are disposed above the recording head array 30. The recording heads 32 are connected to the respective ink tanks 35.

Figure 3:
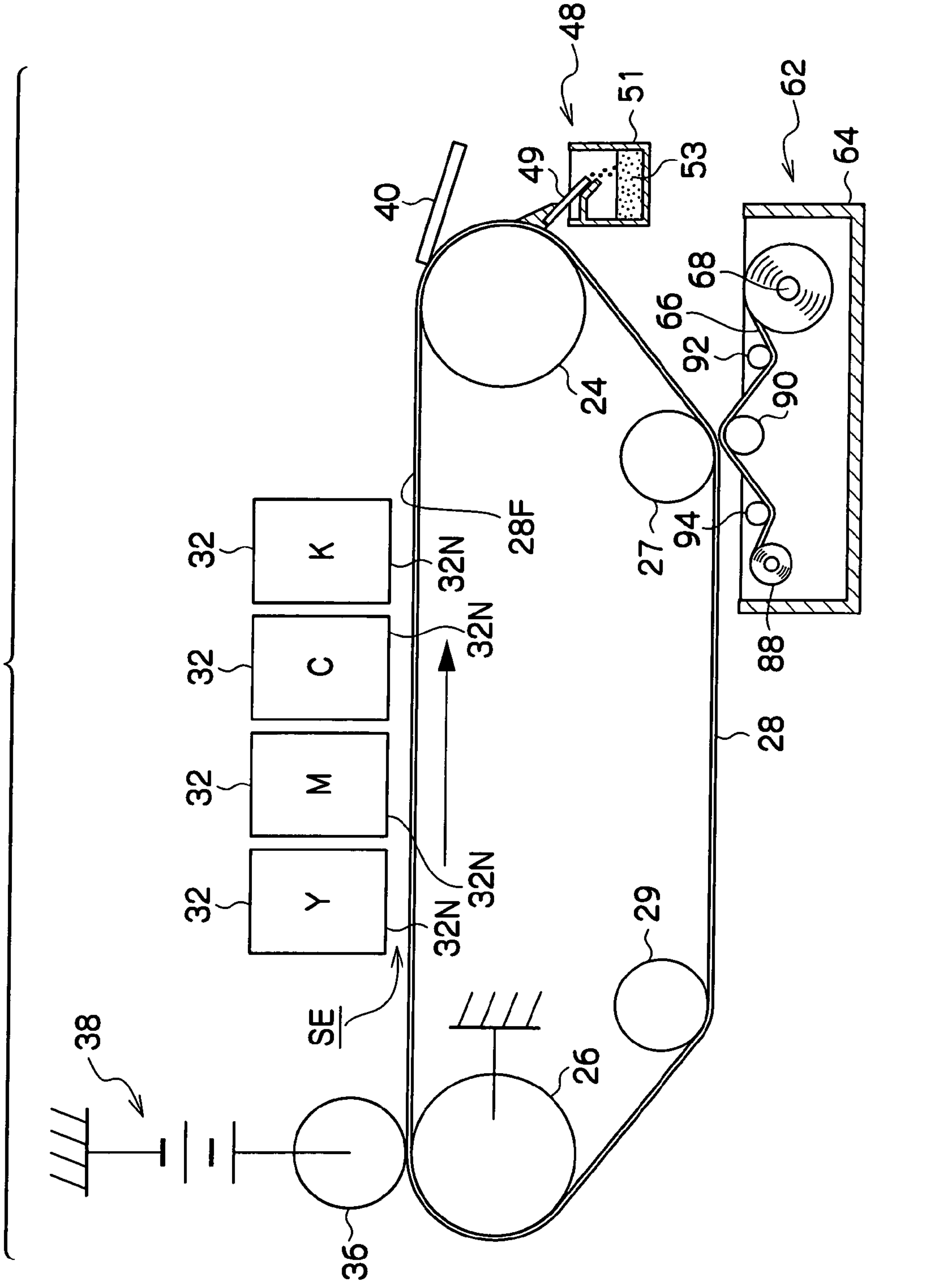
FIG. 3 is a side view showing general structure of a printing section of the inkjet recording device of the first exemplary embodiment of the present invention.

As shown in FIG. 3, the charging roller 36, to which a power supply 38 is connected, is disposed at an upstream side relative to the recording head array 30. The charging roller 36 nips and follows the conveyance belt 28 and the paper P between the charging roller 36 and the driven roller 26, and presses the paper P against the conveyance belt 28. At the same time, a predetermined potential difference is generated between the charging roller 36 and the driven roller 26, which is connected to earth. Consequently, the charging roller 36 can supply electrostatic charge to the paper P and cause the paper P to electrostatically adhere to the conveyance belt 28.

A separation plate 40 is disposed at a downstream side relative to the recording head array 30, and separates the paper P from the conveyance belt 28. The paper P that has been separated is conveyed by plural ejection roller pairs 42, which structure an ejection path 44 at a downstream side of the separation plate 40, and is ejected to an ejection tray 46, which is provided at an upper portion of the casing body 14.

A belt-cleaning unit 48 is disposed below the separation plate 40. The belt-cleaning unit 48 is provided with a blade 49 and a recovery box 51. The blade 49 abuts against a portion of the conveyance belt 28 that is wound round the driving roller 24, and scrapes off ink and the like that has adhered to the conveyance belt 28. The recovery box 51 recovers the ink and the like that has been scraped from the conveyance belt 28 by the blade 49. Herein, an absorbent body 53 is embedded at a bottom portion of the recovery box 51 and absorbs liquid that drips down from the blade 49.

An oil-coating unit 62 is disposed below the driven roller 27. This oil-coating unit 62 is provided with a case 64, a belt-form web 66, a feeding shaft 68, a winding shaft 88, a pressure roller 90, and pinch rollers 92 and 94. The feeding shaft 68 is rotatably supported at the case 64, and one length direction end of the web 66 is wound onto the feeding shaft 68. The winding shaft 88 is rotatably supported at the case 64, and the other length direction end of the web 66 is wound onto the winding shaft 88. The pressure roller 90 presses the web 66 against a portion of the conveyance belt 28 which portion is wound round the driven roller 27. The pinch rollers 92 and 94 apply tension to the web 66.

The feeding shaft 68, the pinch roller 92, the pressure roller 90, the pinch roller 94 and the winding shaft 88 are arranged in the listed order from an upstream side to a downstream side in the direction of turning of the conveyance belt 28, and the web 66 spans therebetween. The web 66 is impregnated with silicone oil.

The winding shaft 88 is driven by a motor (not shown). When the winding shaft 88 is rotated by driving of the motor, the web 66 is fed out from the feeding shaft 68, and conveyed toward the winding shaft 88 a tiny bit at a time. As a result, at a portion of nipping between the pressure roller 90 and the driven roller 27, the silicone oil is applied to the conveyance belt 28 and a film of silicone oil is formed on the conveyance belt 28. In contrast, the inks being ejected from the recording heads 32 are aqueous inks. Therefore, when ink is adhered to the conveyance belt 28 by ink-misting, unnecessary ink ejection during paper jams, dummy jets which are ejected onto the conveyance belt 28, and so forth, the ink agglomerates because of water-repellence of the silicone oil film on the conveyance belt 28. Therefore, forces adhering the ink to the conveyance belt 28 are weak and, when the conveyance belt 28 is cleaned by the blade 49, the ink is separated from the conveyance belt 28 with ease. The dummy-jetting here is performed at short intervals, such as once every few tens of seconds or the like, in order to prevent an increase in viscosity of the inks in the recording heads 32. Thus, forming the film of silicone oil on the conveyance belt 28 continuously as in the present exemplary embodiment is effective.

The conveyance of the web 66 may be performed continuously in tiny amounts, or may be performed intermittently, at intervals of a predetermined number of sheets.

For the conveyance belt 28, a belt, which is formed of a resin such as polyethylene terephthalate (PET), polyimide (PI), polyamide (PA), polycarbonate (PC) or the like or a rubber material such as chloroprene rubber (CR), acrylonitrile butadiene rubber (NBR), hydrogenated acrylonitrile butadiene rubber (HNBR), urethane rubber or the like and whose front face is subjected to coating, or the like can be employed. For the blade 49, a blade formed of a rubber material such as fluoride rubber, NBR, HNBR or the like, a thin plate of a metal such as STAINLESS STEEL (SUS) or the like, a film formed of a resin such as polyurethane, PET or the like, or the like is employed. For the web 66, a non-woven fabric formed of polyester, polyamide or the like is suitable, but may be substituted with another member, provided that member may be wound up and may be impregnated with a predetermined amount of ink.

As mentioned earlier, silicone oil is employed as the liquid that is coated onto the conveyance belt 28 by the web 66 (below referred to as a coating liquid), and aqueous inks are employed for the inks. Herein, a liquid which repels the inks is suitable for the coating liquid. With aqueous inks, beside silicone oil, the following may be employed: higher fatty acids such as oleic acid, linoleic acid and the like; plasticizers such as dibutyl phthalate, dienedecyl phthalate, dibutyl maleate and the like; non-aqueous alcohols such as n-decanol, dimethyl butanol and the like; and liquids that feature water-repellence such as fluorine oils, mineral oils, plant oils and the like. With oil-based inks, a liquid with high oil-repellence, such as water or the like, could be employed.

For the coating of the coating liquid onto the conveyance belt 28 to be stabilized, a dynamic viscosity of the coating liquid is preferably in the range 10 to $10^4$ mm$^2$/s, and more preferably in the range 50 to $10^2$ mm$^2$/s.

Further, if a coating thickness of the coating liquid is too thick, adverse effects will be exerted on image quality, by oil soaking into the paper P and the paper P repelling ink or the like. On the other hand, if the coating thickness of the coating liquid is too thin, cleaning of ink by the blade 49 will not be excellently performed. Therefore, it is desirable to set a coating thickness of the coating liquid to a suitable range. A suitable range of coating thickness of the coating liquid is 1 nm to 20 μm.

It is also desirable that the coating liquid is non-volatile at ordinary temperatures. Specifically, a vapor pressure at 25° C. is not more than 13.33 Pa. It is further desirable that the coating liquid has the characteristic of not being soluble with the inks. Specifically, a solubility with respect to the inks at an ordinary temperature (25° C.) is not more than 0.1% by weight.

Figure 4:
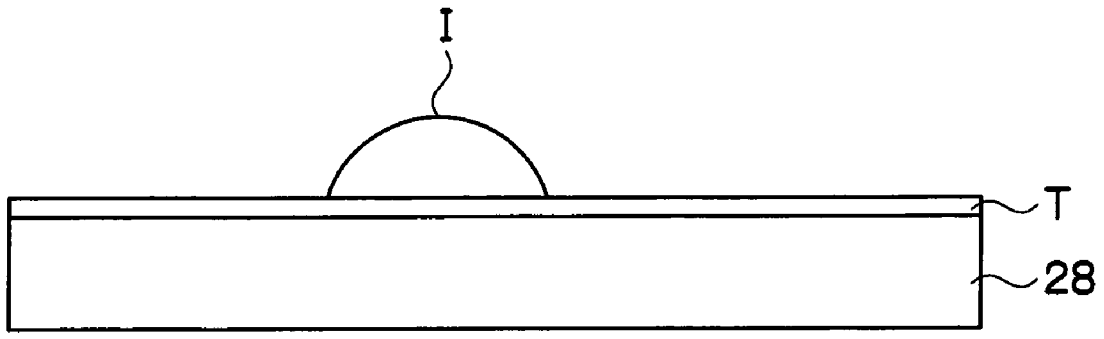
FIG. 4 is a sectional view enlargedly showing a conveyance belt which is provided in the inkjet recording device of the first exemplary embodiment of the present invention.

It is also desirable that the coating liquid spreads over the conveyance belt 28. Therefore, the relationship of the following equation (1) is desirable. As shown in FIG. 4, a surface tension of the coating liquid T is $\gamma_o$ and a critical surface tension of the conveyance belt 28 is $\gamma_b$. Here, critical surface tension refers to a surface tension at which, in a relationship between surface tensions of various liquids and contact angles θ with a solid surface, cos θ is corrected to 1 (that is, when the contact angle of a liquid with respect to the solid surface reaches 0°). In general, a solid surface will be thoroughly wetted by a liquid with a surface tension smaller than the critical surface tension of the surface.

$$\gamma_o<\gamma_b \quad (1)$$

For the coating liquid to be provided with water-repellence, the relationship of the following equation (2) is desirable. Here, a surface tension of ink I is $\gamma_i$.

$$\gamma_o<\gamma_i \quad (2)$$

Consequently, ink I agglomerates rather than spreading over the film of the coating liquid. Results of performing an experiment for evaluating cleaning characteristics with the conveyance belt 28 being a belt of PET with a critical surface tension $\gamma_b$ of around 43 mN/m, the coating liquid being silicone oil with a surface tension $\gamma_o$ of around 20 mN/m, and an ink being a water-repellent ink with a surface tension $\gamma_i$ of around 30 mN/m, are that no residue of ink is left on the conveyance belt 28 and cleaning capabilities are excellent.

Next, a second exemplary embodiment of the present invention will be described. Note that structures that are the same as in the first exemplary embodiment are assigned the same reference numerals, and descriptions thereof are not given.

Figure 5:
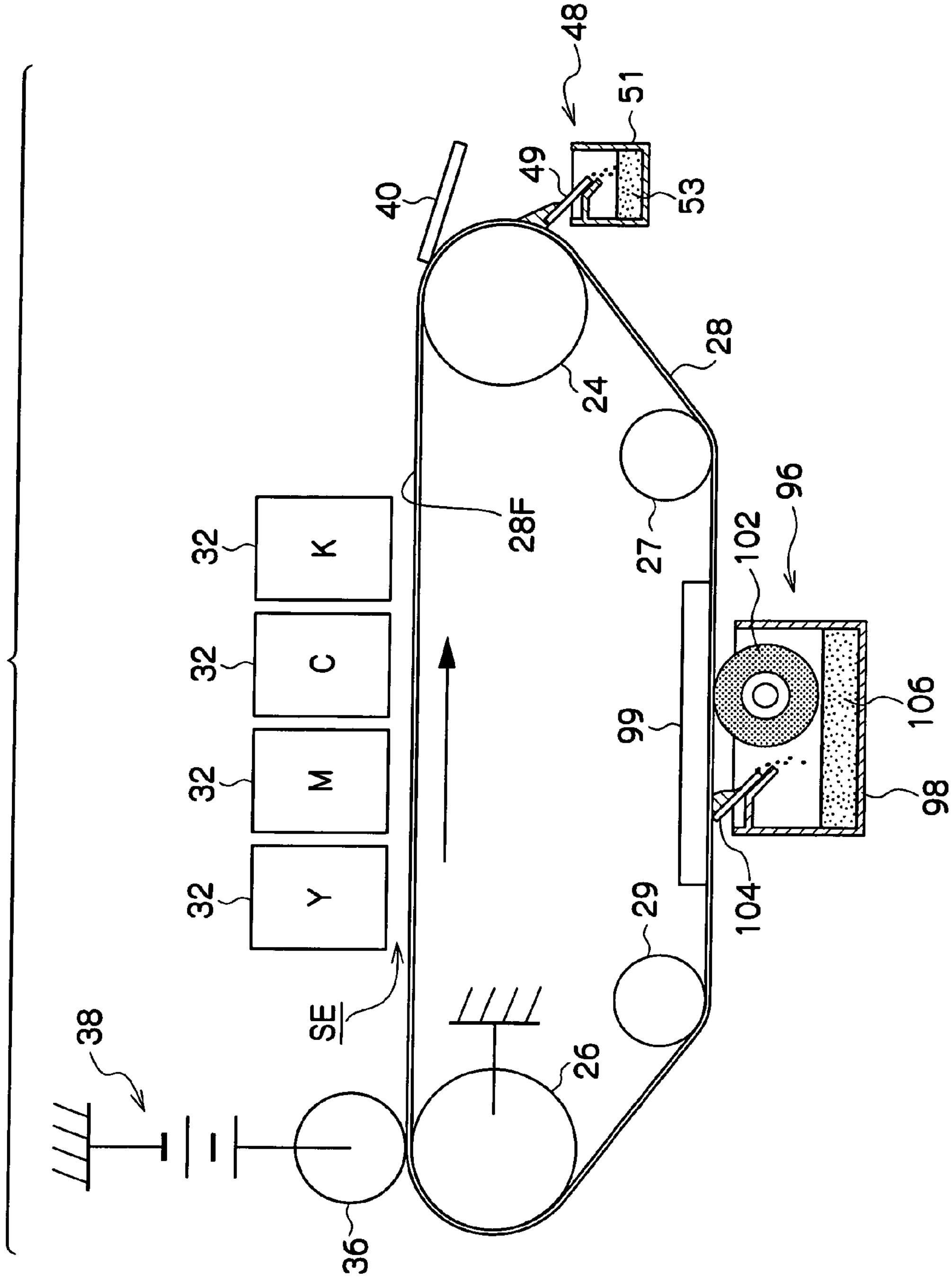
FIG. 5 is a side view showing general structure of a printing section of an inkjet recording device of a second exemplary embodiment of the present invention.

As shown in FIG. 5, in the present exemplary embodiment, an oil-coating unit 96 and a backup plate 99 are opposingly disposed with the conveyance belt 28 therebetween, between the driven roller 26 and the driven roller 27. The oil-coating unit 96 opposes an outer periphery face of the conveyance belt 28, and the backup plate 99 abuts against an inner periphery face of the conveyance belt 28.

The oil-coating unit 96 is equipped with a case 98, an oil-coating roller 102, which is rotatably supported at the case 98, and an oil blade 104, which is supported at the case 98. The oil-coating roller 102 presses against the backup plate 99 with the conveyance belt 28 disposed therebetween, and rotates to follow the conveyance belt 28. The oil-coating roller 102 is formed with a porous material such as polyethylene, urethane or the like, is impregnated with silicone oil, and applies the silicone oil to the conveyance belt 28.

The oil-coating roller 102 may be a driving roller. In such a case, the oil-coating roller 102 may avoid slipping with respect to the conveyance belt 28.

The oil blade 104 abuts against the conveyance belt 28 at a downstream side relative to the oil-coating roller 102 in the direction of turning of the conveyance belt 28. The oil blade 104 scrapes off an excess portion of the silicone oil that has been coated onto the conveyance belt 28, and sets a film thickness of the silicone oil to a predetermined thickness. Here, the oil blade 104 employs a rubber such as a fluoride rubber, NBR or the like, a thin plate of a metal such as SUS or the like, a resin film of polyurethane, PET or the like, or the like.

An absorbent member 106, such as a sponge or the like, is embedded at a bottom portion of the case 98. The absorbent member 106 absorbs the silicone oil that has been scraped from the conveyance belt 28 by the oil blade 104.

Next, a third exemplary embodiment of the present invention will be described. Note that structures that are the same as in the first and second exemplary embodiments are assigned the same reference numerals, and descriptions thereof are not given.

Figure 6:
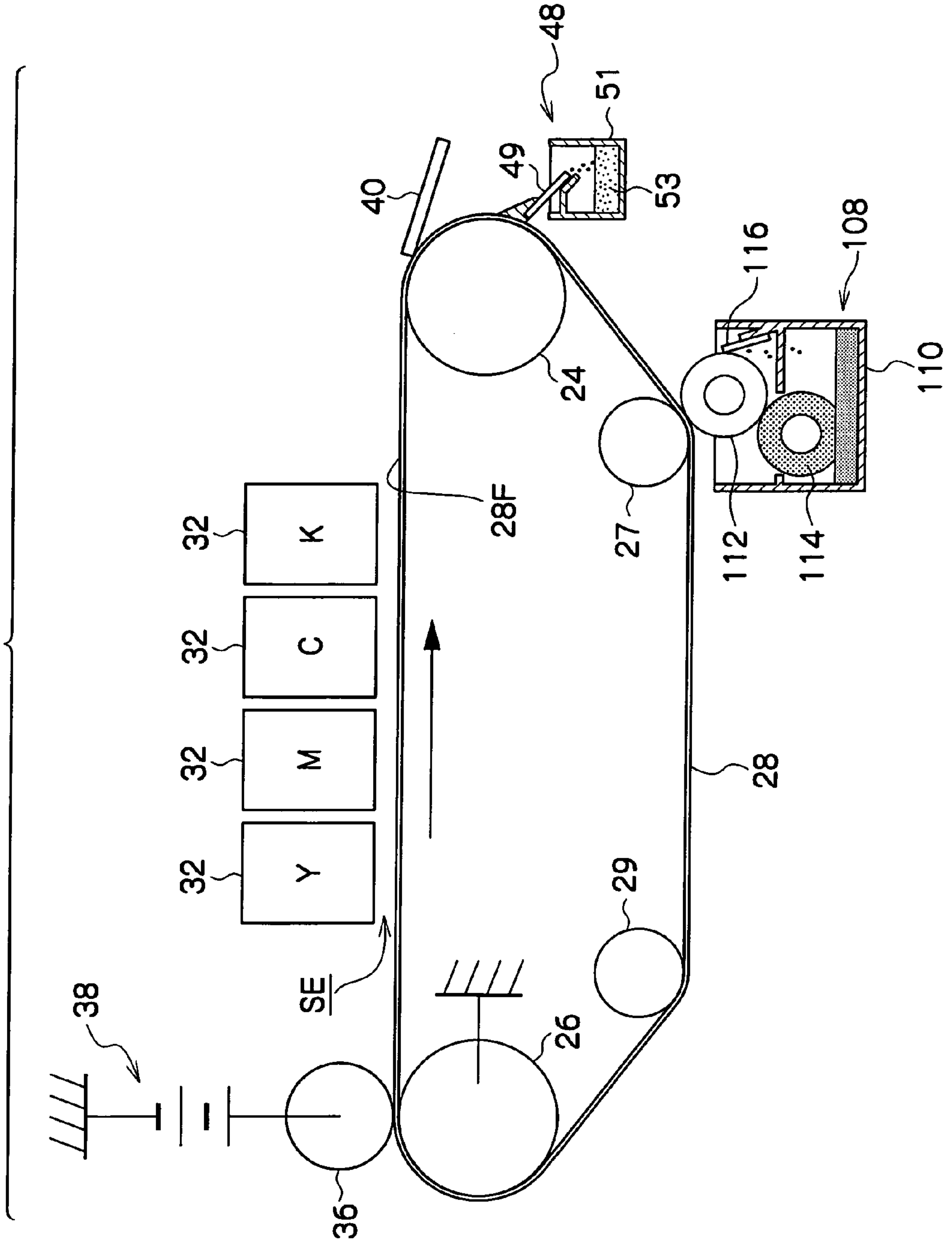
FIG. 6 is a side view showing general structure of a printing section of an inkjet recording device of a third exemplary embodiment of the present invention.

As shown in FIG. 6, in the present exemplary embodiment, an oil-coating unit 108 is disposed below the driven roller 27. This oil-coating unit 108 is provided with a case 110, which accommodates the silicone oil, an oil-coating roller 112, which is rotatably supported at the case 110, an oil supply roller 114, and an oil blade 116, which is supported at the case 110.

The oil-coating roller 112 abuts against the portion of the conveyance belt 28 that is wound round the driven roller 27, and the oil supply roller 114 abuts against the oil-coating roller 112. The oil-coating roller 112 and the oil supply roller 114 are linked to a common driving source (not shown) by a gear set (not shown), and are driven by the common driving source. A lower portion of the oil supply roller 114 is immersed in the silicone oil in the case 110. The oil supply roller 114 is formed with a porous material such as polyethylene, urethane or the like. The oil supply roller 114 absorbs the silicone oil in the case 110 and supplies the silicone oil to the oil-coating roller 112.

The oil blade 116 abuts against the oil-coating roller 112 at a downstream side in a rotation direction of the oil-coating roller 112 from the oil supply roller 114, and at an upstream side in the rotation direction of the oil-coating roller 112 from the driven roller 27. The oil blade 116 scrapes off an excess portion of silicone oil on the oil-coating roller 112, and sets a film thickness of the silicone oil on the oil-coating roller 112 to a predetermined thickness. Hence, the silicone oil with the predetermined film thickness is transferred from the oil-coating roller 112 to the conveyance belt 28.

For the oil-coating roller 112, a roller of silicone rubber, a metal roller whose surface has been subjected to coating with TEFLON (registered trademark), or the like is employed. The oil blade 116 employs a rubber such as a fluoride rubber, NBR or the like, a thin plate of a metal such as SUS or the like, a resin film of polyurethane, PET or the like, or the like.

Next, a fourth exemplary embodiment of the present invention will be described. Note that structures that are the same as in the first to third exemplary embodiments are assigned the same reference numerals, and descriptions thereof are not given.

Figure 7:
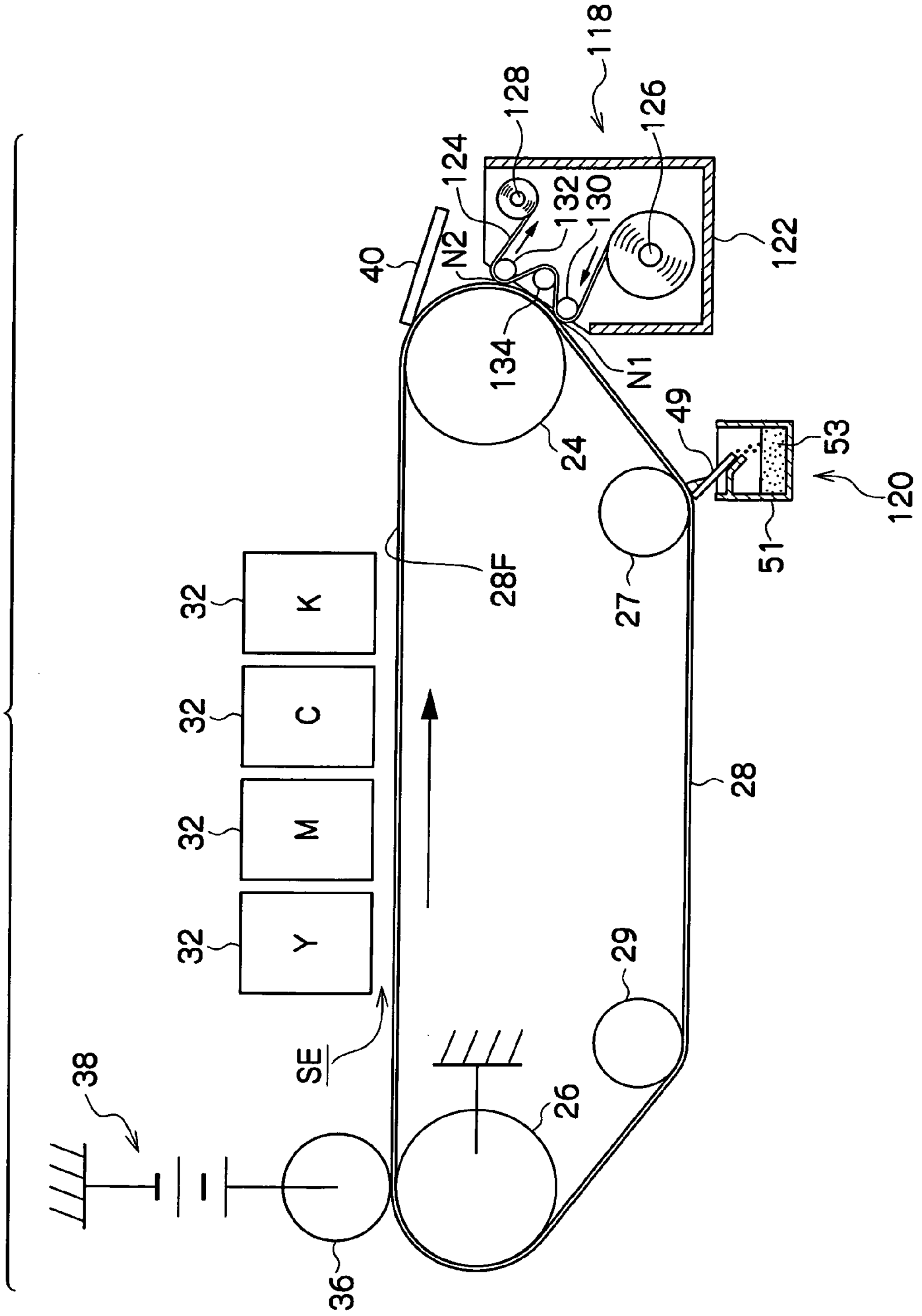
FIG. 7 is a side view showing general structure of a printing section of an inkjet recording device of a fourth exemplary embodiment of the present invention.

As shown in FIG. 7, in the present exemplary embodiment, a combined belt-cleaning and oil-coating unit 118 is disposed below the separation plate 40, and a belt-cleaning unit 120 is disposed below the driven roller 27.

The combined belt-cleaning and oil-coating unit 118 is provided with a case 122, a belt-form web 124, a feeding shaft 126, a winding shaft 128, pressure rollers 130 and 132, and a pinch roller 134. The feeding shaft 126 is rotatably supported at the case 122 and one length direction end of the web 124 is wound onto the feeding shaft 126. The winding shaft 128 is rotatably supported at the case 122 and the other length direction end of the web 124 is wound onto the winding shaft 128. The pressure rollers 130 and 132 are rotatably supported at the case 122, and press the web 124 against a portion of the conveyance belt 28 that is wound round the driving roller 24. The pinch roller 134 is rotatably supported at the case 122, and applies tension to the web 124.

The feeding shaft 126, the pressure roller 130, the pinch roller 134, the pressure roller 132 and the winding shaft 128 are arranged in the listed order from a downstream side to an upstream side in the direction of turning of the conveyance belt 28, and the web 124 spans therebetween. The web 124 is impregnated with silicone oil.

The winding shaft 128 is driven by a motor (not shown). When the winding shaft 128 is rotated by driving of the motor, the web 124 is fed out from the feeding shaft 126, and conveyed toward the winding shaft 128 a tiny bit at a time. As a result, at a portion N1 of nipping between the pressure roller 130 and the driving roller 24, the silicone oil is applied to the conveyance belt 28 and a film of silicone oil is formed on the conveyance belt 28.

At a portion N2 of nipping between the pressure roller 132 and the driving roller 24, because a smaller amount of the silicone oil is impregnated in the web 124, water absorbency of the web 124 is higher, and ink that has adhered to the conveyance belt 28 is absorbed by the web 124. As a result, soiling of the web 124 at the portion N1 of nipping between the driving roller 24 and the pressure roller 130 may be suppressed.

The belt-cleaning unit 120 is equipped with the blade 49, the recovery box 51 and the absorbent body 53. The blade 49 abuts against the portion of the conveyance belt 28 that is wound round the driven roller 27, and scrapes off ink and the like that has adhered to the conveyance belt 28. The recovery box 51 recovers the ink and the like that has been scraped from the conveyance belt 28 by the blade 49. The absorbent body 53 absorbs liquid in the recovery box 51. Thus, ink that has not been cleaned from the conveyance belt 28 by the combined belt-cleaning and oil-coating unit 118 is cleaned off.

Next, a fifth exemplary embodiment of the present invention will be described. Note that structures that are the same as in the first to fourth exemplary embodiments are assigned the same reference numerals, and descriptions thereof are not given.

Figure 8:
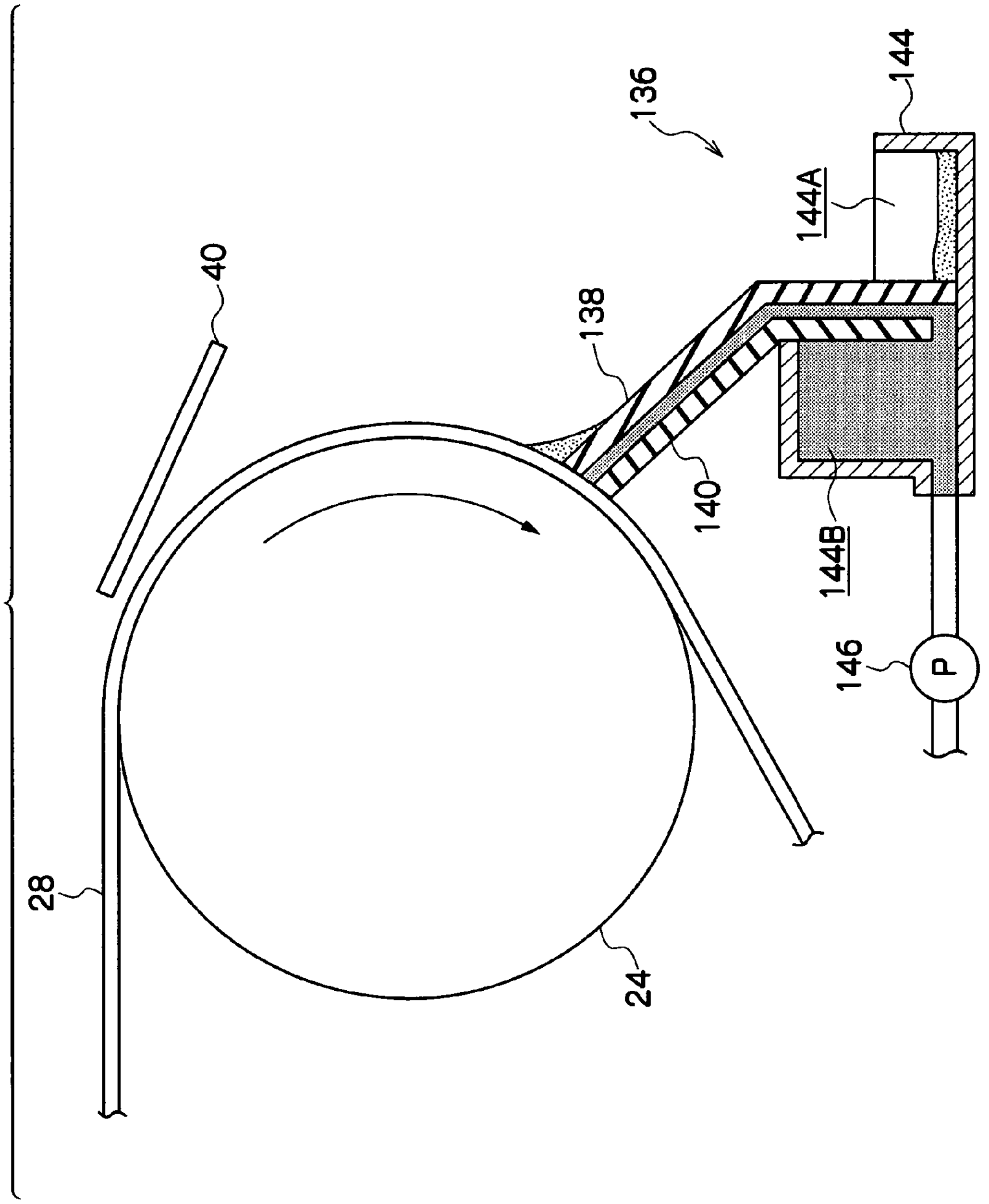
FIG. 8 is a side sectional view showing a combined belt-cleaning and oil-coating unit which is provided in an inkjet recording device of a fifth exemplary embodiment of the present invention.

As shown in FIG. 8, in the present exemplary embodiment, a combined belt-cleaning and oil-coating unit 136 is disposed below the separation plate 40. The combined belt-cleaning and oil-coating unit 136 is provided with a first blade 138 and a second blade 140, which abut against the portion of the conveyance belt 28 that is wound round the driving roller 24, and a case 144, which supports base ends of the first blade 138 and the second blade 140.

The case 144 is partitioned into two chambers, a waste ink retention chamber 144A and an oil retention chamber 144B, by the base end side of the first blade 138. The waste ink retention chamber 144A retains ink and the like that has been scraped from the conveyance belt 28 by the first blade 138 and has descended along the first blade 138. The oil retention chamber 144B is connected with a tank which stores silicone oil (not shown), and stores silicone oil which has been supplied from the tank. The first blade 138 is arranged in parallel with the second blade 140 at the conveyance belt 28 turning direction upstream side thereof.

Figure 9B:
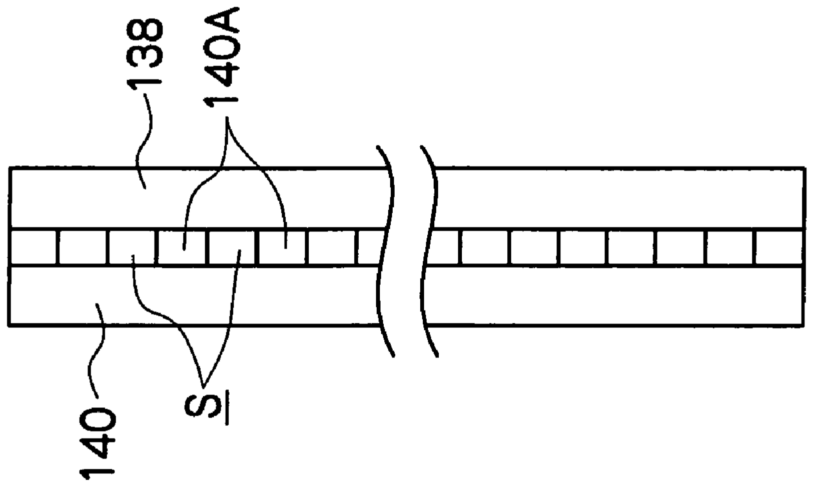
FIG. 9B is a plan view of the first blade and second blade.
Figure 9A:
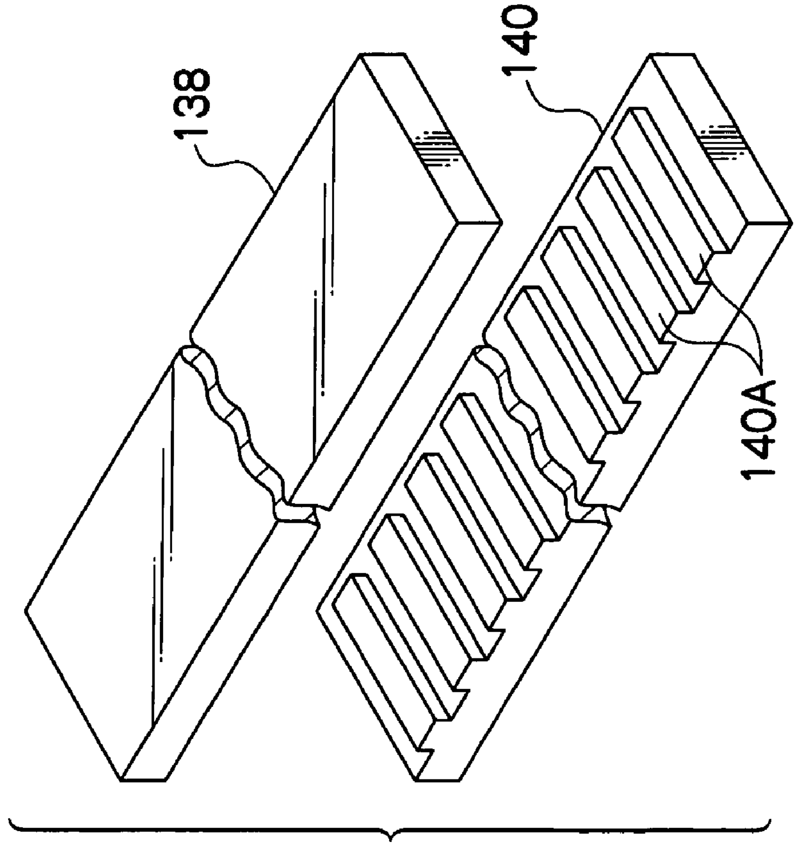
FIG. 9A is an exploded perspective view showing a first blade and a second blade which are provided at the combined belt-cleaning and oil-coating unit of FIG. 8.

As shown in FIGS. 9A and 9B, plural ribs 140A, which extend away from the base end toward a distal end of the second blade 140, are formed at a face of the first blade 138 side of the second blade 140. Slits S are formed between the first blade 138 and the second blade 140 by the ribs 140A. These slits S open into the oil retention chamber 144B. Thus, the silicone oil in the oil retention chamber 144B may pass along the slits S and be supplied to the conveyance belt 28.

The ribs 140A stop partway to the distal end side of the second blade 140, such that the silicone oil spreads over the whole of a distal end portion of the second blade 140. As a result, the silicone oil is applied even to regions of the conveyance belt 28 that oppose the ribs 140A. The silicone oil that has been applied to the conveyance belt 28 is spread by the second blade 140, to a predetermined thickness.

As described above, in the present exemplary embodiment, a cleaning unit for cleaning the conveyance belt 28 and a coating unit for applying the coating liquid to the conveyance belt 28 are integrated and collected at one location. Thus, efficiency of use of space may be improved.

Here, the first blade 138 is formed with a resin (polyurethane, PET or the like), rubber (fluoride rubber, NBR, HNBR or the like) or metal (SUS or the like) that will not absorb the ink or the coating liquid. The second blade 140 is formed with a resin (polyurethane, PET or the like), rubber (fluoride rubber, NBR, HNBR or the like) or metal (SUS or the like) that will not absorb the coating liquid.

Further, although silicone oil is employed as the coating liquid for the present exemplary embodiment, various liquids may be used, similarly to the first to fourth exemplary embodiments. However, in consideration of stability of the electrostatic adherence of the paper P to the conveyance belt 28, it is desirable if a volume resistance value of the coating liquid is $10^{12}$ to $10^{16}$ Ω·cm, and $10^{14}$ to $10^{16}$ Ω·cm is more desirable.

Figure 10:
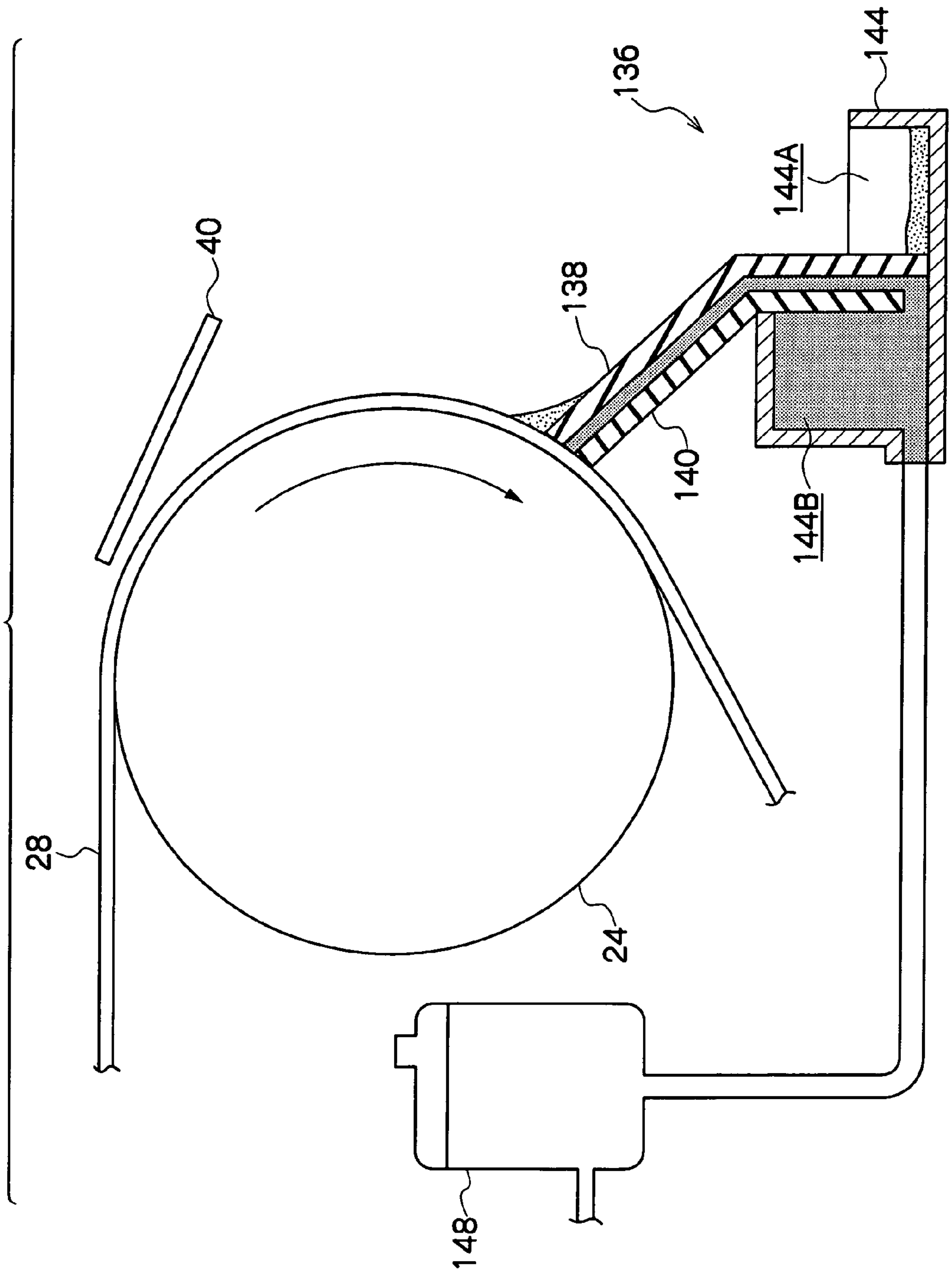
FIG. 10 is a side sectional view showing a variant example of the combined belt-cleaning and oil-coating unit of FIG. 8.

In the present exemplary embodiment, the supply of silicone oil from the oil retention chamber 144B to the conveyance belt 28 is performed mechanically, by a pump 146 which is provided on a channel connecting the oil retention chamber 144B with the tank. However, as shown in FIG. 10, a reserve tank 148 which is in fluid communication with the atmosphere may be provided between the oil retention chamber 144B and the tank, and the reserve tank 148 may be disposed such that silicone oil in the reserve tank 148 is higher than the distal end portion of the second blade 140. Thus, the silicone oil may be supplied from the oil retention chamber 144B to the conveyance belt 28 by head pressure.

Figure 11B:
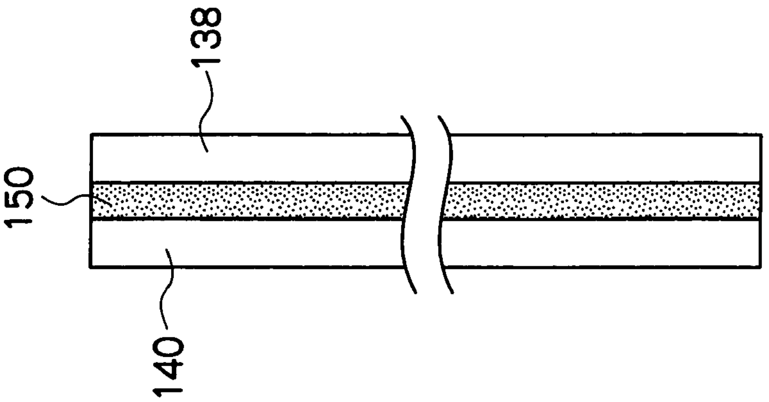
FIG. 11B is a plan view of the variant example.
Figure 11A:
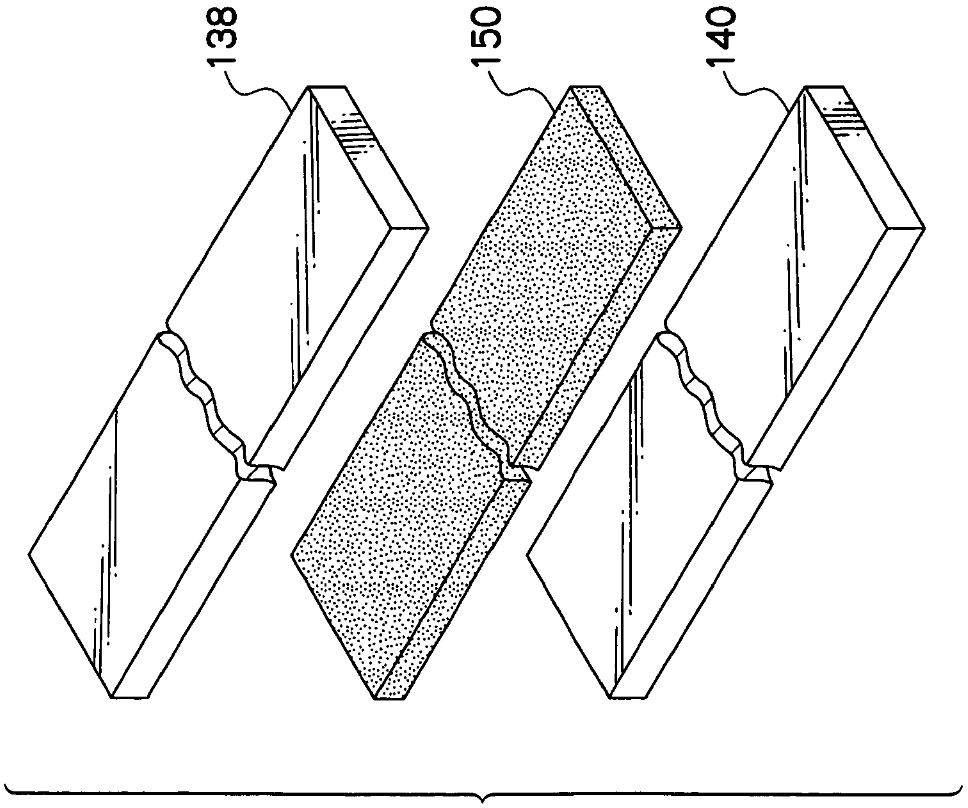
FIG. 11A is an exploded perspective view showing a variant example of the first blade and second blade, which are provided at the combined belt-cleaning and oil-coating unit of FIG. 10.

As shown in FIGS. 9A and 9B, in the present exemplary embodiment, channels for silicone oil are formed as the slits S between the first blade 138 and the second blade 140. Alternatively, as shown in FIGS. 11A and 11B, a core member 150 formed of a porous material may be provided between the first blade 138 and the second blade 140, such that the silicone oil is sucked up to the distal end portion of the first blade 138 and second blade 140 by capillary forces in the core member 150. Here, as the core member 150, a molded sponge made of a resin or rubber that will not absorb the coating liquid, which is silicone oil or the like, or a non-woven fabric of the like may be employed. For example, a polyvinyl alcohol, polyurethane or the like may be employed as the material of the core member 150. A capillary diameter of the core member 150 is suitably around 1 to 100 μm.

Figure 12:
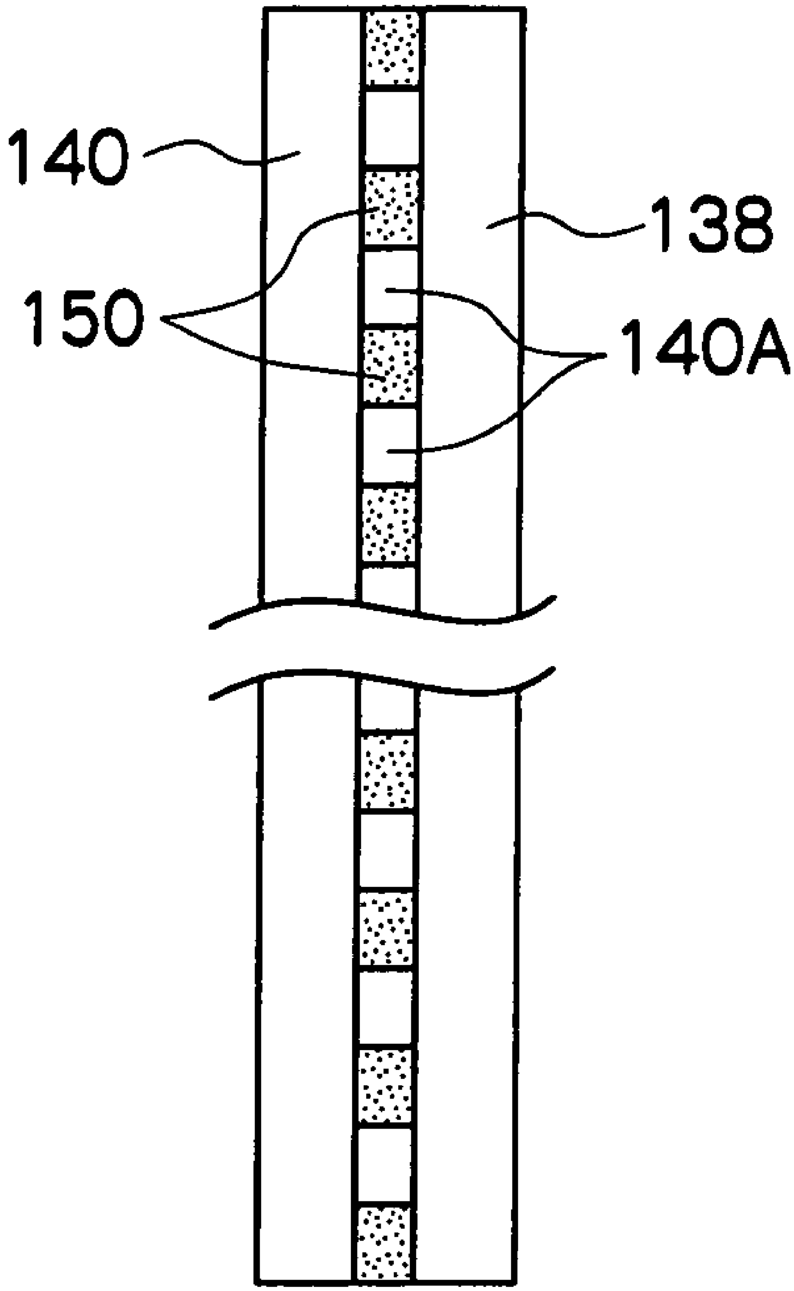
FIG. 12 is a plan view showing another variant example of the first blade and second blade which are provided at the combined belt-cleaning and oil-coating unit of FIG. 8.

Further again, as shown in FIG. 12, a structure in which the ribs 140A are provided on the second blade 140 and the core member 150 fills spaces between the first blade 138 and the second blade 140 is also applicable.

Figure 13B:
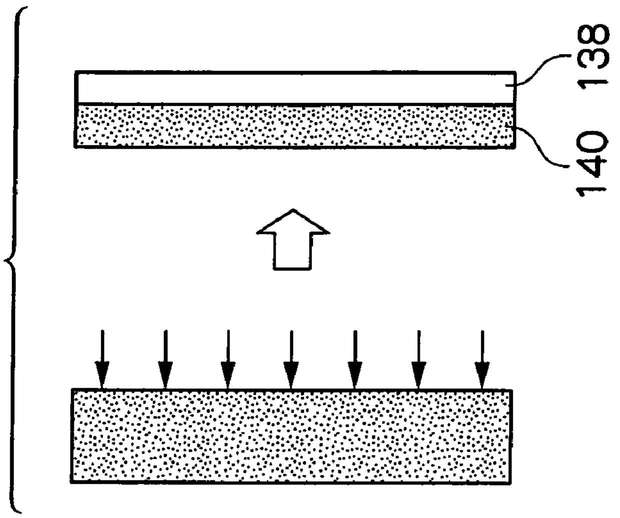
FIG. 13B is a view schematically showing a method of formation of a first blade and second blade which are provided at the combined belt-cleaning and oil-coating unit of FIG. 13A.
Figure 13A:
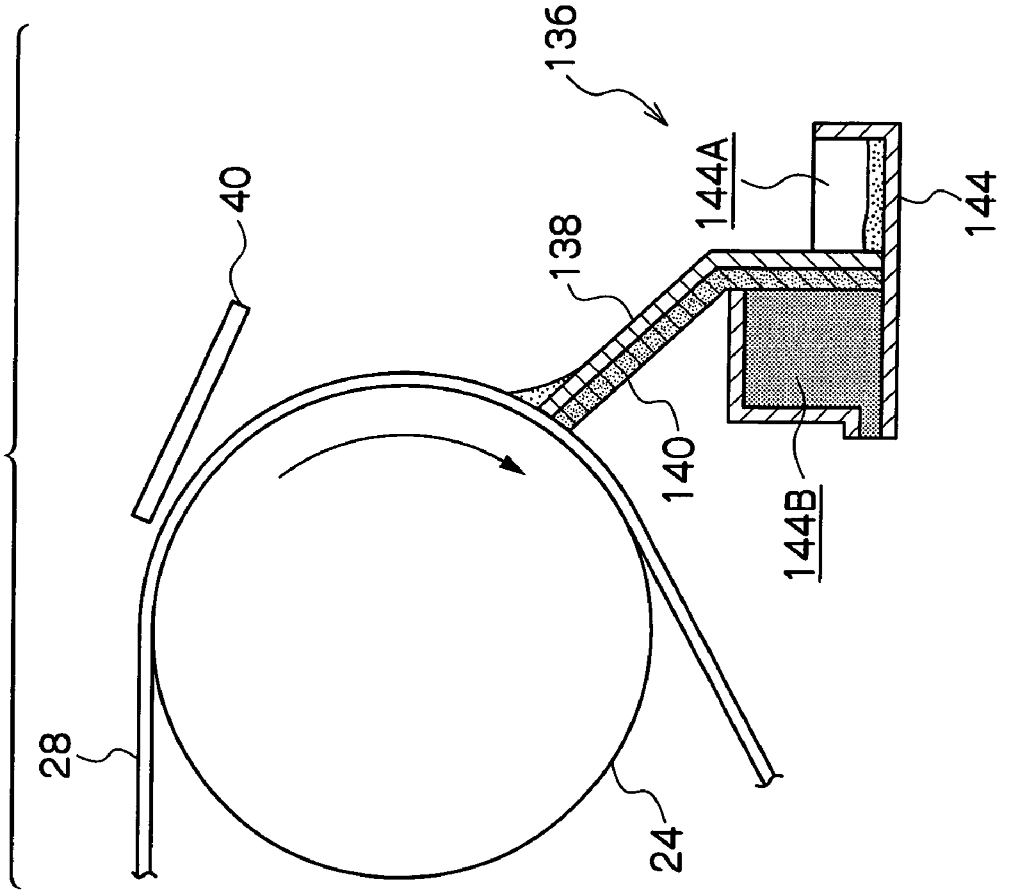
FIG. 13A is a side sectional view showing another variant example of the combined belt-cleaning and oil-coating unit of FIG. 8.

Further yet, as shown in FIG. 13A, the first blade 138 and second blade 140 may be formed as a single body. As a method for formation thereof, a method such as, as shown in FIG. 13B, a process such as thermal pressing, coating of a solution, irradiation of light, spraying of a gas or the like to one face of a porous material, or the like may be applied. A portion at the one side of the porous material forms the first blade 138 featuring water-repellence, with low water-absorbency and high stiffness, and an unprocessed portion of the porous material forms the second blade 140, with high water-absorbency and low stiffness.

Figure 14A:
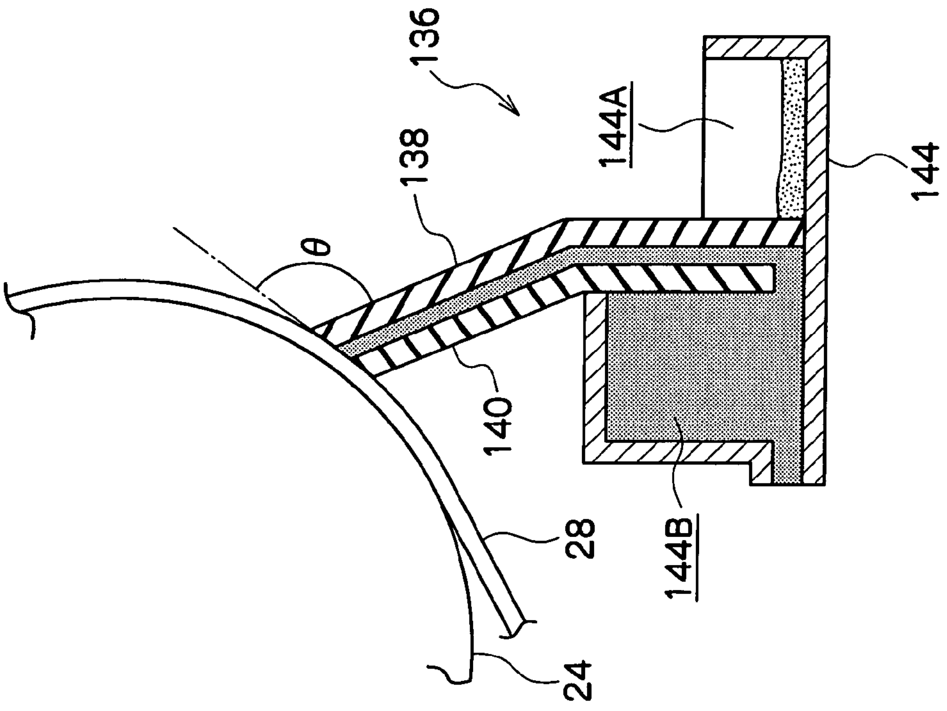
FIG. 14A is a side sectional view showing the combined belt-cleaning and oil-coating unit of FIG. 8.
Figure 14B:
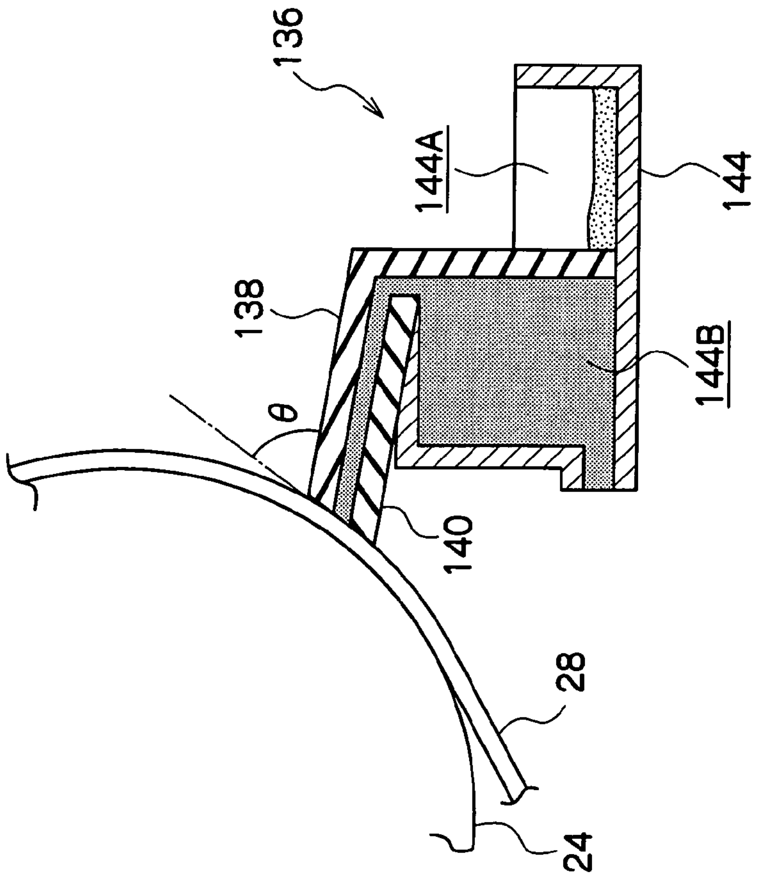
FIG. 14B is a side sectional view showing a variant example of the combined belt-cleaning and oil-coating unit of FIG. 14A.

Further still, in the present exemplary embodiment, as shown in FIG. 14A, a contact angle θ between the first blade 138 and the conveyance belt 28 may be set to an obtuse angle or, as shown in FIG. 14B, a contact angle θ between the first blade 138 and the conveyance belt 28 may be set to an acute angle. In a case in which the contact angle θ is an obtuse angle, cleaning capacity is enhanced, and in a case in which the contact angle θ is an acute angle, abrasion resistance of the conveyance belt 28 is enhanced.

Now, viscosity of the coating liquid varies in accordance with environmental temperature, and there may be cases in which the film thickness of the coating liquid is not a desired thickness. Accordingly, it is useful to sense environmental temperature with a temperature detection unit, or sense viscosity of the coating liquid with a viscosity detection unit, and alter an abutting pressure or abutting angle between the second blade 140 and the conveyance belt 28 in accordance with a detected temperature or viscosity.

Next, a sixth exemplary embodiment of the present invention will be described. Note that structures that are the same as in the first to fifth exemplary embodiments are assigned the same reference numerals, and descriptions thereof are not given.

Figure 15:
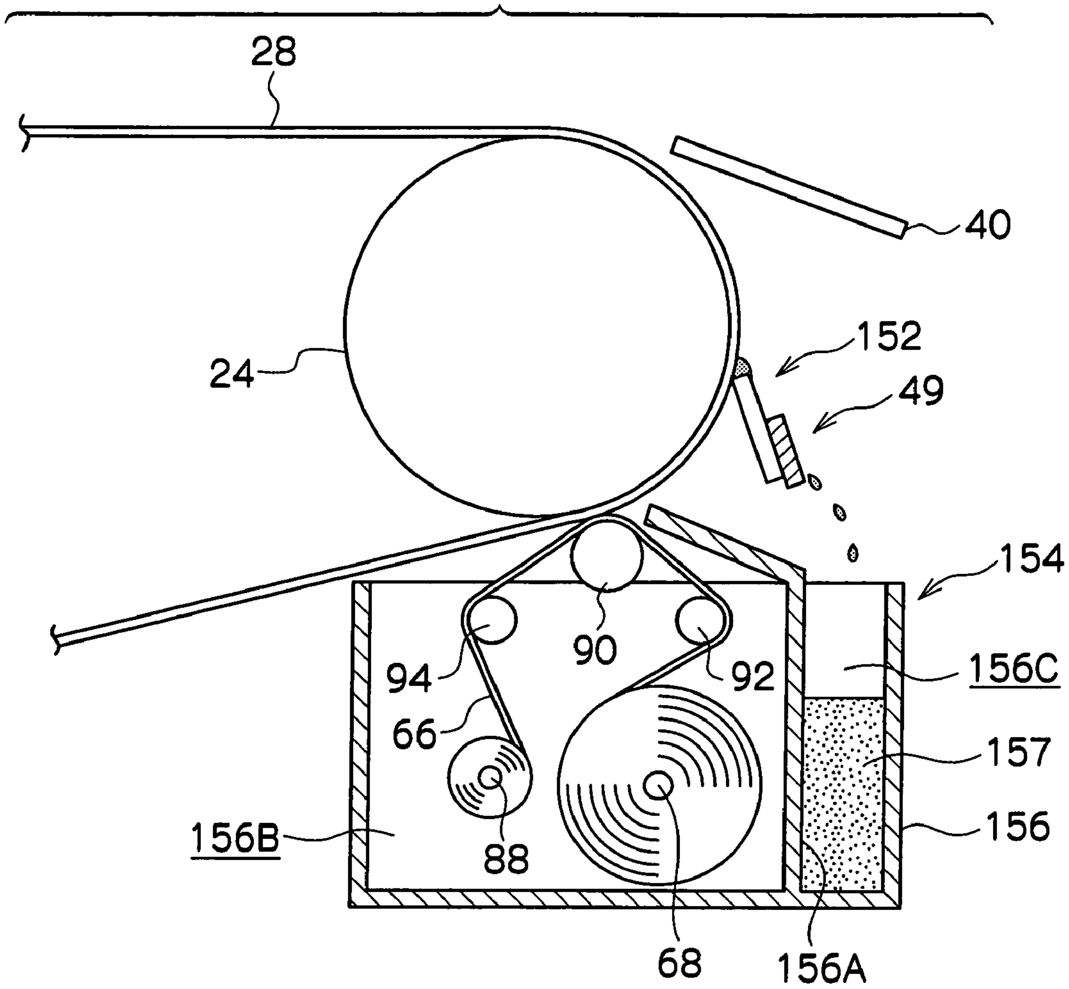
FIG. 15 is a side sectional view showing a belt-cleaning unit and an oil-coating unit which are provided in an inkjet recording device of a sixth exemplary embodiment of the present invention.

As shown in FIG. 15, in the present exemplary embodiment, a belt-cleaning unit 152 is disposed below the separation plate 40. The belt-cleaning unit 152 abuts against the portion of the conveyance belt 28 that is wound round the driving roller 24, and the blade 49 is provided for scraping off ink and the like that has adhered to the conveyance belt 28.

An oil-coating unit 154 is disposed below the driving roller 24. This oil-coating unit 154 is provided with a case 156, the belt-form web 66, the feeding shaft 68, the winding shaft 88, the pressure roller 90, and the pinch rollers 92 and 94. The feeding shaft 68 is rotatably supported at the case 156, and one length direction end of the web 66 is wound onto the feeding shaft 68. The winding shaft 88 is rotatably supported at the case 156, and the other length direction end of the web 66 is wound onto the winding shaft 88. The pressure roller 90 presses the web 66 against the portion of the conveyance belt 28 that is wound round the driving roller 24. The pinch rollers 92 and 94 are rotatably supported at the case 156, and apply tension to the web 66.

The feeding shaft 68, the pinch roller 92, the pressure roller 90, the pinch roller 94 and the winding shaft 88 are arranged in the listed order from an upstream side to a downstream side in a direction of movement of the web 66, and the web 66 spans therebetween. The pinch roller 92, the pressure roller 90 and the pinch roller 94 are arranged in the listed order from the upstream side to the downstream side in the direction of turning of the conveyance belt 28. The web 66 is impregnated with silicone oil.

Here, the winding shaft 88 is driven by a motor (not shown). When the winding shaft 88 is rotated by driving of the motor, the web 66 is fed out from the feeding shaft 68, and conveyed toward the winding shaft 88 a tiny bit at a time. As a result, at a portion of nipping between the pressure roller 90 and the driven roller 27, the silicone oil is applied to the conveyance belt 28 and a film of silicone oil is formed on the conveyance belt 28. In contrast, the inks being ejected from the recording heads 32 are aqueous inks. Therefore, when ink is adhered to the conveyance belt 28 by ink-misting, unnecessary ink ejection during paper jams, dummy jets which are ejected onto the conveyance belt 28, and so forth, the ink agglomerates because of water-repellence of the silicone film on the conveyance belt 28. Therefore, forces adhering the ink to the conveyance belt 28 may be suppressed and, when the conveyance belt 28 is cleaned by the blade 49, the ink is separated from the conveyance belt 28 with ease. The dummy-jetting here is performed at short intervals, such as once every few tens of seconds or the like, in order to prevent an increase in viscosity of the inks in the recording heads 32. Thus, forming the film of silicone oil on the conveyance belt 28 continuously as in the present exemplary embodiment is effective.

The case 156 is partitioned into a web accommodation chamber 156B and a waste fluid accommodation chamber 156C by a partition wall 156A. The feeding shaft 68, pinch roller 92, pressure roller 90, pinch roller 94 and winding shaft 88, and the web 66 spanning therebetween, are accommodated in the web accommodation chamber 156B. An upper portion of the waste fluid accommodation chamber 156C, which is disposed directly below the blade 49, is open. Ink and the like that is scraped off by the blade 49 drips down to the waste fluid accommodation chamber 156C. An absorbent member 157 is embedded at a bottom portion of the waste fluid accommodation chamber 156C, and absorbs the ink and the like that drips down from the blade 49.

Figure 16A:
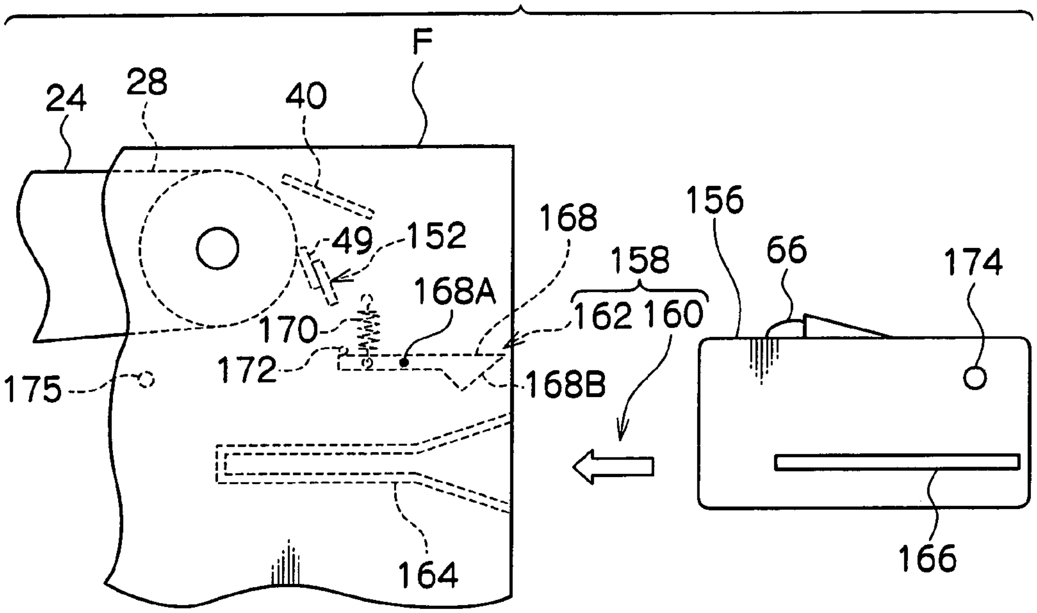
FIGS. 16A and 16B are side views showing a mechanism for mounting/removing the oil-coating unit of FIG. 15 at a device main body.
Figure 16B:
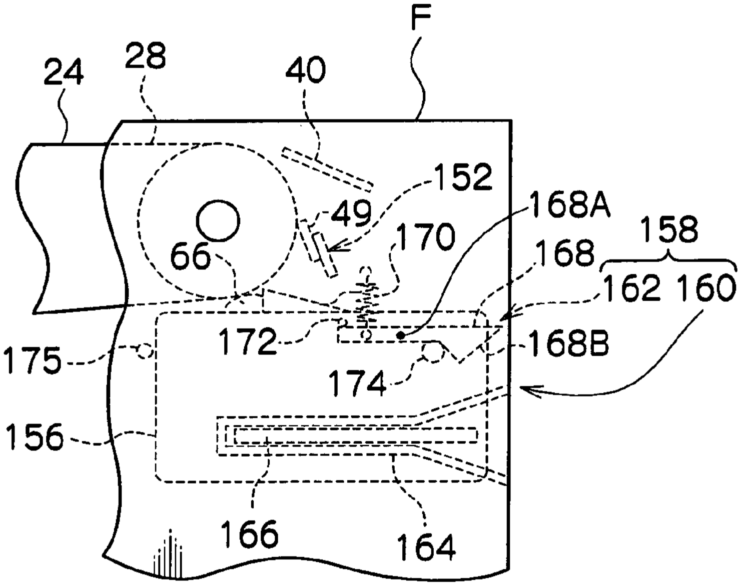

As shown in FIGS. 16A and 16B, the oil-coating unit 154 is formed to be mountable and removable at the device main body with a mounting mechanism 158. The mounting mechanism 158 is provided with a guide mechanism 160 and a lock mechanism 162.

The guide mechanism 160 is provided with guide channels 164 and guide ribs 166. The guide channels 164 are provided at a frame F of the device main body, which stands at sides of each of two ends in the width direction of the conveyance belt 28. The guide channels 164 extend substantially horizontally from one horizontal direction end portion of the frame F to below the driving roller 24. The guide ribs 166 are provided at each of two length direction faces of the case 156, extend substantially horizontally, and are capable of sliding in the guide channels 164. The guide channels 164 widen in taper forms at the one horizontal direction end portion of the frame F, and the guide ribs 166 may be easily inserted into the guide channels 164.

The lock mechanism 162 is provided with a locking lever 168, a tension coil spring 170, a stopper 172, and studs 174 and 175. The locking lever 168 is rotatably mounted above the guide channels 164 of the frame F. This locking lever 168 is provided with a fulcrum 168A at a length direction central portion of the locking lever 168, and is provided with a pawl 168B at one length direction end portion of the locking lever 168.

The tension coil spring 170 is disposed further inside the device and upward relative to the fulcrum 168A, and pulls on an other length direction end portion of the locking lever 168 and the frame F. The stopper 172 is a pin which is provided standing further inside the device and upward relative to the fulcrum 168A of the frame F. The other length direction end portion of the locking lever 168, which is urged in a clockwise direction of the drawings by the tension coil spring 170, abuts against the stopper 172. In this state, the locking lever 168 is substantially horizontal, and the pawl 168B is oriented downward.

The stud 174 is disposed at the upper side of the guide rib 166 at each of the two length direction faces of the case 156. When the case 156 is pushed into the device in a state in which the guide ribs 166 are engaged with the guide channels 164, the stud 174 abuts against the pawl 168B of the locking lever 168, and pushes the one length direction end side of the locking lever 168 upward in opposition to the urging force of the tension coil spring 170.

The stud 175 is provided further inside the device and upward relative to the guide channels 164 of the frame F, and limits movement of the case 156 into the device. Thus, when the case 156 is pushed in as far as a position of abutting against the stud 175, the stud 174 moves past the pawl 168B of the locking lever 168, the one length direction end side of the locking lever 168 descends due to the urging force of the tension coil spring 170, and the pawl 168B engages with the stud 174. In this state, the pressure roller 90 and the driving roller 24 press together with the web 66 and the conveyance belt 28 interposed therebetween.

Figure 17B:
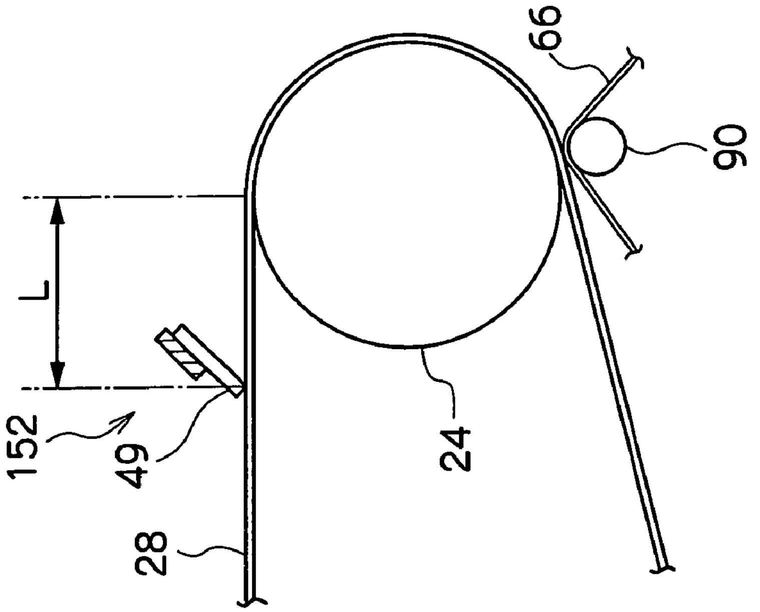
FIG. 17B is a side sectional view showing a variant example of disposition of the belt-cleaning unit of FIG. 15.
Figure 17A:
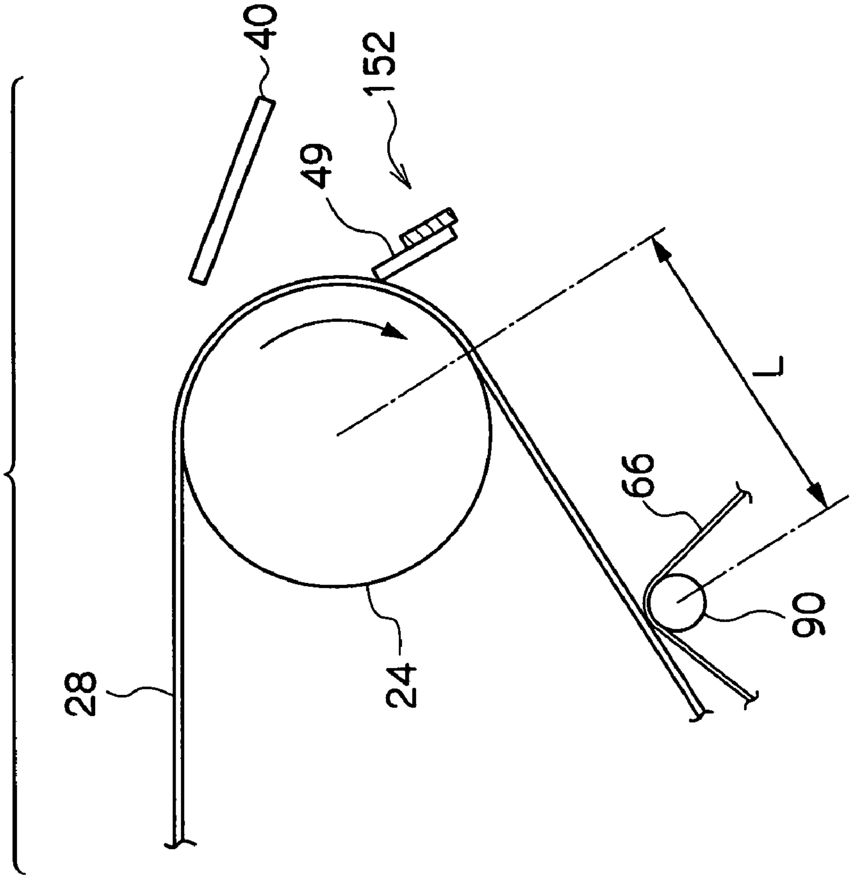
FIG. 17A is a side sectional view showing a variant example of disposition of the oil-coating unit of FIG. 15.

Now, as shown in FIG. 17A, in a case in which the web 66 abuts against the conveyance belt 28 a distance L to the downstream side from the driving roller 24, a compression force acts on the conveyance belt 28 between the driving roller 24 and the web 66, and the conveyance belt 28 contracts. Further, as shown in FIG. 17B, in a case in which the blade 49 is abutted against the conveyance belt 28 a distance L to the upstream side from the driving roller 24, a tension force acts on the conveyance belt 28 between the driving roller 24 and the blade 49, and the conveyance belt 28 is stretched.

An extension amount of the conveyance belt 28 caused by such a compression force or tension force varies with variations in loading of the web 66 or the blade 49. Such changes in the extension amount are transmitted to a portion of the conveyance belt 28 within the ejecting region SE, leading to adverse effects such as irregularities in images and suchlike.

By contrast, in the present exemplary embodiment, both the blade 49 and the web 66 abut against the portion of the conveyance belt 28 that is wound round the driving roller 24, a shearing force acts on the conveyance belt 28 from the blade 49 and the web 66, and the conveyance belt 28 is stretched by this shearing force. Herein, an extension amount of the conveyance belt 28 caused by this shearing force is extremely small in comparison with the above-mentioned extension amount caused by a compression force or tension force, and variations in this extension amount will not exert adverse effects on image quality.

Figure 18:
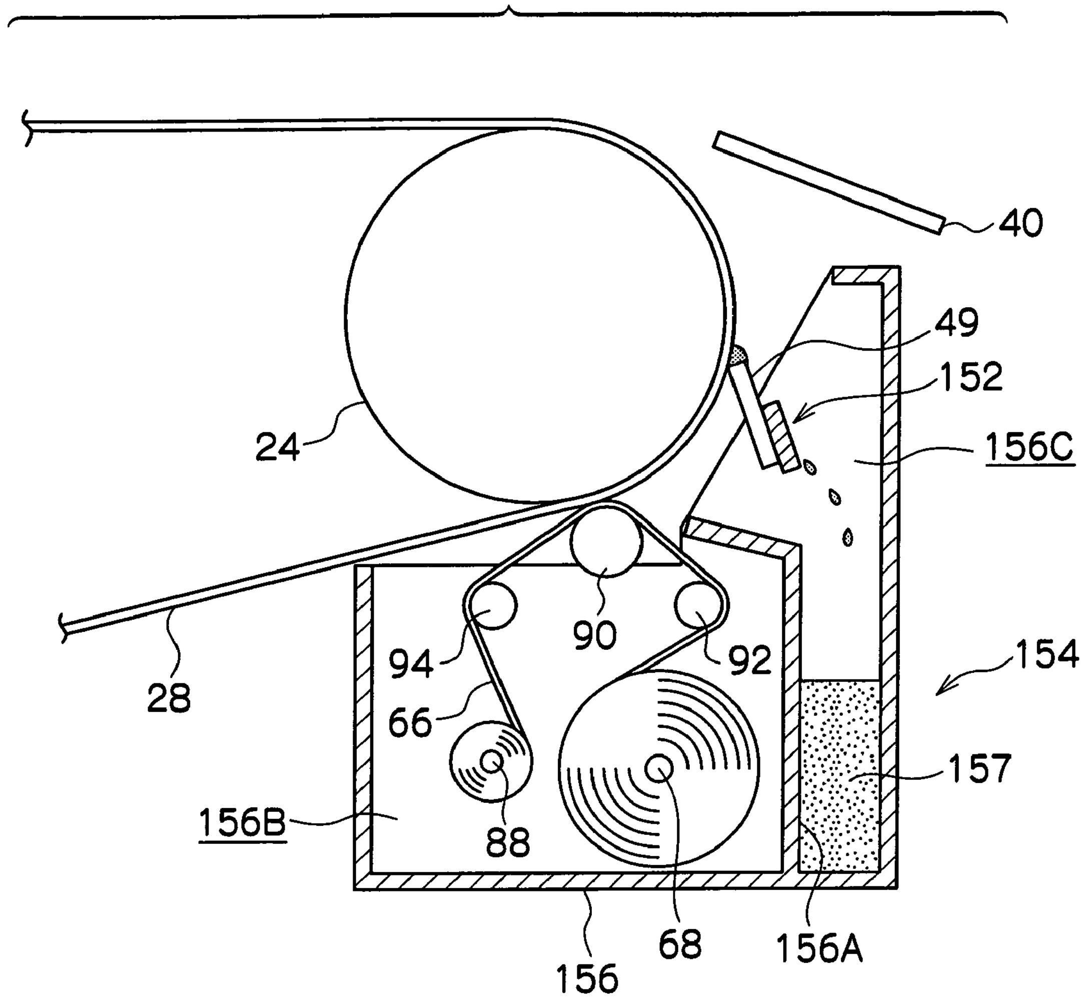
FIG. 18 is a side sectional view showing a variant example of the belt-cleaning unit and oil-coating unit of FIG. 15.

Further, in the present exemplary embodiment, the belt-cleaning unit 152 and the oil-coating unit 154 are formed as separate units but, as shown in FIG. 18, if the belt-cleaning unit 152 and oil-coating unit 154 are formed as a single unit, maintenance of the oil-coating unit 154 and maintenance of the belt-cleaning unit 152 may be performed together.

Figure 19:
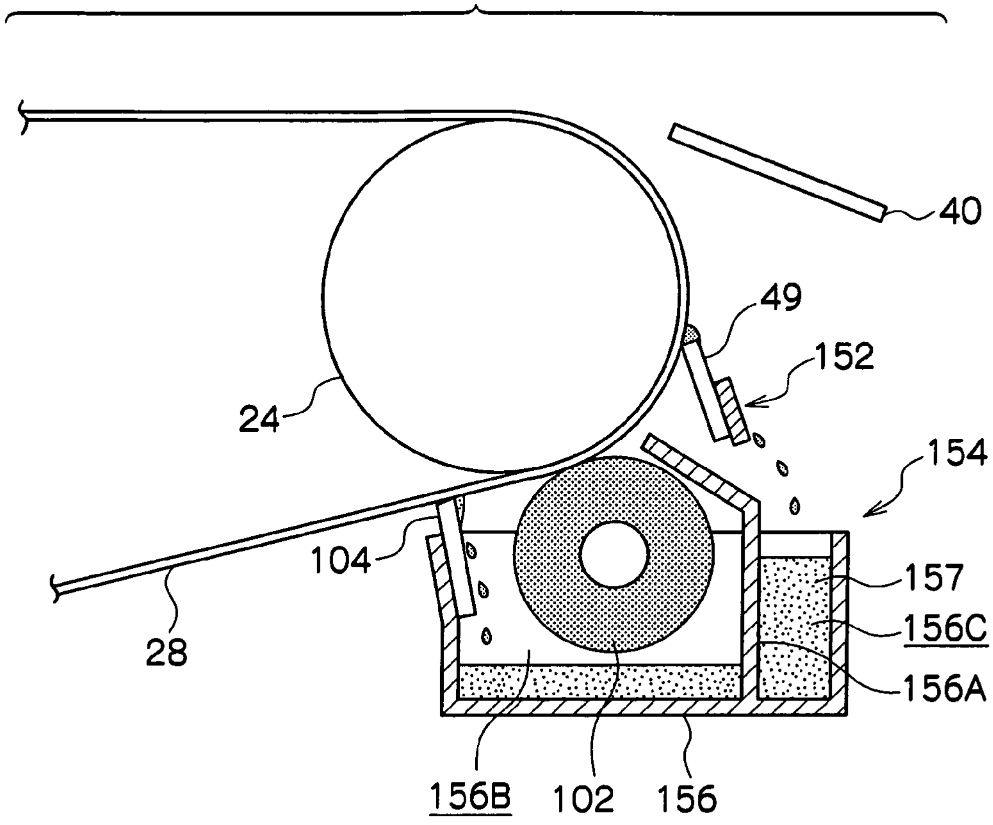
FIG. 19 is a side sectional view showing another variant example of the oil-coating unit of FIG. 15.

Further still, in the present exemplary embodiment, the web 66 is employed for performing coating of the coating liquid. However, as shown in FIG. 19, the coating may be performed by a method of impregnating the coating liquid into the oil-coating roller 102 which is capable of absorbing liquid and abutting this oil-coating roller 102 against the conveyance belt 28. In such a case, it is preferable to provide the oil blade 104, to regulate the coating liquid that has been applied to the conveyance belt 28 by the oil-coating roller 102 to a desired thickness.

Next, a seventh exemplary embodiment of the present invention will be described. Note that structures that are the same as in the first to sixth exemplary embodiments are assigned the same reference numerals, and descriptions thereof are not given.

Figure 20:
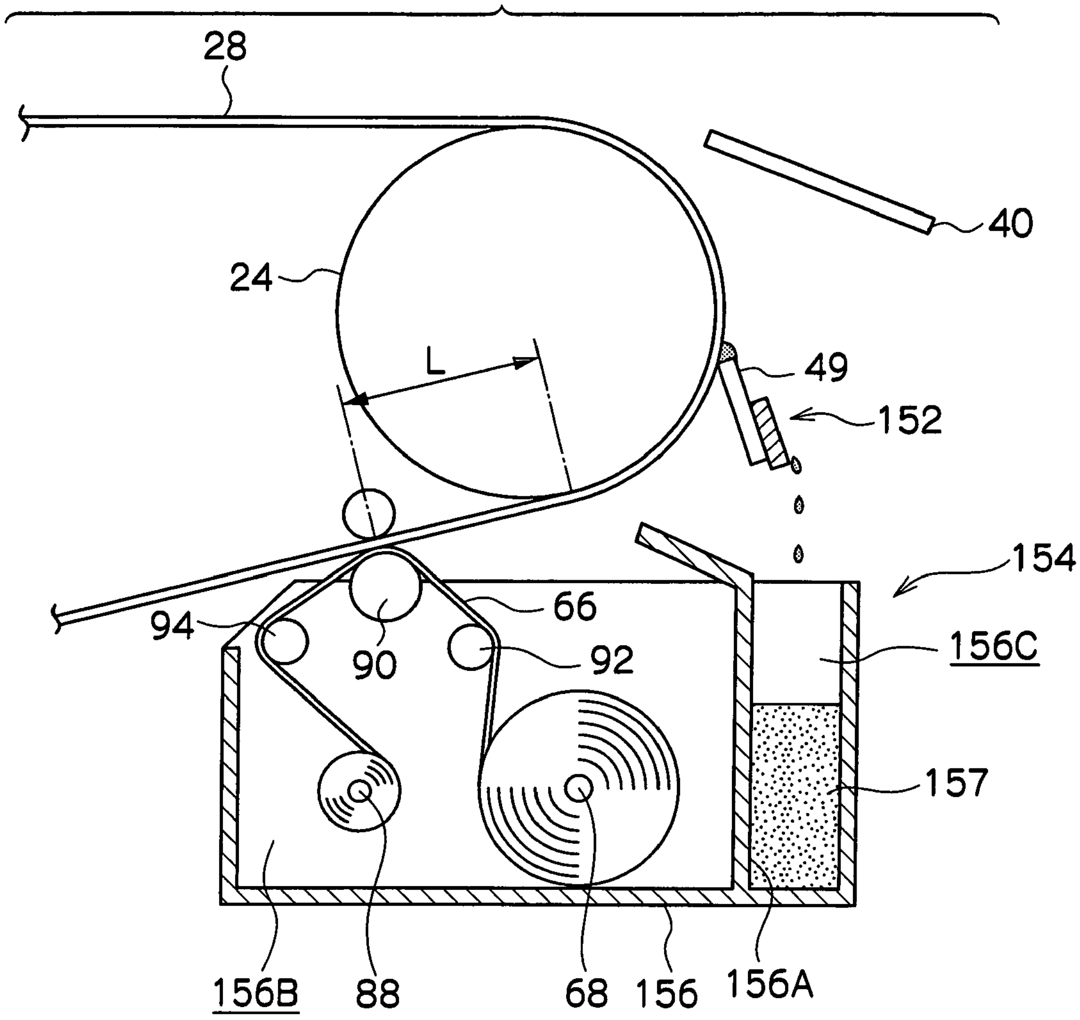
FIG. 20 is a side sectional view showing a belt-cleaning unit and an oil-coating unit which are provided in an inkjet recording device of a seventh exemplary embodiment of the present invention.

As shown in FIG. 20, in the present exemplary embodiment, only the blade 49 abuts against the portion of the conveyance belt 28 that is wound round the driving roller 24. A position of abutting between the web 66 and the conveyance belt 28 is set downstream by a distance L from a downstream end position of the portion of the conveyance belt 28 that is wound round the driving roller 24.

Now, in the vicinity of the driving roller 24, the dynamic relationship represented by the following equation (*) applies.

$$\Delta L = \Delta F \times L / (E \times t \times w) \quad (*)$$

ΔL is a contraction amount (mm) of the conveyance belt 28 in the region corresponding to distance L ΔF is an amount of change of load that the conveyance belt 28 receives from the oil-coating unit 154 (N)

E is a longitudinal modulus of elasticity of the conveyance belt 28 ($N/mm^2$)

t is thickness of the conveyance belt 28 (mm)

w is width of the conveyance belt 28 (mm)

It is experimentally verified that if the contraction amount ΔL equals or exceeds 0.01 mm, this corresponds to a level at which it is possible to visually discern irregularities in images. Therefore, image irregularities may be suppressed to a level which cannot be visually discerned by the distance L satisfying the following equation (A).

$$0 \leqq L < 0.01 \times E \times t \times w / \Delta F \quad (A)$$

For example, if the conveyance belt 28 is a belt made of PI, with the longitudinal modulus of elasticity E being 4000 $N/mm^2$, the thickness t being 0.075 mm and the width w being 350 mm, and an amount of variation in loading ΔF is 30 N, image irregularities may be suppressed to levels at which the image irregularities cannot be visually discerned by the distance L being set to less than 35 mm.

Here, cases in which the loading applied to the conveyance belt 28 by the belt-cleaning unit 152 and the oil-coating unit 154 changes include, for example, a moment in time when the blade 49 scrapes off ink on the conveyance belt 28 after dummy-jetting has been performed onto the conveyance belt 28, a moment in time when the web 66 is fed by a tiny amount, and so forth. In the former case, the blade 49 is wetted with a large amount of ink and the loading is changed by a frictional resistance between the blade 49 and the conveyance belt 28 falling. In the latter case, a frictional resistance between the web 66 and the conveyance belt 28 differs between when the web 66 is moved and when the web 66 is stopped, and thus the loading varies.

Figure 21:
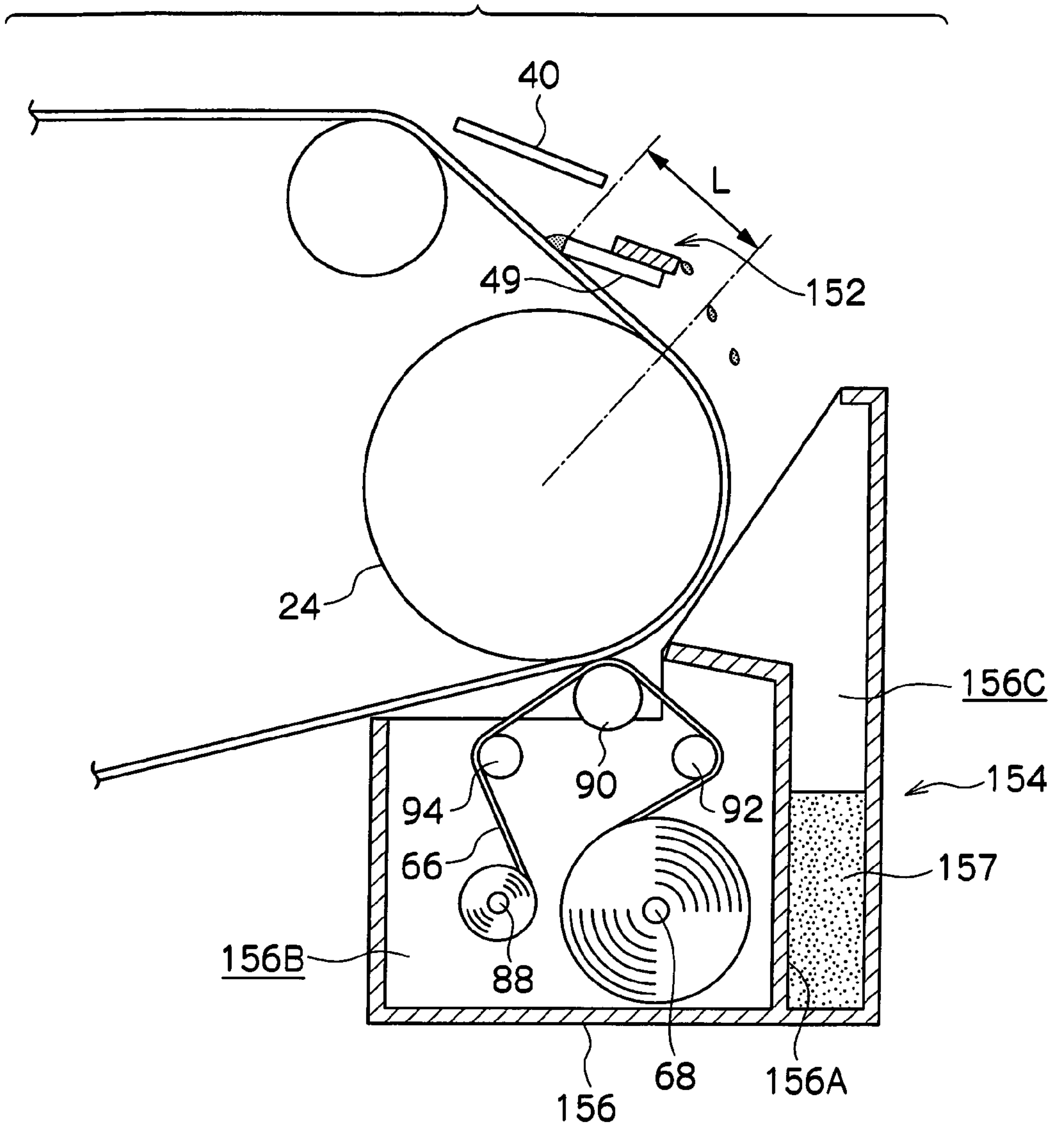
FIG. 21 is a side sectional view showing a variant example of disposition of the belt-cleaning unit and the oil-coating unit of FIG. 20.

In the present exemplary embodiment, the belt-cleaning unit 152 is abutted against the portion of the conveyance belt 28 that is wound round the driving roller 24, and a position of abutting between the oil-coating unit 154 and the conveyance belt 28 is separated from the portion that winds round the driving roller 24. However, as shown in FIG. 21, the oil-coating unit 154 may also be abutted against the portion of the conveyance belt 28 that is wound round the driving roller 24, with a position of abutting between the belt-cleaning unit 152 and the conveyance belt 28 being set upstream by a distance L from an upstream end portion of the portion of the conveyance belt 28 that is wound round the driving roller 24.

Next, an eighth exemplary embodiment of the present invention will be described. Note that structures that are the same as in the first to seventh exemplary embodiments are assigned the same reference numerals, and descriptions thereof are not given.

A charging roller unit which is equipped with the charging roller 36 will be described.

Figure 22:
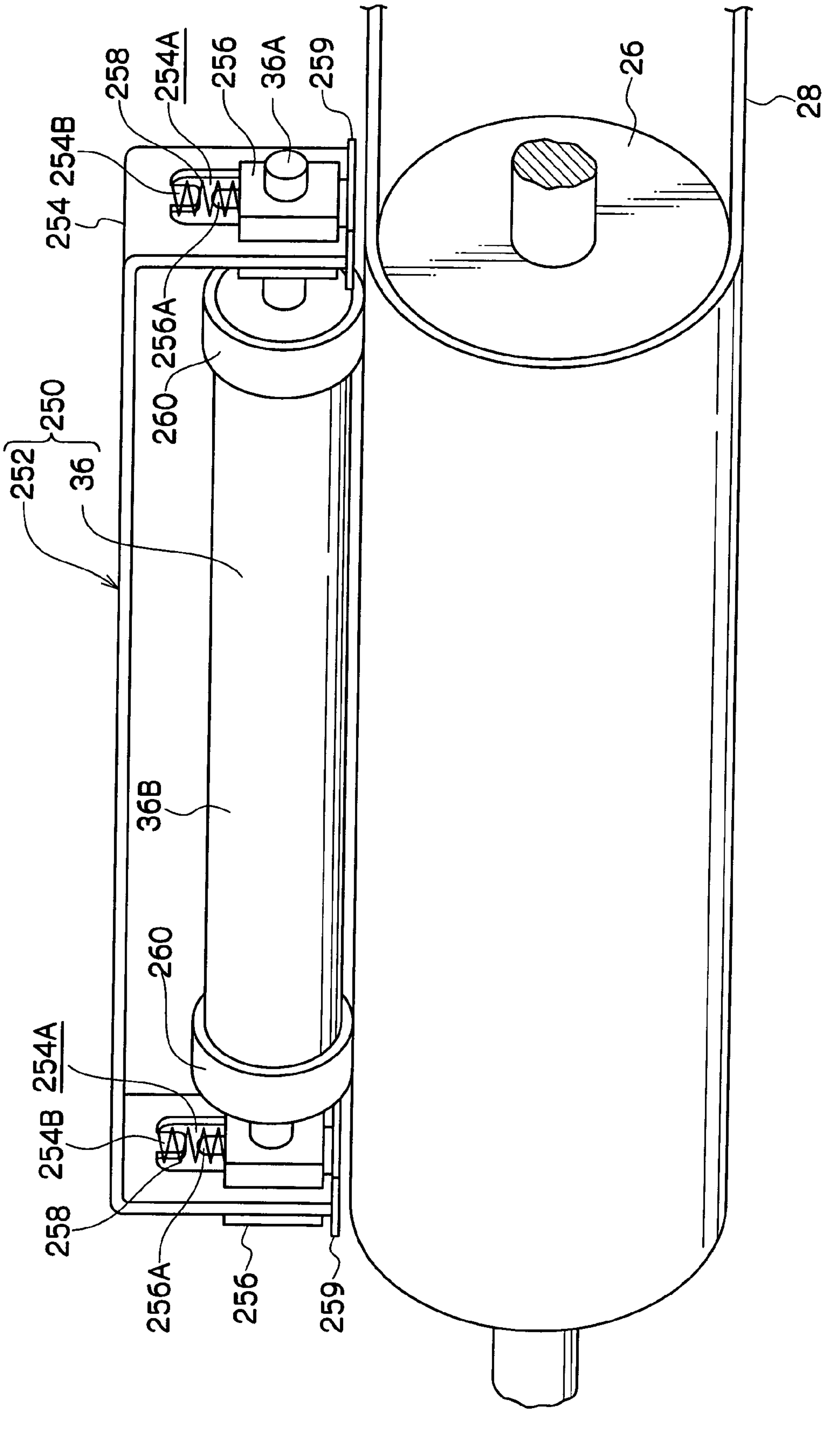
FIG. 22 is a perspective view of a charging roller unit which is provided at an inkjet recording device of an eighth exemplary embodiment of the present invention.
Figure 23:
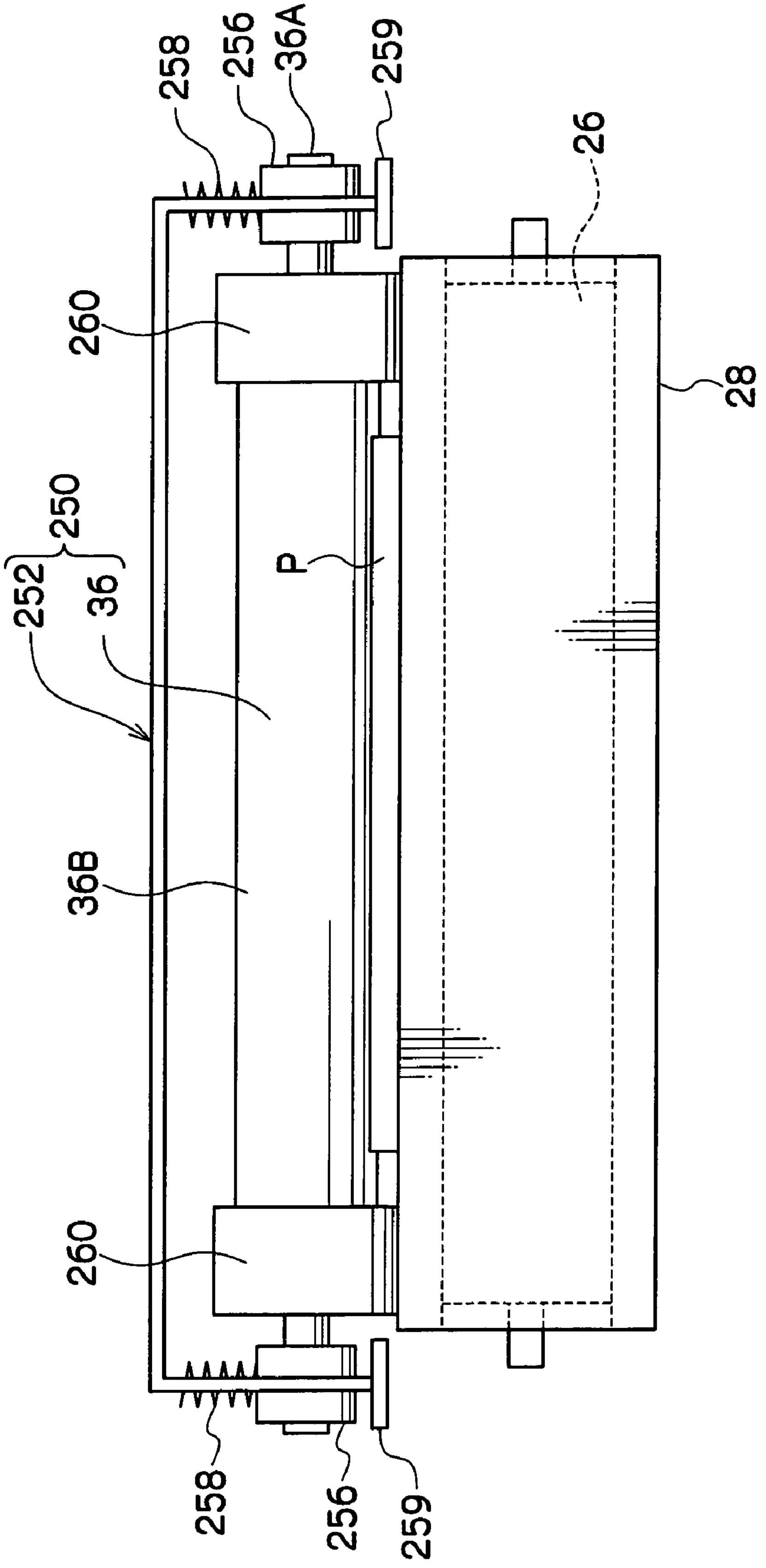
FIG. 23 is a front view of the charging roller unit which is provided at the inkjet recording device of the eighth exemplary embodiment of the present invention.

As shown in FIGS. 22 and 23, a charging roller unit 250 is provided with the charging roller 36 and a support mechanism 252, which supports the charging roller 36. The support mechanism 252 is provided with a frame 254, a pair of bearings 256 and a pair of compression coil springs 258, which serve as urging members.

The frame 254 is supported at a frame (not shown) of the inkjet recording device 12, at an upper side of the charging roller 36. The frame 254 extends with length along an axial direction of the charging roller 36, and each of two length direction end portions of the frame 254 is bent down through a substantial right angle toward the conveyance belt 28. U-form long holes 254A, which extend from each of the two length direction end portions toward the bent portions, are opened in the frame 254. Each bearing 256 is engaged with the respective long hole 254A to be slideable along the length direction of the long hole 254A, and rotatably supports one end portion or another end portion of the charging roller 36 with respect to an axial direction of a rotation shaft 36A.

At an innermost portion of the long hole 254A, a boss 254B is formed extending toward an opening portion side of the long hole 254A. A boss 256A is formed at the bearing 256, to oppose the boss 254B. Two end portions of the compression coil spring 258 are fitted onto the boss 254B and the boss 256A. Consequently, the charging roller 36 is urged toward the conveyance belt 28 by the compression coil springs 258. Furthermore, a stopper 259 is provided at each of the two length direction end portions of the frame 254. The stoppers 259 cover the opening portions of the long holes 254A to prevent disengagement of the bearings 256 from the long holes 254A.

A spacer 260, which is an annular member with a larger diameter than a roller portion 36B of the charging roller 36, is mounted at each of two axial direction end portions of the roller portion 36B. These spacers 260 are members which are insulative and feature high stiffness so as not to be deformed by pressure, formed of a resin such as polyacetal (POM), polymethyl methacrylate (PMMA), PET or the like, an insulation-treated metal, a ceramic or the like. Hence, only the spacers 260 are pressed against the conveyance belt 28 by the urging force of the compression coil springs 258, and the roller portion 36B of the charging roller 36 and the conveyance belt 28 are not in contact.

Now, if the roller portion 36B of the charging roller 36 were touched against the conveyance belt 28, silicone oil on the conveyance belt 28 would adhere to the roller portion 36B of the charging roller 36. Consequently, the size of a small gap at which discharges occur between the roller portion 36B of the charging roller 36 and the conveyance belt 28 would change, and charging characteristics would be altered. Further, depending on a combination of material of the roller portion 36B of the charging roller 36 and a type of the charging liquid, a volume of the roller portion 36B of the charging roller 36 would be altered by the roller portion 36B of the charging roller 36 absorbing the coating liquid, and a change would occur in a state of nipping between the roller portion 36B of the charging roller 36 and the conveyance belt 28. Further yet, electrical characteristics such as resistance values and the like of the roller portion 36B of the charging roller 36 would change.

However, in the present exemplary embodiment, because the roller portion 36B of the charging roller 36 is not in contact with the conveyance belt 28 and the silicone oil adhered to the conveyance belt 28 is prevented from adhering to the roller portion 36B of the charging roller 36, changes in charging characteristics, volume and electrical characteristics of the charging roller 36 may be suppressed, and stability of charging may be improved. In addition, a lifetime of the charging roller 36 is extended.

Moreover, because it is not necessary to consider the combination of the material of the roller portion 36B of the charging roller 36 and the type of coating liquid, such as silicone oil or the like, a degree of freedom of selection of the material of the roller portion 36B of the charging roller 36 and selection of the coating liquid is broadened, which leads to improvements in cost reduction, charging characteristics and cleaning characteristics.

Furthermore, with the roller portion 36B of the charging roller 36 and the conveyance belt 28 being non-touching, current will not flow through the spacers 260 into the conveyance belt 28.

Figure 24:
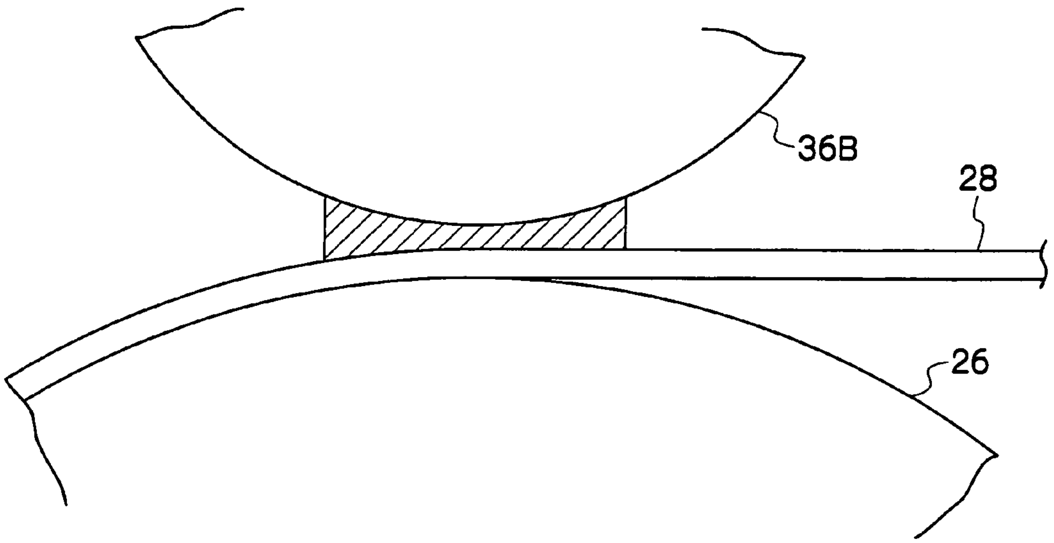
FIG. 24 is a side view schematically showing a state of discharging between a charging roller and a conveyance belt which are provided at the inkjet recording device of the eighth exemplary embodiment of the present invention.

Therefore, as shown in FIG. 24, all transfers of charge between the roller portion 36B and the conveyance belt 28 are transfers by discharges, and a surface potential of the conveyance belt 28 is stable. That is, the surface potential of the conveyance belt 28 may be prevented from rising unusually, and electrostatic forces between the conveyance belt 28 and the recording head 32 may be prevented from rising unusually.

As a result, lifting of the conveyance belt 28 toward the recording head 32 may be restrained, and a clearance between the recording head 32 and the conveyance belt 28 may be made narrower. Thus, accuracy of impact positions of ink droplets on the paper P may be improved. Further, a range of voltage applied to the charging roller 36 may be broadened to the high side, and an adherence force between the paper P and the conveyance belt 28 may be enhanced. Thus, uniformity of the clearance can be improved, and accuracy of impact positions of ink droplets on the paper P may be similarly improved.

Because it is not necessary to increase tension that is applied to the conveyance belt 28 in order to prevent lifting of the conveyance belt 28, occurrences of wrinkling in the conveyance belt 28 may be suppressed, and conveyance characteristics of the paper P by the conveyance belt 28 may be improved. Further, because the charging roller 36 passively rotates and discharge locations of the roller portion 36B are constantly moving, there is little discharge degradation. Further yet, because the gap between the charging roller 36 and the conveyance belt 28 is kept constant by the spacers 260 regardless of variations in thickness of the conveyance belt 28, surface potential of the conveyance belt 28 is stable. Further still, because the charging roller 36 and the conveyance belt 28 are not in contact and the charging roller 36 only touches against the paper P, abrasion deterioration of the charging roller 36 can be reduced.

Now, the gap between the roller portion 36B and the conveyance belt 28 is less than a thickness of the paper P (and preferably not more than 0.6 times the thickness of the paper P), such that the paper P is pressed against the conveyance belt 28 by the roller portion 36B of the charging roller 36. Consequently, the electrostatic adherence force between the paper P and the conveyance belt 28 may be efficiently raised, and adherence force between the conveyance belt 28 and the paper P can be assured.

Herein, in consideration of adherence of the silicone oil that has been adhered to the conveyance belt 28 to the roller portion 36B, it is desirable that the gap between the roller portion 36B and the conveyance belt 28 be larger than 20 μm.

In the present exemplary embodiment, the charging unit is formed as a charging roller. However, it is sufficient that the charging unit charges a conveyance member, such as the conveyance belt or the like, without touching the conveyance member, and well-known non-contact type chargers, such as corotrons and the like, may be employed.

Next, a ninth exemplary embodiment, of a charging roller unit equipped with the charging roller 36, will be described.

Figure 25:
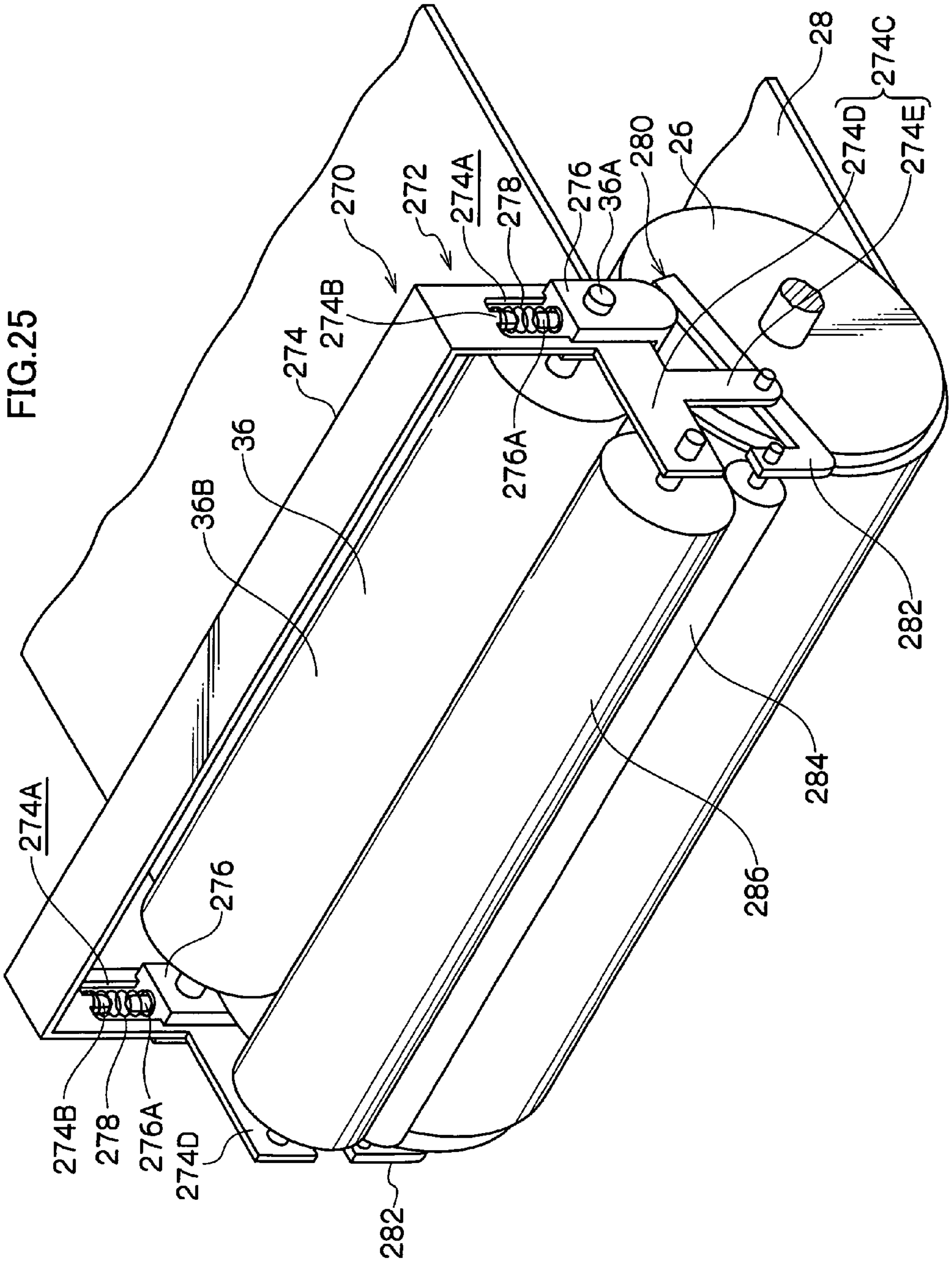
FIG. 25 is a perspective view showing a charging roller unit which is provided at an inkjet recording device of a ninth exemplary embodiment of the present invention.
Figure 26:
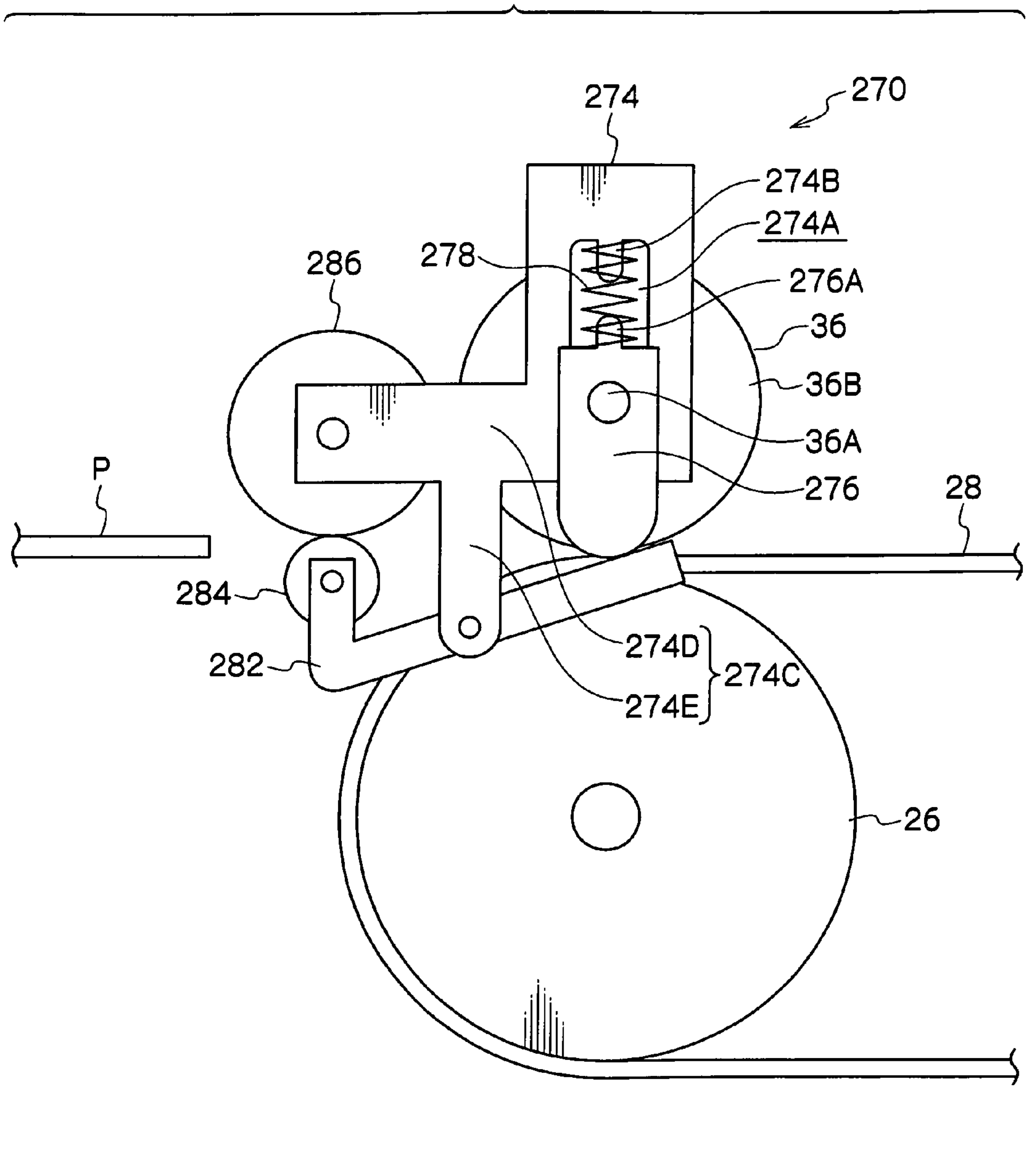
FIG. 26 is a side view of the charging roller unit which is provided at the inkjet recording device of the ninth exemplary embodiment of the present invention.

As shown in FIGS. 25 and 26, a charging roller unit 270 is provided with the charging roller 36, a support mechanism 272, and a link mechanism 280. The support mechanism 272 supports the charging roller 36, and the link mechanism 280 causes the charging roller 36 to move toward and away from the conveyance belt 28. The support mechanism 272 is provided with a frame 274, a pair of bearings 276 and a pair of compression coil springs 278, which serve as urging members.

The frame 274 is supported at a frame (not shown) of the inkjet recording device 12, at an upper side of the charging roller 36. The frame 274 extends with length along the axial direction of the charging roller 36, and each of two length direction end portions of the frame 274 is bent down through a substantial right angle toward the conveyance belt 28. U-form long holes 274A, which extend from each of the two length direction end portions toward the bent portions, are opened in the frame 274. Each bearing 276 is engaged with the respective long hole 274A to be slideable along the length direction of the long hole 274A, and rotatably supports one end portion or another end portion of the charging roller 36 with respect to the axial direction of the rotation shaft 36A.

At an innermost portion of the long hole 274A, a boss 274B is formed extending toward an opening portion side of the long hole 274A. A boss 276A is formed at the bearing 276, to oppose the boss 274B. Two end portions of the compression coil spring 278 are fitted onto the boss 274B and the boss 276A. Consequently, the charging roller 36 is urged toward the conveyance belt 28 by the compression coil spring 278.

A link mechanism support piece 274C, which extends to the upstream side in the conveyance direction, is formed integrally at each of the two length direction end portions of the frame 274. The link mechanism support piece 274C is structured by a roller support portion 274D and a link support portion 274E. The roller support portion 274D extends substantially horizontally with length toward the conveyance direction upstream side. The link support portion 274E extends substantially vertically with length downward from a length direction central portion of the roller support portion 274D.

The link mechanism 280 is structured by arms 282, a roller 284, and a roller 286. Length direction central portions of the arms 282 are rotatably supported at distal end portions of the link support portions 274E. The roller 284 is rotatably supported at one length direction end portions of the arms 282. The roller 286 is rotatably supported at distal end portions of the roller support portions 274D.

Each arm 282 supports the roller 284 at the length direction one end portion of the arm 282. When a length direction other end portion of the arm 282 acts to turn in a rising direction (the anti-clockwise direction in the drawings), the length direction other end portion of the arm 282 may abut against a curved portion which is formed at the lower side of the bearing 276, such that the turning of the arm 282 is stopped. The arm 282 is also subject to urging force from the compression coil spring 278 via the bearing 276, but when the length direction other end portion of the arm 282 acts to turn in a descending direction (the clockwise direction in the drawings), the roller 284 may abut against the roller 286, such that the turning of the arm 282 is stopped.

Each part is specified such that, in this state, the-roller portion 36B of the charging roller 36 is not in contact with the conveyance belt 28, and a nipping portion between the roller 284 and the roller 286 is disposed at a height of a gap between the roller portion 36B and the conveyance belt 28. In this state, similarly to the eighth exemplary embodiment, the gap between the roller portion 36B and the conveyance belt 28 is at least 5 μm, and is preferably at least 20 μm.

Figure 27:
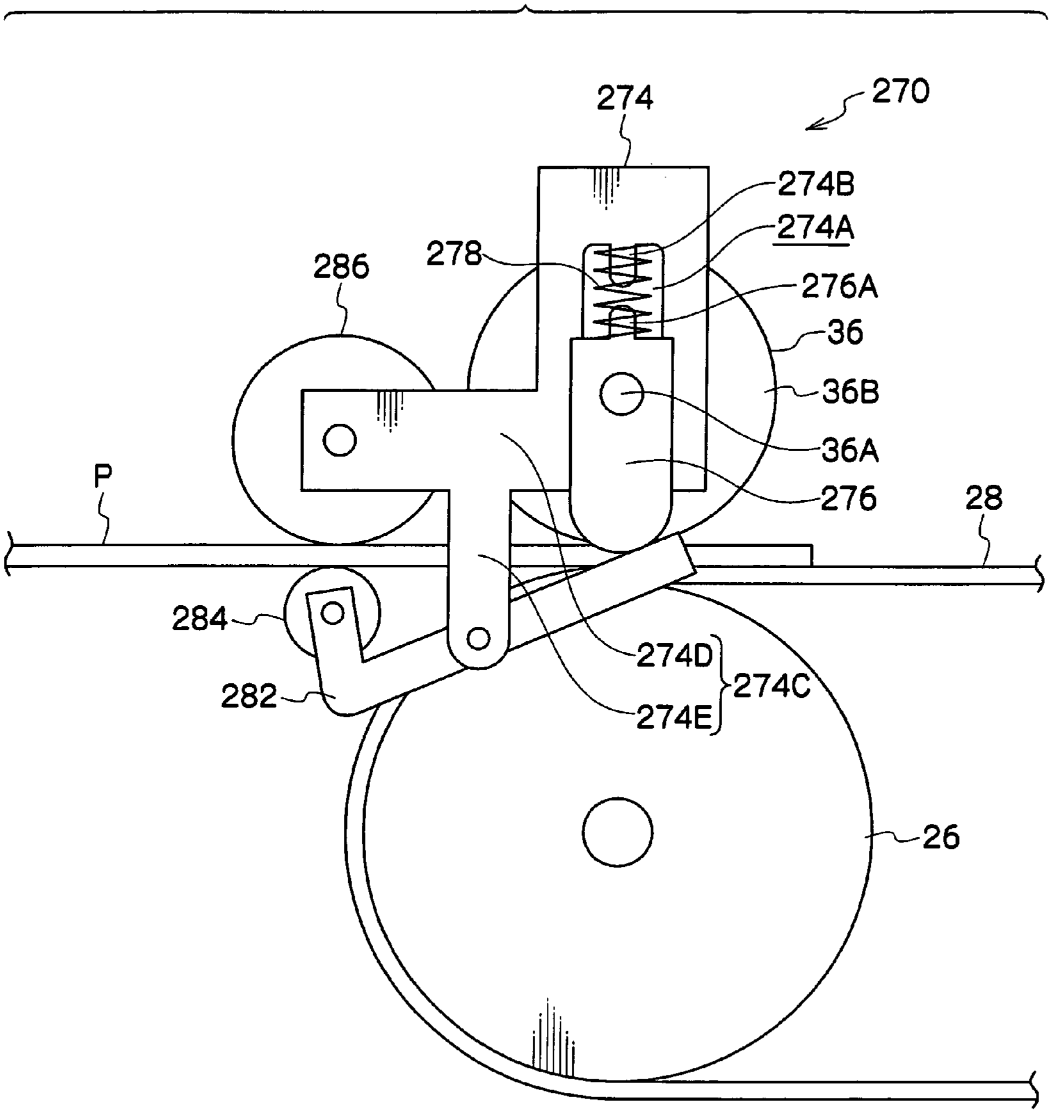
FIG. 27 is the side view of the charging roller unit which is provided at the inkjet recording device of the ninth exemplary embodiment of the present invention.

Hence, when paper P is conveyed into the nipping portion between the roller 284 and the roller 286, as shown in FIG. 27, the roller 284 is pushed downward by the paper P, by an amount corresponding to thickness of the paper P, and the arms 282 turn in the anti-clockwise direction of the drawings. As a result, the bearings 276 are pushed up and the charging roller 36 rises. Each part is specified such that at this time the gap between the roller portion 36B and the conveyance belt 28 is less than thickness of the paper P (and preferably not more than 0.6 times the thickness of the paper P).

In other words, the gap between the roller portion 36B and the conveyance belt 28 changes in accordance with the thickness of the paper P. Therefore, variations in forces from the charging roller 36 pushing the paper P toward the conveyance belt 28, which are caused by differences in thicknesses of papers P, may be suppressed. Thus, regardless of different thicknesses of the paper P, the paper P may be securely adhered to the conveyance belt 28.

Moreover, because the roller portion 36B touches the paper P that is being conveyed only while the paper P is passing between the charging roller 36 and the conveyance belt 28, and is not in contact with anything at other times, there is little frictional degradation thereof.

Furthermore, because there are no members around the charging roller 36 for touching the conveyance belt 28, such as the spacers 260 of the eighth exemplary embodiment, frictional degradation and conveyance loading of the conveyance belt 28 may be reduced.

Now, in the present exemplary embodiment, the link mechanism 280 which is displaced by an amount corresponding to thickness of the paper P is employed, and the charging roller 36 moves up and down in accordance with thickness of the paper P. However, the gap between the roller portion 36B and the conveyance belt 28 may also be increased/reduced by employing a motor, a solenoid or the like as a mechanism for displacing the charging roller 36, detecting thickness of the paper P with a sensor, and driving the motor, solenoid or the like in accordance with the detected thickness of the paper P. In such a case, it is preferable if the gap between the charging roller 36 and the conveyance belt 28 is set to be large in a state in which there is no paper P, in order to prevent adherence of ink, waste matter and the like to the charging roller 36, and is reduced to a desired gap when the paper P arrives.

Gap adjustment may also be carried out synchronously with paper selection by software at a time of printing execution. Further, a manual mechanism may be employed as the mechanism for displacing the charging roller 36, with a user carrying out gap adjustment by hand.

A structure in which the charging roller 36 presses the paper P against the conveyance belt 28 by gravity may also be applicable. For such a case, a structure in which the charging roller 36 is suspended at a position capable of abutting against thin paper and is moved upward therefrom by thick paper is sufficient. Thus, variations in force from the charging roller 36 pressing the paper P against the conveyance belt 28, which are caused by differences in thickness of the paper P, may be suppressed. Here, pressure force from the charging roller 36 may be adjusted by altering material, length and diameter of the rotation shaft 36A of the charging roller 36.

Next, tenth to fourteenth exemplary embodiments of the present invention will be described.

In an inkjet printer which is a droplet ejection device, paper P is pressed against a conveyance member, such as a conveyance belt, conveyance drum or the like, and charged by a charging unit, such as a charging roller or the like. An alternating electric field is formed at the conveyance member by the charging unit, and an electrostatic adherence force is generated between the paper and the conveyance member. Thus, the paper is adhered to the conveyance member. Hence, in this state, the paper is conveyed to an ink droplet ejection region of a recording head, and an image is recorded onto the paper. Thus, a distance between the paper and a nozzle face of the recording head (later referred to as TD, throwing distance) has high uniformity, accuracy of impact positions of ink drops on the paper is improved, and image quality is improved.

In recent years, with a view to further improving accuracy of impact positions of ink drops on paper, that is, realizing higher image quality, a narrowing of the distance between the paper and the nozzle face of the recording head to 1 to 2 mm has been implemented. However, for uniformity of TD to be high, it is necessary to strengthen the electrostatic adherence force between the paper and the conveyance member. Moreover, in order to prevent uniformity of TD falling because of environmental changes in temperature, humidity and the like and differences between varieties of paper, it is necessary to further strengthen the electrostatic adherence force between the paper and the conveyance member.

Figure 40:
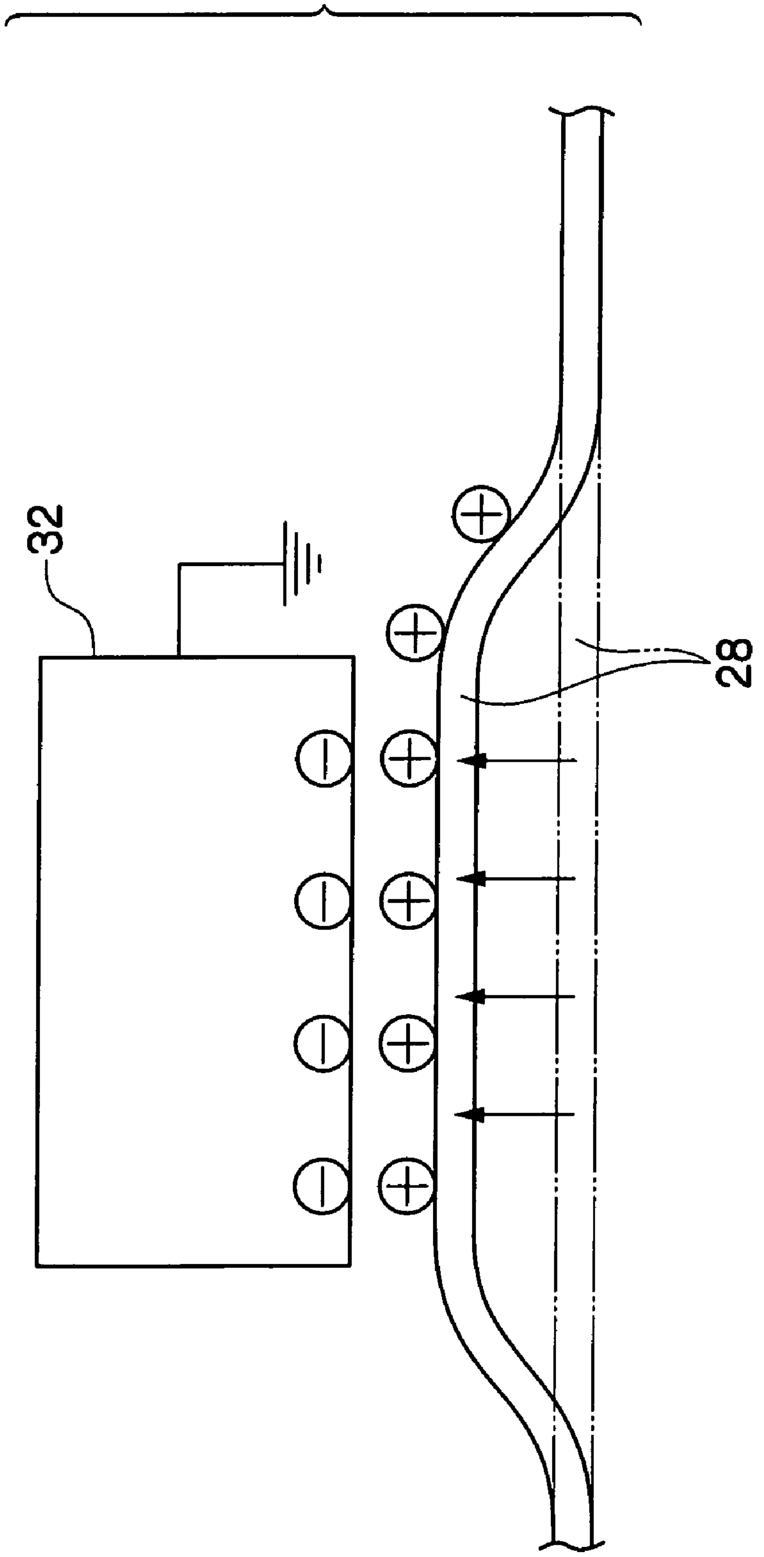
FIG. 40 is a side view schematically showing a recording head and a conveyance belt of a previous inkjet recording device.

Consequently, failures in separation of the paper from the conveyance belt may occur and, as shown in FIG. 40, an electrostatic adherence force which occurs between recording heads 32 and a conveyance belt 28 is strengthened and problems such as the conveyance belt 28 lifting and touching against the recording heads 32 may occur. If the conveyance belt 28 touches the recording heads 32, problems occur with the conveyance belt 28 being soiled with ink, ink being transferred from one recording head 32 to another recording head 32 via the conveyance belt 28, which causes color mixing, and foreign bodies that have adhered to the conveyance belt 28 ingressing through nozzles into the recording heads 32. In particular, in a system which, principally with a view to improving image quality, employs a transparent ink (reaction fluid) which mixes with inks, of the colors yellow (Y), magenta (M), cyan (C) and black (K), to cause an agglutination reaction (a "two-liquid system") or a system which causes different colors, for example, K and Y or the like, to mix together and react (an "ink-reaction system"), agglutination, color changes and the like of the inks may occur at the recording heads 32, and recovery therefrom is not possible.

Figure 41:
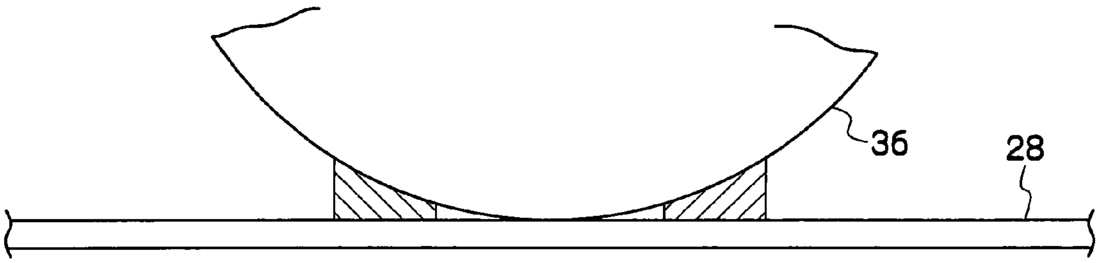
FIG. 41 is a side view schematically showing a state of discharging between a charging roller and a conveyance belt in a previous inkjet recording device.
Figure 42:
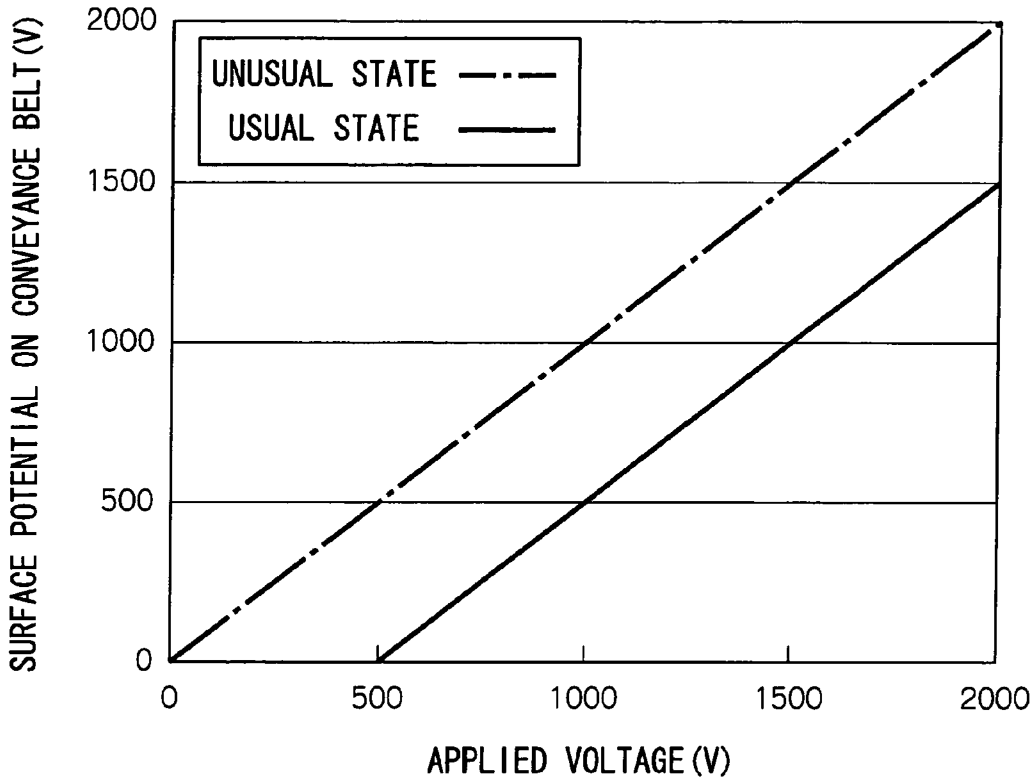
FIG. 42 is a graph showing relationships between voltages applied to a charging roller and surface potentials on a conveyance belt in a previous inkjet recording device.

As shown in FIG. 41, in a usual state, a region of contact between a charging roller 36 and the conveyance belt 28 has high resistance, and transfers of charge between the charging roller 36 and the conveyance belt 28 are realized by discharges in the region of a small gap between the charging roller 36 and the conveyance belt 28. However, if water droplets, ink droplets or the like adhere to the region of contact between the charging roller 36 and the conveyance belt 28, the resistance is lowered and charge transfers are implemented at this region. As a result, as shown in the graph of FIG. 42, surface potentials on the conveyance belt 28 in an unusual state are higher than in the usual state.

Now, a structure has been proposed which suppresses vibrations of a conveyance belt by pulling the conveyance belt to a side thereof opposite from a side thereof at which a recording head is disposed (see, for example, Japanese Patent Application Laid-Open (JP-A) No. 2002-145474). In the structure described in JP-A No. 2002-145474, a voltage is applied to a comb-like electrode incorporated in the conveyance belt, and electrostatic attraction forces are generated at both front and rear faces of the conveyance belt. Thus, a recording medium is adhered to the front face of the conveyance belt and the rear face of the conveyance belt is attracted to a member, which is a belt attraction member, that is disposed at the side of the conveyance belt that is opposite from the recording head side thereof.

In order to continuously apply high voltage to the electrode incorporated in the turning conveyance belt, the electrode is exposed along a turning direction of the belt and a conductive brush is rubbed against an exposed portion of the electrode. However, discharges tend to occur when high-voltage charging is being performed at a region of rubbing between the conductive brush and the electrode, and electromagnetic waves are generated in accordance with the discharges, which is a source of noise and also a cause of erroneous operations. Furthermore, the electrode and the conductive brush are damaged by occurrences of sparking at the region of rubbing between the conductive brush and the electrode, which greatly reduces lifespans thereof.

Herebelow, the tenth exemplary embodiment of the present invention will be described. Note that structures that are the same as in the first to ninth exemplary embodiments are assigned the same reference numerals, and descriptions thereof are not given.

Figure 28:
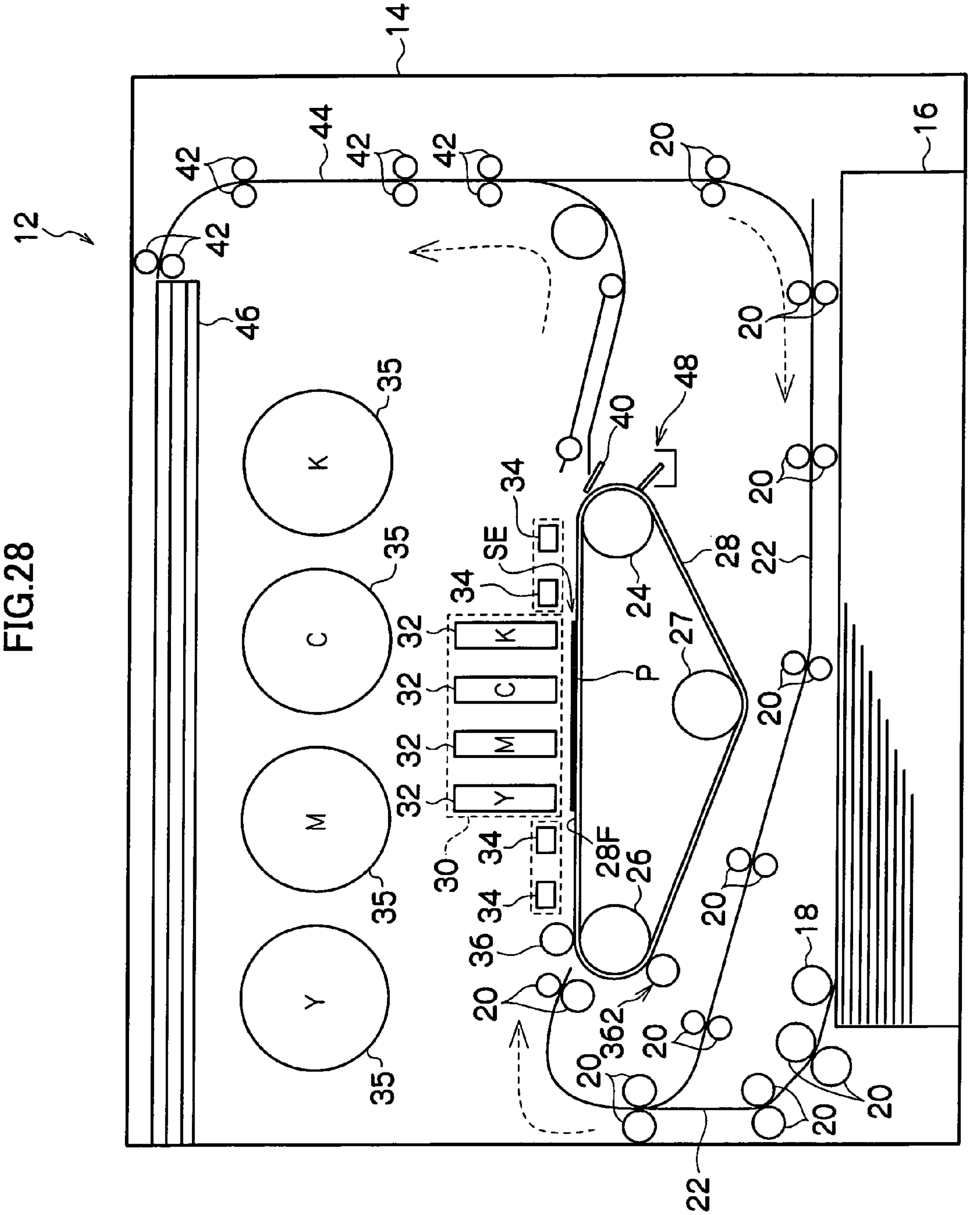
FIG. 28 is a side view showing general structure of an inkjet recording device of a tenth exemplary embodiment of the present invention.
Figure 29:
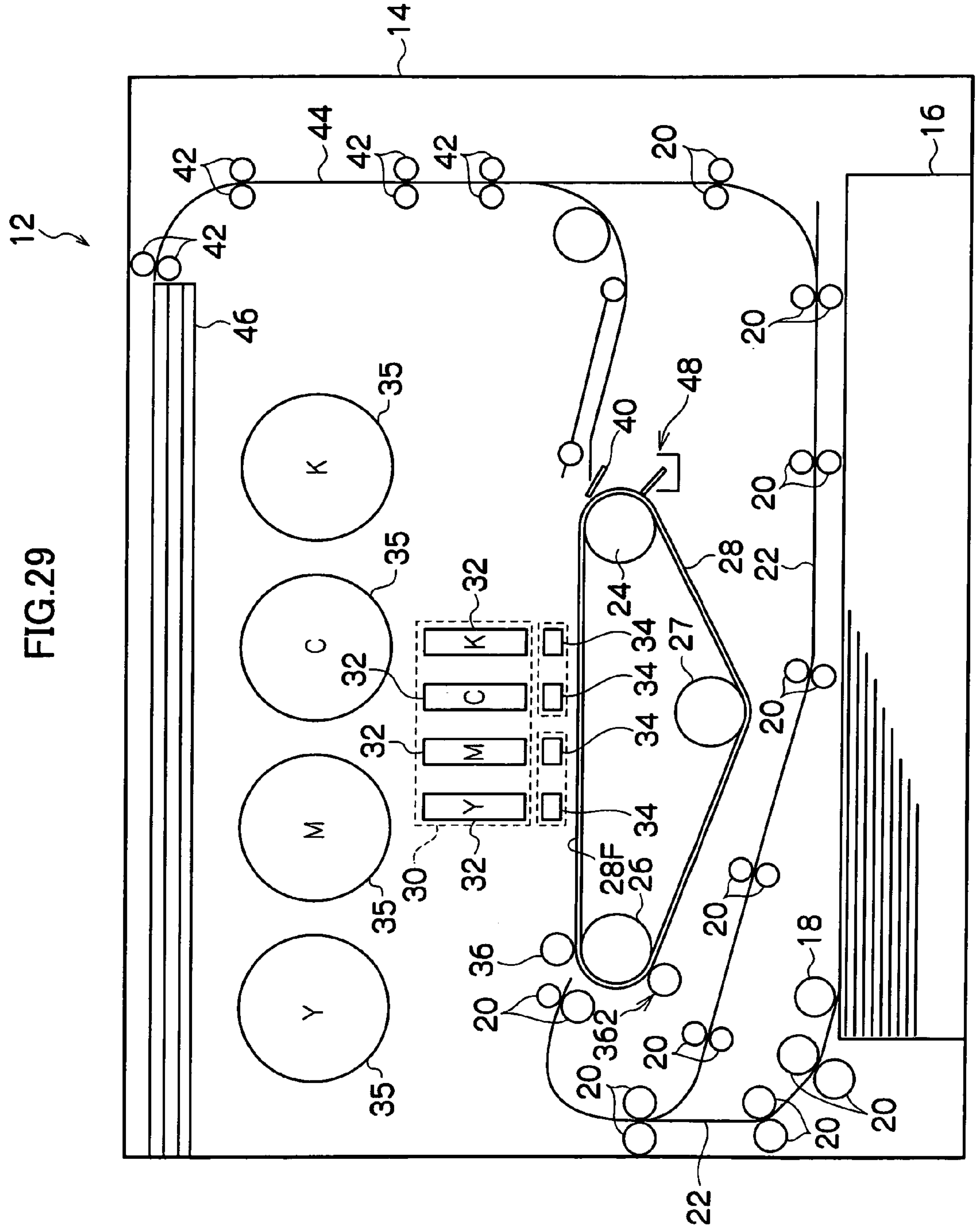
FIG. 29 is a side view showing general structure of the inkjet recording device of the tenth exemplary embodiment of the present invention.
Figure 30:
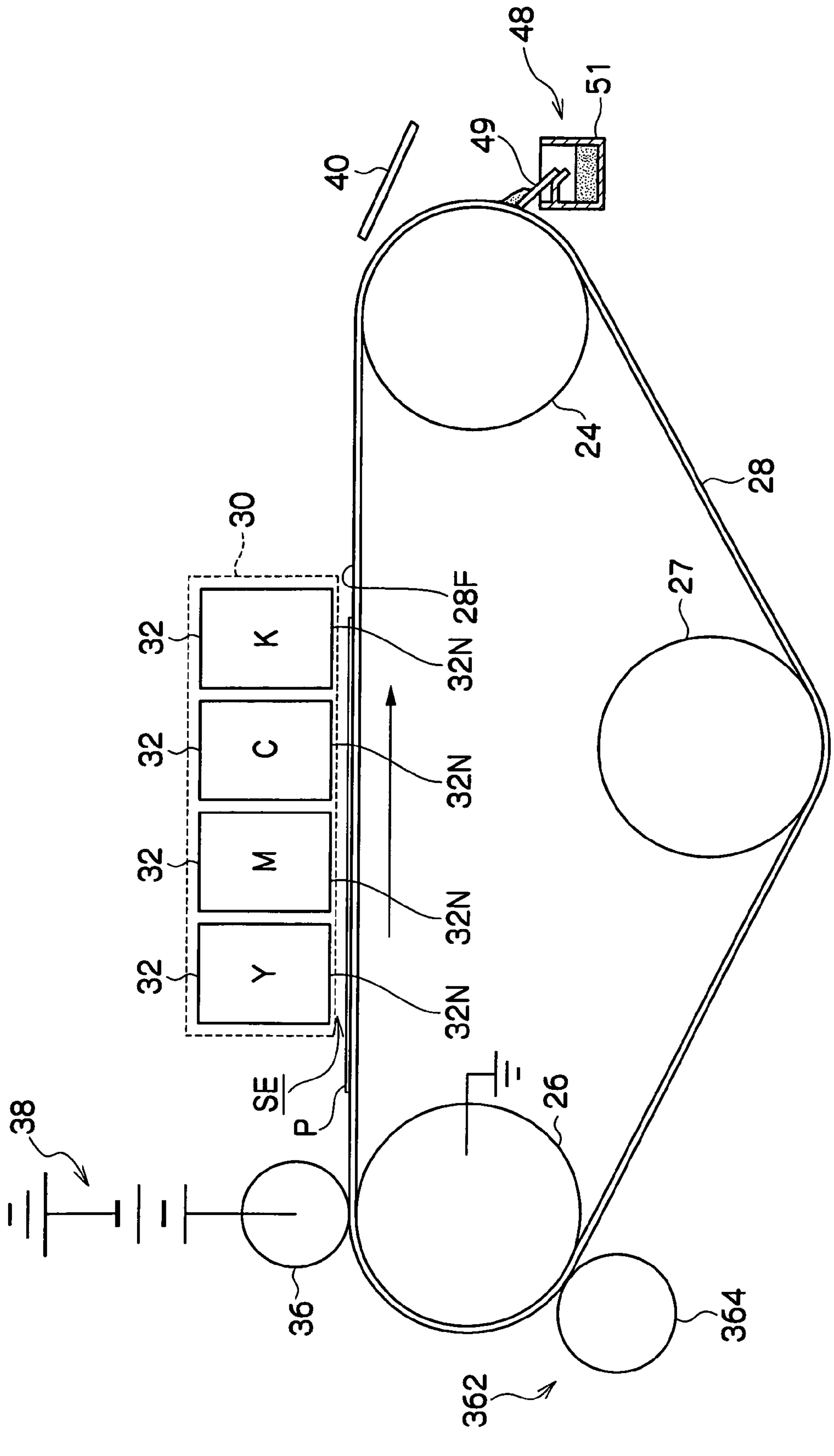
FIG. 30 is a side view showing general structure of a printing section of the inkjet recording device of the tenth exemplary embodiment of the present invention.

The silicone oil that is applied to the conveyance belt 28 shown in FIGS. 28 to 30 is insoluble with respect to aqueous liquids, and a surface tension thereof, being, for example, 20.8 mN/m, is lower than surface tensions of aqueous inks (for example, 30 mN/m), and surface tension of water (for example, 70 mN/m).

Figure 31A:
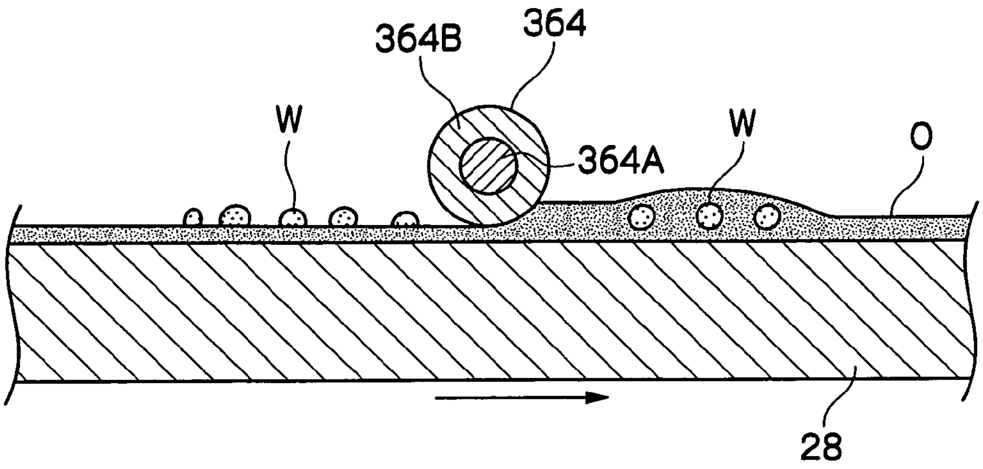
FIGS. 31A and 31B are sectional views enlargedly showing a charging roller and a conveyance belt which are provided at an inkjet recording device of the tenth exemplary embodiment of the present invention.
Figure 31B:
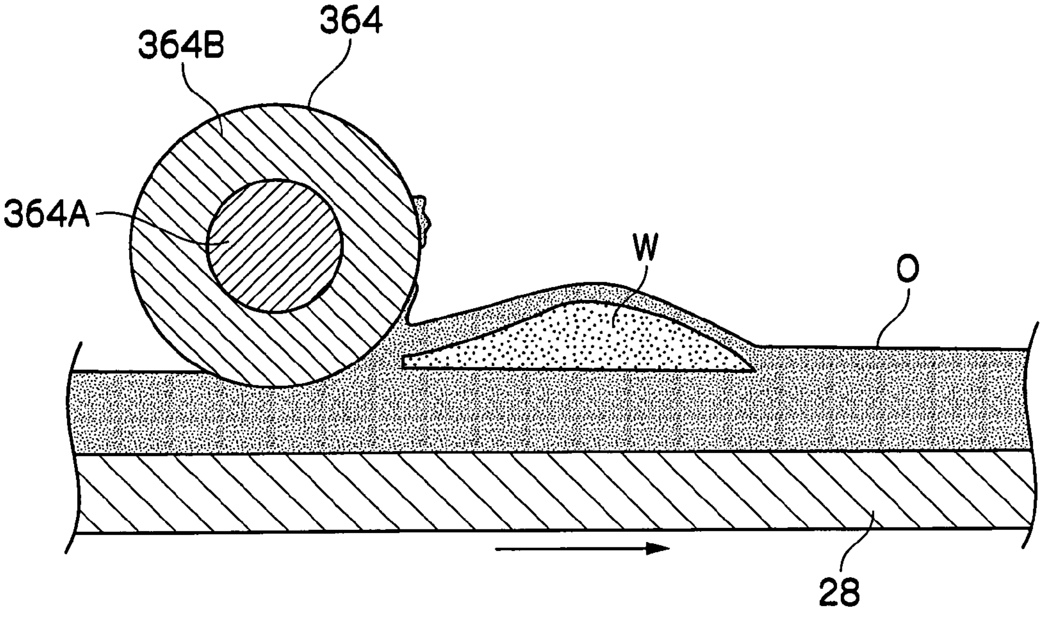

Consequently, as shown in FIGS. 31A and 31B, when aqueous liquid bodies W of water or the like, which are due to ink in mist form being generated when the recording heads 32 eject droplets, condensation and the like, adhere onto the conveyance belt 28, the silicone oil spreads over the aqueous liquid bodies W. That is, a layer O of silicone oil (below referred to as a coating layer) covers the aqueous liquid bodies W on the conveyance belt 28.

The silicone oil is a high-resistance, highly insulative liquid, with a volume resistivity of, for example, $10^{14}$ Ω·cm or more, and the coating layer O functions as an insulation layer. Therefore, even when aqueous liquid bodies W are interposed between the charging roller 36 and the conveyance belt 28, a region of contact between the charging roller 36 and the conveyance belt 28 always has high resistance, and transfers of charge between the charging roller 36 and the conveyance belt 28 are transfers by discharges in the range of the small gap between the charging roller 36 and the conveyance belt 28.

Consequently, surface potential on the conveyance belt 28 may be prevented from rising unusually. Hence, charge amounts on the conveyance belt 28 may be made larger and TD (the distance between the paper and the nozzle face at the recording head, i.e., the throwing distance) may be made tighter, while the conveyance belt 28 and the recording head 32 are prevented from touching. As a result, impact precision of ink droplets on the paper P may be improved, whereby image quality may be further improved.

Figure 32A:
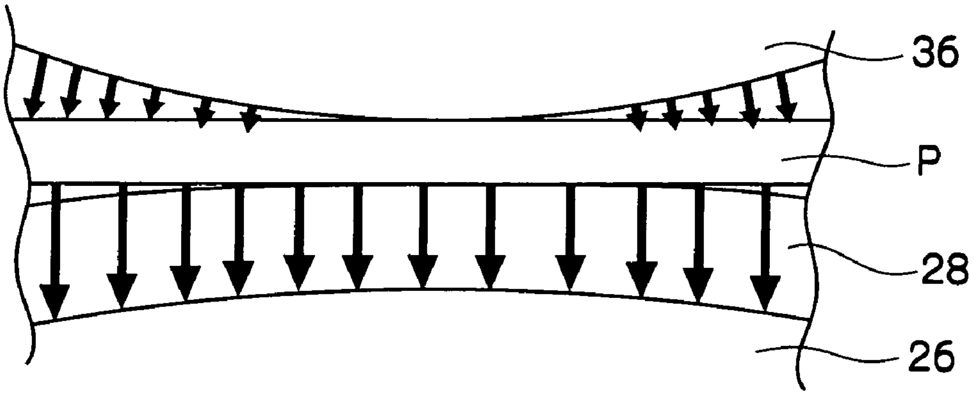
FIGS. 32A and 32B are another sectional views enlargedly showing the charging roller and the conveyance belt which are provided at the inkjet recording device of the tenth exemplary embodiment of the present invention.
Figure 32B:
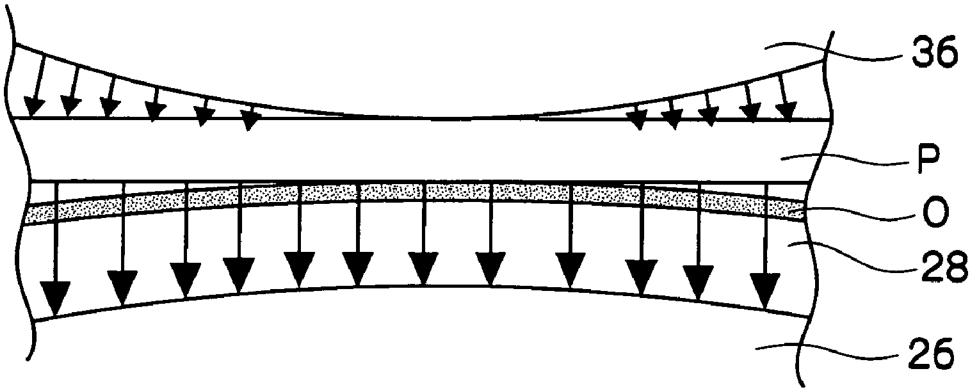

Anyway, as shown in FIGS. 32A and 32B, when the paper P is interposed between the charging roller 36 and the conveyance belt 28, charge transfer between the charging roller 36 and the paper P is implemented by discharges in the region of the small gap, and charge transfers are implemented between the paper P and the conveyance belt 28 at portions of contact between the paper P and the conveyance belt 28. Charge transfer amounts at the contact portions between the paper P and the conveyance belt 28, and discharge charging amounts between the charging roller 36 and the paper P have a proportional relationship.

Therefore, as shown in FIG. 32A, the lower the resistance of contact portions between the paper P and the conveyance belt 28, the greater are discharge charging amounts between the charging roller 36 and the paper P, and the more likely unusual charging is to occur. On the other hand, as shown in FIG. 32B, because the high-resistance, highly insulative coating layer O is formed between the paper P and the conveyance belt 28 in the present exemplary embodiment, an increase in discharge charging amounts between the charging roller 36 and the paper P may be suppressed, and occurrences of unusual charging may be prevented.

Furthermore, the electrostatic adherence force between the paper P and the conveyance belt 28 is generated by a potential difference between the paper P and the conveyance belt 28. The potential difference between the paper P and the conveyance belt 28 may be maintained for a longer time by suppressing transfers of charge from the paper P to the conveyance belt 28, and thus the electrostatic adherence force between the paper P and the conveyance belt 28 may be maintained for a longer time.

The oil-coating unit 362 is disposed at the upstream side in the turning direction of the conveyance belt 28 with respect to the charging roller 36 and at the downstream side in the turning direction of the conveyance belt 28 with respect to the belt-cleaning unit 48. Thus, adherence of ink to an oil-coating roller 364 may be suppressed. Further, in each cycle of the conveyance belt 28, the coating layer O on the conveyance belt 28 is removed by the belt-cleaning unit 48 and the coating layer O is formed anew on the conveyance belt 28 by the oil-coating unit 362. Therefore, control of thickness of the coating layer O is simple.

The oil-coating roller 364 may be a driving roller. In such a case, the oil-coating roller 364 may avoid slipping with respect to the conveyance belt 28. Further, a unit for applying a liquid with high volume resistivity such as silicone oil or the like (below referred to as a high-resistance liquid) is not limited to a roller as in the present exemplary embodiment, and could be substituted with another structure, such as a web or the like.

For the conveyance belt 28, a belt which is formed of a rubber material, such as a resin such as PET, PI, PA, PC or the like or a rubber such as CR, NBR, HNBR, urethane rubber or the like, and has a surface resistance value of $10^8$ to $10^{13}$ Ω·cm and a volume resistivity of $10^9$ to $10^{14}$ Ω·cm may be employed.

For the charging roller 36, a roller with a diameter of 10 to 25 mm, in which a resilient layer in which a conductive donor material is dispersed is formed at an outer peripheral face of a rod-form or pipe-form cylinder, a material of which is aluminium, stainless steel or the like, to adjust volume resistivity to around $10^4$ to $10^8$ Ω·cm, or the like may be employed.

As a material of the resilient layer, a resin material such as a urethane-based resin, a thermoplastic elastomer, an epichlorhydrine rubber, an ethylene-propylene-diene copolymer rubber, an acrilonitrile-butadiene copolymer rubber, a polynorbornene rubber or the like may be used singly or in a combination of two or more thereof, with a urethane foam resin being preferable.

Furthermore, the surface of the resilient layer may be covered with a water-repellent skin layer with a thickness of 5 to 100 μm. In such a case, interactivity with the high-resistance liquid, particular changes due to adherence of ink mist and the like (changes in volume resistivity and suchlike), and the like may be suppressed.

As the high-resistance liquid, silicone oil is employed as described above, and aqueous inks are employed for the inks. Here, the high-resistance liquid is preferably a liquid with a volume resistivity of at least $10^{12}$ Ω·cm, and a liquid with a volume resistivity of at least $10^{14}$ Ω·cm is more preferable. At the very least, a liquid with a higher volume resistivity than the inks is desirable, and a liquid whose volume resistivity is at least equivalent to the conveyance belt 28 is desirable. Because the volume resistivity of the high-resistance liquid is higher than the inks, when water or an aqueous fluid such as an ink or the like intervenes between the charging roller 36 and the conveyance belt 28, falls in electrical resistance at contact portions between the charging roller 36 and the conveyance belt 28 and contact portions between the paper P and the conveyance belt 28 may be suppressed. Therefore, transfers of charge at contact portions between the charging roller 36 and the conveyance belt 28 may be suppressed, and unusual rises in electrostatic potential of the conveyance belt 28 may be suppressed. Furthermore, because transfers of charge at contact portions between the paper P and the conveyance belt 28 may be suppressed, transfers of charge by discharges from the charging roller 36 to the paper P may be suppressed, and unusual rises in electrostatic potential of the paper P may be suppressed.

Moreover, because the volume resistivity of the high-resistance liquid is at least equivalent to the volume resistivity of the conveyance belt 28, electrical resistance at contact portions between the charging roller 36 and the conveyance belt 28 is always equivalent to or greater than when water or an aqueous fluid such as ink or the like intervenes. Therefore, unusual rises in electrostatic potential of the conveyance belt 28 and the paper P may be further suppressed.

For the high-resistance liquid, a liquid which repels ink is suitable. With aqueous inks, beside silicone oil, the following may be employed: higher fatty acids such as oleic acid, linoleic acid and the like; plasticizers such as dibutyl phthalate, dienedecyl phthalate, dibutyl maleate and the like; non-aqueous alcohols such as n-decanol, dimethyl butanol and the like; and liquids that feature water-repellence such as fluorine oils, mineral oils, plant oils and the like. These may be used singly, and may be used in a mixture of a number of types, providing the types are homogeneously mixed. With oil-based inks, a liquid with high ink-repellence, such as water or the like, is employed.

For the coating of the high-resistance liquid onto the conveyance belt 28 to be stabilized, a dynamic viscosity of the high-resistance liquid is preferably in the range 10 to $10^5$ $mm^2$/s, more preferably in the range 50 to $102^2$ $mm^2$/s.

Furthermore, if a coating thickness of the high-resistance liquid is too thick, adverse effects will be exerted on image quality, by oil soaking into the paper P and the paper P repelling ink, leading to a degradation of image quality when printing on a rear face, or the like. On the other hand, if the coating thickness of the high-resistance liquid is too thin, it will not be possible to form the coating layer O stably. Therefore, it is necessary to set a coating thickness of the high-resistance liquid to a suitable range. A suitable range of coating thickness of the high-resistance liquid is 1 nm to 20 μm. However, in order to stably form the coating layer, 10 nm or more is desirable, and in order to reduce adherence of the high-resistance liquid to the paper P, 2 μm or less is desirable.

For a color of the high-resistance liquid, in order to reduce an effect on image quality when the high-resistance liquid adheres to the paper P, colorless transparency is desirable.

It is also desirable that the high-resistance liquid is non-volatile at ordinary temperatures. Specifically, a vapor pressure at 25° C. is not more than 13.33 Pa. It is further desirable that the high-resistance liquid has the characteristic of not being soluble with aqueous fluids such as the inks and the like. Specifically, a solubility with respect to aqueous fluids such as the inks and the like at an ordinary temperature (25° C.) is not more than 0.1% by weight.

Further yet, surface tension of the high-resistance liquid is preferably not more than 30 mN/m, and more preferably not more than 25 mN/m. It is desirable that the high-resistance liquid spreads over the conveyance belt 28. Thus, the relationship of the following equation (1) is desirable. Therein, surface tension of the coating layer O is $\gamma_o$ and a critical surface tension of the conveyance belt 28 is $\gamma_b$. Here, critical surface tension refers to a surface tension at which, in a relationship between surface tensions of various liquids and contact angles θ with a solid surface, cos θ is corrected to 1 (that is, when the contact angle of the liquid with respect to the solid surface reaches 0°). In general, a solid surface will be thoroughly wetted by a liquid with a surface tension smaller than the critical surface tension of the surface.

$$\gamma_o < \gamma_b \tag{1}$$

For the high-resistance liquid to be provided with water-repellence, the relationship of the following equation (2) is desirable. Here, a surface tension of ink I is $\gamma_i$.

$$\gamma_o < \gamma_i \tag{2}$$

Consequently, the high-resistance liquid spreads over the conveyance belt 28 from over the ink. For the present exemplary embodiment: the conveyance belt 28 is formed as a belt made of polyimide in which carbon is dispersed, with the critical surface tension $\gamma_b$ being 43 mN/m, width×circumference×thickness being 365 mm×762 mm×75 μm and volume resistivity being $5\times10^{13}$ Ω·cm; the high-resistance liquid is silicone oil with volume resistivity being $10^{14}$ Ω·cm, surface tension $\gamma_o$ being 20.8 mN/m and dynamic viscosity being 100 $mm^2$/s; thickness of the coating layer O is 0.05 μm; the inks are aqueous pigment inks with volume resistivity being $10^2$ Ω·cm and surface tension $\gamma_i$ being around 30 mN/m; a voltage applied to the charging roller 36 is +1500 V DC; a distance d between the conveyance belt 28 and a nozzle face 32N of each recording head 32 (TD) is 1.5 mm; and a surface area S of the conveyance belt 28 that opposes the nozzle face 32N of each recording head 32 is 0.1 $m^2$. Furthermore, an inter-paper spacing during continuous printing is set to 44 mm, a printing rate is 90 sheets per minute for A4 size, a processing speed is 15 inches/second, and dummy-jetting of all nozzles of the recording head 32 of each color is performed 200 times at one minute intervals, between papers. In such conditions, if printing is performed continuously for 30 minutes, no jams at all occur.

In contrast, if printing is performed without performing the application of silicone oil onto the conveyance belt 28 but with other conditions being the same as in the present exemplary embodiment, electrostatic potential of the conveyance belt 28 is about twice that in the present exemplary embodiment.

Given the above, with the present exemplary embodiment, charging amounts of the conveyance belt 28 may be made larger and the TD may be made tighter while avoiding contact between the conveyance belt 28 and the nozzle faces 32N of the recording heads 32. Therefore, impact precision of ink droplets on the paper P may be further improved, whereby image quality may be further improved.

Further, because a force to urge the conveyance belt 28 to the side thereof that is opposite from the side at which the recording head 32 is disposed is not necessary, and the earlier-mentioned structure described in JP-A No. 2002-145474 is not required, occurrences of discharges around the conveyance belt 28 may be suppressed, and problems with electromagnetic waves may be suppressed. Further still, because occurrences of sparking around the conveyance belt 28 may be prevented, damage to the conveyance belt 28 may be suppressed and reductions in lifespan of the conveyance belt 28 may be suppressed.

Next, the eleventh exemplary embodiment of the present invention will be described. Note that structures that are the same as in the first to tenth exemplary embodiments are assigned the same reference numerals, and descriptions thereof are not given.

Figure 33:
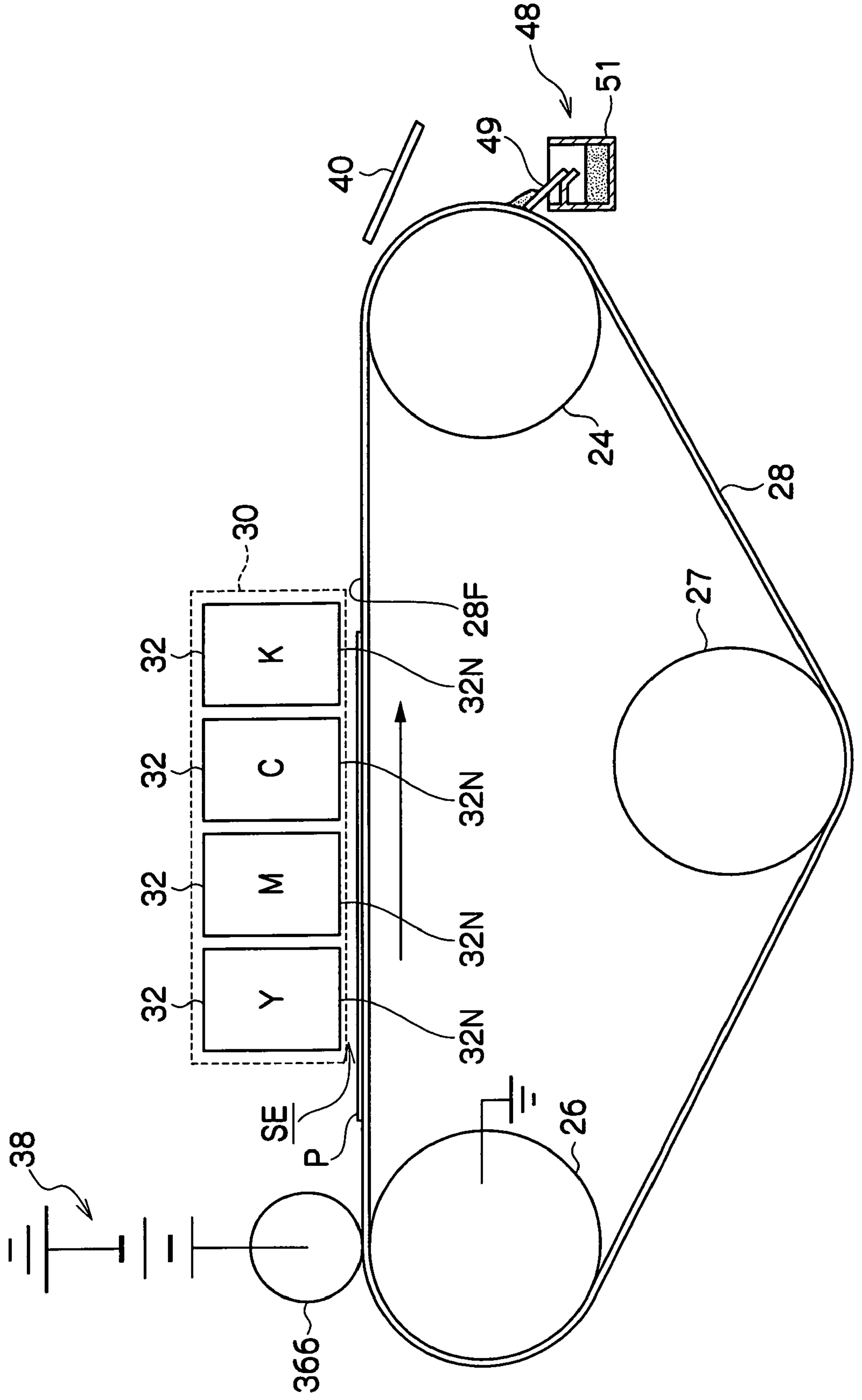
FIG. 33 is a side view showing general structure of a printing section of an inkjet recording device of an eleventh exemplary embodiment of the present invention.

As shown in FIG. 33, a charging roller 366, to which the power supply 38 is connected, is disposed at the upstream side of the recording head array 30. The charging roller 366 nips the conveyance belt 28 and the paper P between the charging roller 366 and the driven roller 26 and follows the same, and presses the paper P against the conveyance belt 28. At this time, because there is a predetermined potential difference between the charging roller 366 and the driven roller 26, which is connected to earth, charge is provided to the paper P, and the paper P is electrostatically adhered to the conveyance belt 28.

Figure 34:
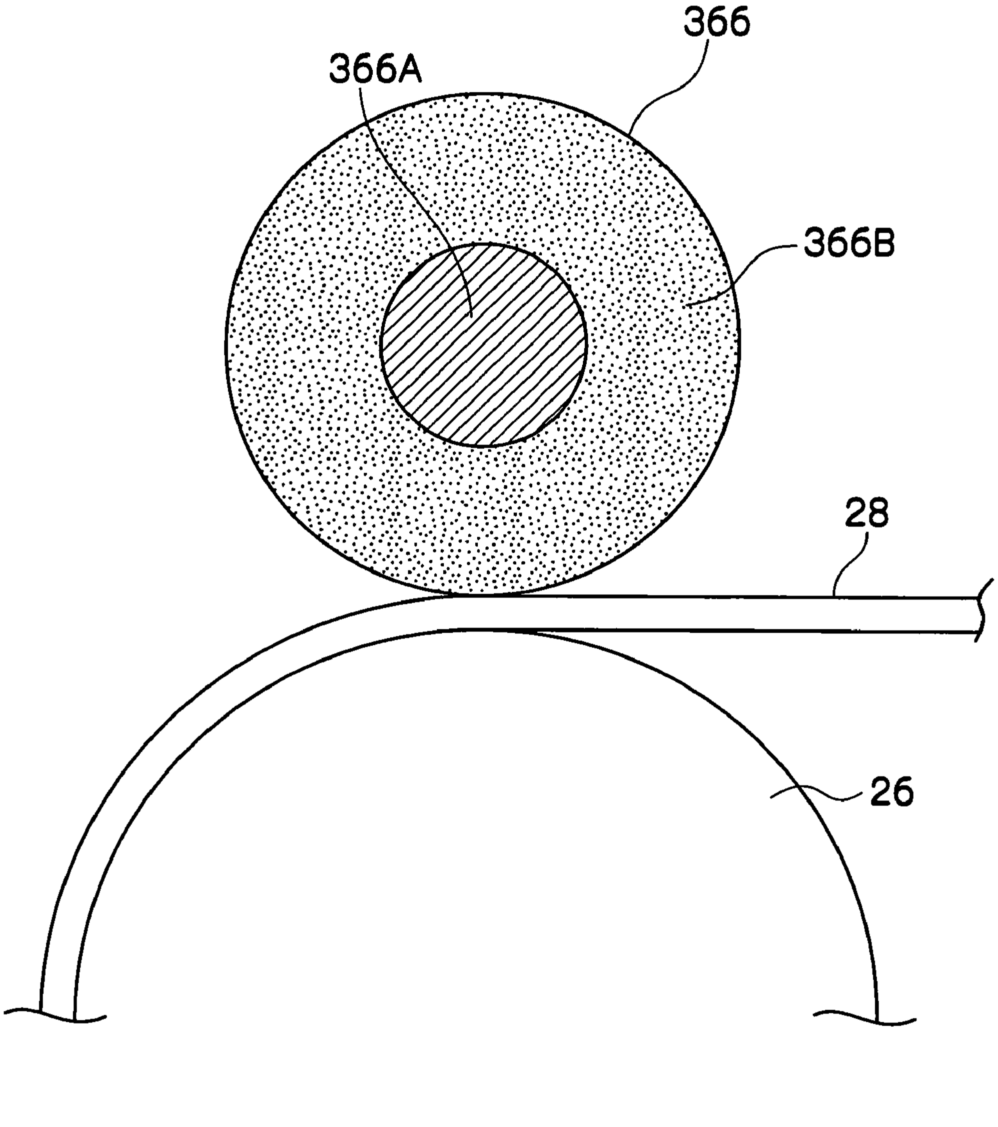
FIG. 34 is a sectional view enlargedly showing a charging roller and a conveyance belt which are provided at the inkjet recording device of the eleventh exemplary embodiment of the present invention.

As shown in FIG. 34, for the charging roller 366, a roller with a diameter of 10 to 25 mm, in which a resilient layer 366B in which a conductive donor material is dispersed is formed at an outer peripheral face of a rod-form or pipe-form cylinder 366A, a material of which is aluminium, stainless steel or the like, to adjust volume resistivity to around $10^3$ to $10^{10}$ Ω·cm, or the like may be employed.

As a material of the resilient layer 366B, for example, the following may be employed: a resin such as polyester, polyamide, polyethylene (PE), PC, polyolefin, polyurethane, vinylidene polyfluoride, PI, poly ethylene naphthalate (PEN), poly ether ketone (PEK), poly ether sulphone (PES), polyphenylene sulfide (PPS), tetrafluoroethylene perfluoroalkoxy vinyl ether copolymer (PFA), poly vinylidine difluoride (PVdF), ethylene tetrafluoroethylene copolymer (ETFE), chlorotrifluoro ethylene (CTFE) or the like or synthetic rubber such as silicone rubber, ethylene propylene rubber (EPDM), ethylene propylene rubber, butyl rubber, acryl rubber, urethane rubber, acrylonitrile butadiene rubber (NBR) or the like, into which an ion conduction material such as carbon black, a metallic powder, a conductive powder of a metal oxide or the like, a quaternary ammonium salt or the like is mixed in.

During formation of the resilient layer 366B, the resilient layer 366B is given a sponge-like porosity by a well-known technique, such as a gas interfusion process, a foaming agent decomposition process, a solvent dispersal process, a chemical reaction process or the like. Thus, the resilient layer 366B is provided with suitable resilience and suitable liquid absorbency.

Sparking discharges are likely to occur if the volume resistivity is $10^2$ Ω·cm or less, and dot-form charging dropouts are likely to occur if the volume resistivity is $10^{11}$ Ω·cm or more. Therefore, the volume resistivity is adjusted to a range of $10^3$ to $10^{10}$ Ω·cm.

Further, in consideration of restraint of the voltage that is applied to the charging roller 366 from the power supply 38, suppression of variations in potential when the device is performing high-speed printing with a process speed of 150 mm/s or more, and suchlike, it is desirable to adjust the volume resistivity to a range of $10^4$ to $10^8$ Ω·cm.

Now, silicone oil is impregnated into the resilient layer 366B. Therefore, when aqueous fluid intervenes between the conveyance belt 28 and the charging roller 366, such as mist-form ink which is generated when the recording heads 32 are ejecting ink droplets, water due to condensation, or the like, a layer of silicone oil is interposed between the aqueous fluid on the conveyance belt 28 and the resilient layer 366B.

Because the silicone oil is a high-resistance, highly insulative liquid with a volume resistivity of, for example, $10^{16}$ Ω·cm or more, the silicone oil functions as an insulation layer. Therefore, similarly to the tenth exemplary embodiment, even when aqueous liquid is interposed between the charging roller 366 and the conveyance belt 28, a region of contact between the charging roller 366 and the conveyance belt 28 always has high resistance, and transfers of charge between the charging roller 366 and the conveyance belt 28 are transfers by discharges in the region of the small gap between the charging roller 366 and the conveyance belt 28.

Consequently, surface potential on the conveyance belt 28 may be prevented from rising unusually. Hence, charge amounts on the conveyance belt 28 may be made larger and the TD may be made tighter, while the conveyance belt 28 and the recording heads 32 are prevented from touching. As a result, impact precision of ink droplets on the paper P may be improved, whereby image quality may be further improved.

For the conveyance belt 28, a belt similar to that of the tenth exemplary embodiment may be employed. Further, as the liquid which is impregnated into the resilient layer 366B (below referred to as a the high-resistance liquid), silicone oil is employed as mentioned earlier, and aqueous inks are employed for the inks.

Anyway, a high-resistance liquid, inks and the conveyance belt 28 that are the same as in the tenth exemplary embodiment can be employed. For the present exemplary embodiment: the conveyance belt 28 is formed as a belt made of PI in which carbon is dispersed, with the critical surface tension $\gamma_b$ being 43 mN/m, width×circumference×thickness being 365 mm×762 mm×75 μm and volume resistivity being $5\times10^{13}$ Ω·cm; the high-resistance liquid is silicone oil with volume resistivity being $10^{13}$ Ω·cm, surface tension $\gamma_o$ being 20.8 mN/m and dynamic viscosity being 100 $mm^2/s$; thickness of the coating layer O is 0.05 μm; the inks are aqueous pigment inks with volume resistivity being $10^3$ Ω·cm and surface tension $\gamma_i$ being around 30 mN/m; a voltage applied to the charging roller 36 is +1500 V DC; a distance d between the conveyance belt 28 and the nozzle face 32N of the recording head 32 (TD) is 1.5 mm; and a surface area S of the conveyance belt 28 that opposes the nozzle face 32N of the recording head 32 is 0.1 $m^2$. Furthermore, an inter-paper spacing during continuous printing is set to 44 mm, a printing rate is 90 sheets per minute for A4 size, a processing speed is 15 inches/second, and dummy-jetting of all nozzles of the recording head 32 of each color is performed 200 times at one minute intervals, between papers. In such conditions, if printing is performed continuously for 30 minutes, no jams at all occur.

In contrast, if printing is performed using a charging roller which is not impregnated with silicone oil but with other conditions being the same as in the present exemplary embodiment, electrostatic potential of the conveyance belt 28 is about twice that in the present exemplary embodiment.

Given the above, charging amounts of the conveyance belt 28 may be increased and the TD may be made tighter while avoiding contact between the conveyance belt 28 and the nozzle faces 32N of the recording heads 32. Therefore, impact precision of ink droplets on the paper P may be further improved, whereby image quality may be further improved.

Next, the twelfth exemplary embodiment of the present invention will be described. Note that structures that are the same as in the first to eleventh exemplary embodiments are assigned the same reference numerals, and descriptions thereof are not given.

Figure 35:
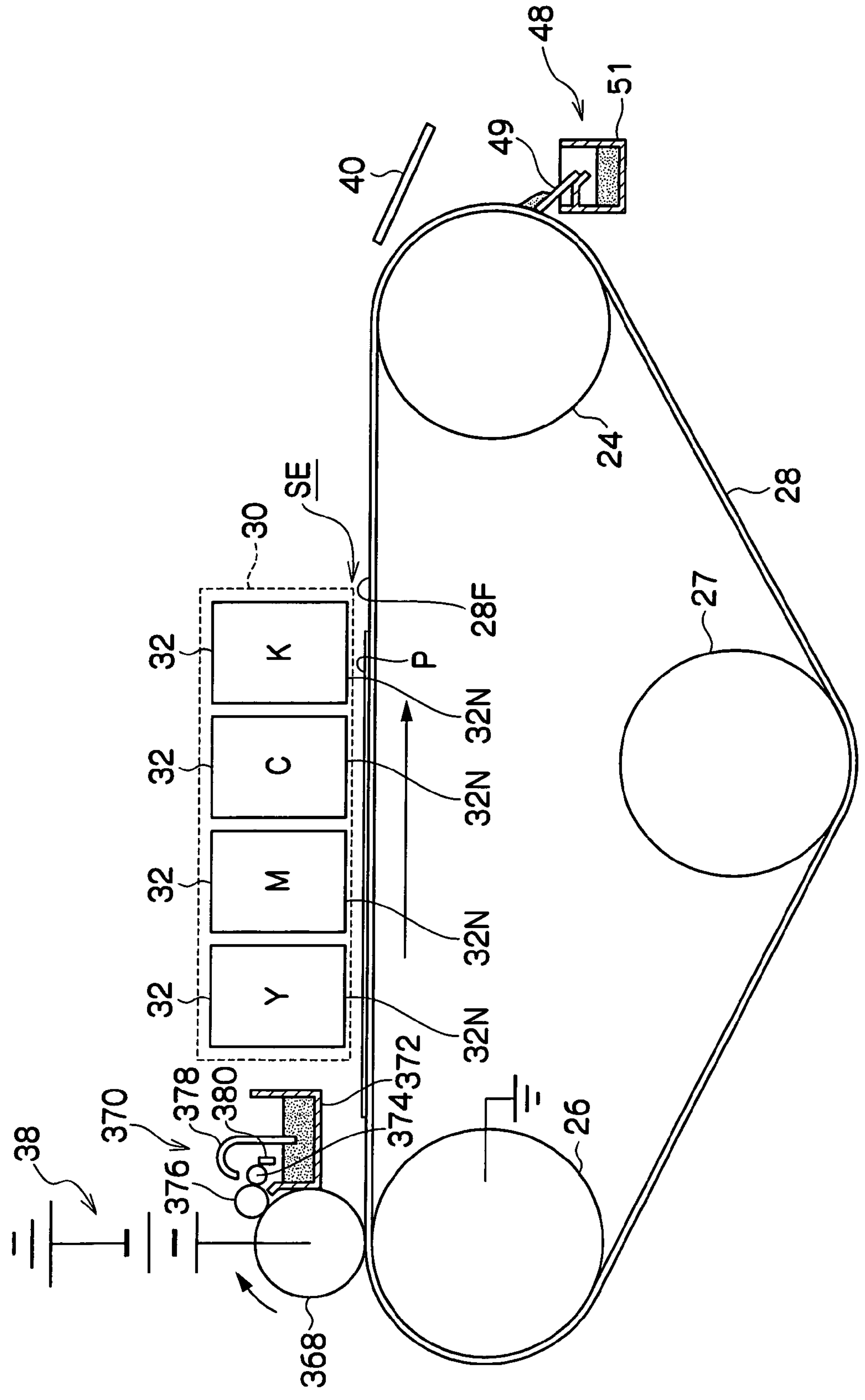
FIG. 35 is a side view showing general structure of a printing section of an inkjet recording device of a twelfth exemplary embodiment of the present invention.

As shown in FIG. 35, a charging roller 368, to which the power supply 38 is connected, is disposed at the upstream side of the recording head array 30. The charging roller 368 nips the conveyance belt 28 and the paper P between the charging roller 368 and the driven roller 26 and follows the same, and presses the paper P against the conveyance belt 28. At this time, because there is a predetermined potential difference between the charging roller 368 and the driven roller 26, which is connected to earth, charge is provided to the paper P, and the paper P may be electrostatically adhered to the conveyance belt 28.

Figure 36A:
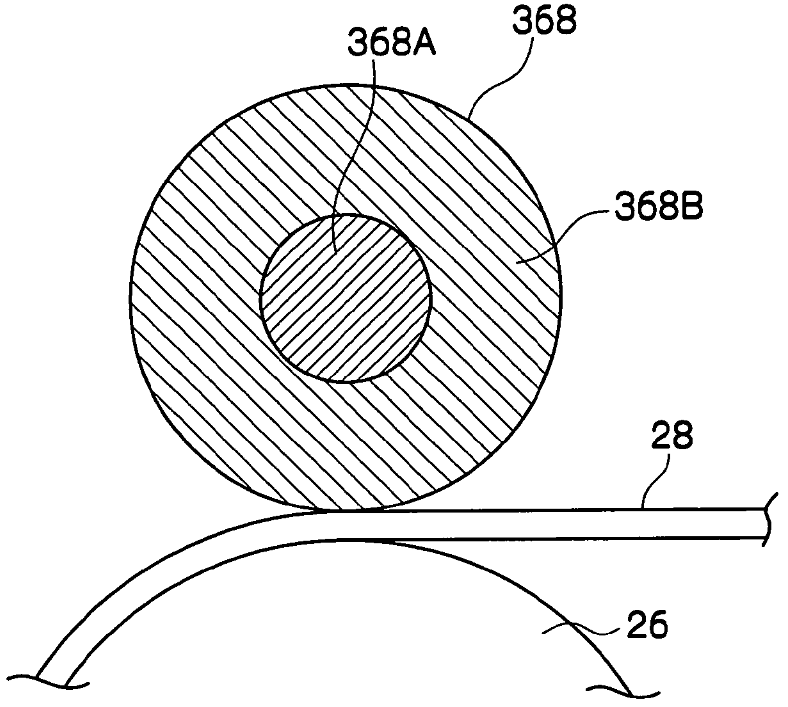
FIGS. 36A and 36B are sectional views enlargedly showing charging rollers and conveyance belts which are provided at inkjet recording devices of the eleventh exemplary embodiment of the present invention.

As shown in FIG. 36A, for the charging roller 368, a roller with a diameter of 10 to 25 mm, in which a resilient layer 368B in which a conductive donor material is dispersed is formed at an outer peripheral face of a rod-form or pipe-form cylinder 368A, a material of which is aluminium, stainless steel or the like, to adjust volume resistivity to around $10^3$ to $10^{10}$ Ω·cm, or the like may be employed.

Here, rather than a porosity treatment being applied to the resilient layer 368B, the resilient layer 368B is solid and resistant to impregnation of liquids. Accordingly, as shown in FIG. 35, silicone oil is supplied to the surface of the charging roller 368 by an oil supply unit 370, and thus an insulation layer is interposed between the charging roller 368 and the conveyance belt 28.

The oil supply unit 370 is provided with a case 372, a first roller 374, a second roller 376, a take-up member 378 and a regulation blade 380. The case 372 accommodates silicone oil. The first roller 374 is rotatably supported at the case 372. The take-up member 378 is supported at the case 372. The first roller 374 and second roller 376 are arranged to be parallel with the charging roller 368, the second roller 376 abuts against the surface of the charging roller 368, and the first roller 374 and second roller 376 abut together.

The take-up member 378 is a member with high absorbency, such as felt or the like, which extends from a bottom portion of the case 372 to above the second roller 376. A lower side end portion of the take-up member 378 is immersed in the silicone oil in the case 372, and an upper side end portion of the take-up member 378 is bent over in a hook form and oriented toward an upper face of the first roller 374. Further, the take-up member 378 extends in the axial direction of the first roller 374 from one end to the other end of the first roller 374. Hence, the silicone oil in the case 372 is sucked up by the take-up member 378 and dripped onto the upper face of the first roller 374 over the whole range thereof in the axial direction.

The regulation blade 380 is a plate member which extends along the axial direction of the first roller 374 and abuts against the whole range of the axial direction of the first roller 374. Herein, the regulation blade 380 is disposed at a downstream side in a direction of rotation of the first roller 374 relative to the position at which silicone oil drips from the take-up member 378 and at the upstream side in the direction of rotation of the first roller 374 relative to a portion that abuts against the second roller 376. Therefore, the silicone oil that has dripped from the take-up member 378 onto the first roller 374 is spread by the regulation blade 380, and the silicone oil on the first roller 374 is set to a predetermined thickness.

The silicone oil that has been set to the predetermined thickness is transferred from the first roller 374 to the second roller 376, and is transferred from the second roller 376 to the charging roller 368. Thus, a layer of silicone oil with a predetermined thickness is formed on the charging roller 368.

Figure 37A:
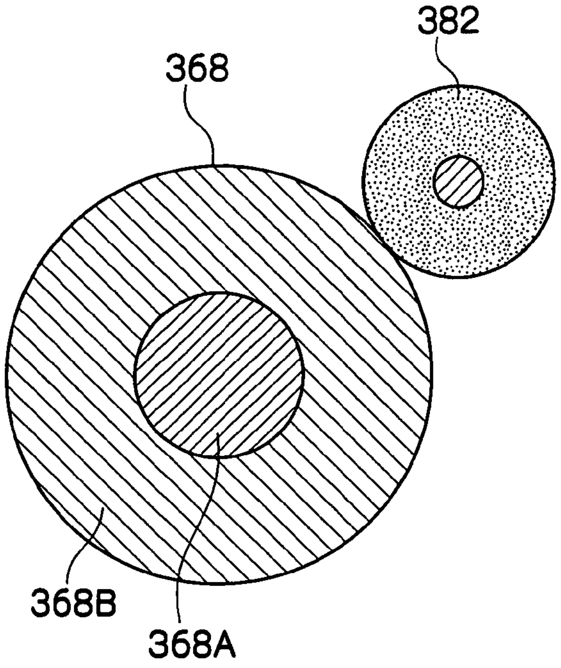
FIGS. 37A and 37B are sectional views showing variant examples of oil-coating units which are provided at inkjet recording devices of the eleventh exemplary embodiment of the present invention.
Figure 37B:
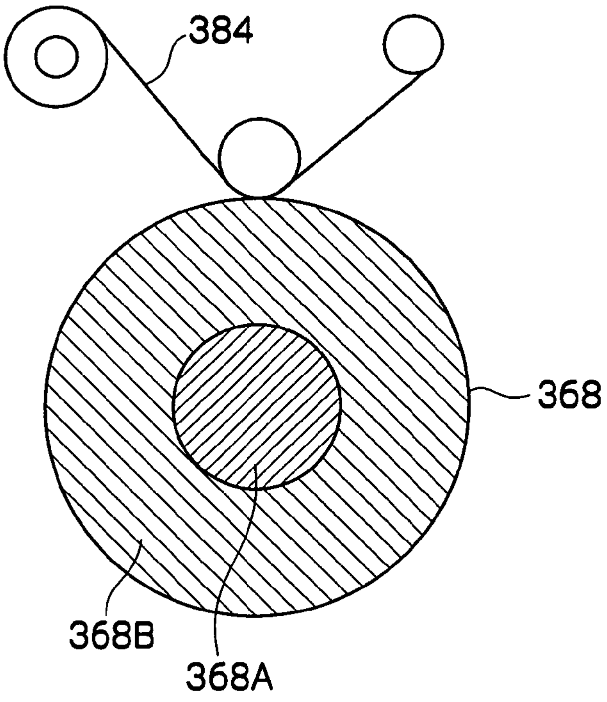

A structure for supplying a high-resistance liquid such as silicone oil or the like to the charging roller 368 is not limited to the structure of the present exemplary embodiment. As shown in FIG. 37A, a structure may be also applicable in which a roller 382 which is impregnated with the high-resistance liquid is abutted against the charging roller 368 and, as shown in FIG. 37B, a structure may be also applicable in which a web 384 which is impregnated with the high-resistance liquid is abutted against the charging roller 368.

Figure 36B:
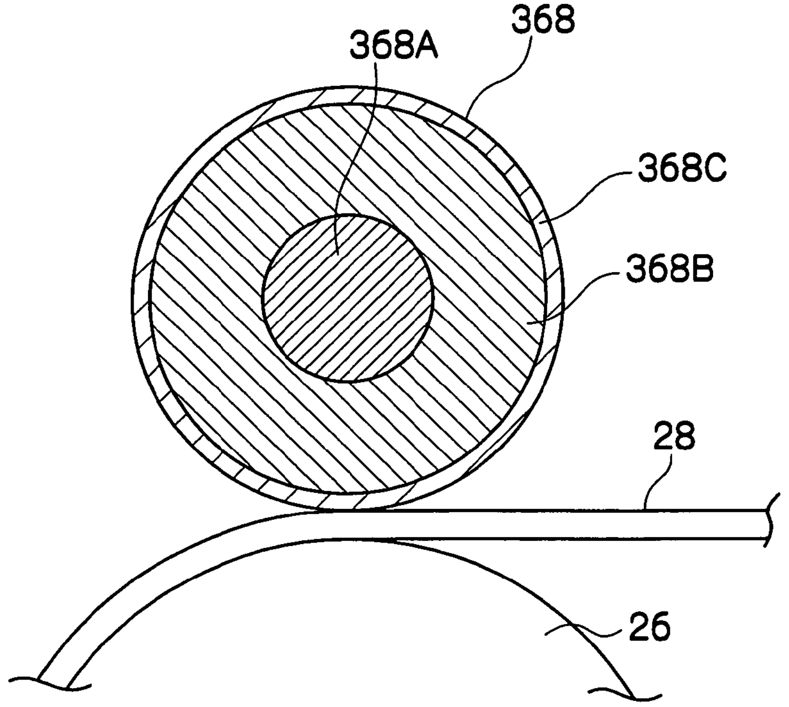

In the present exemplary embodiment, the resilient layer 368B of the charging roller 368 is made solid. If a skin layer 368C is present at the surface of the resilient layer 368B as shown in FIG. 36B, similarly to with the solid resilient layer 368B, it is not possible for liquid to impregnate and exude from the surface. Thus, the structure of the present exemplary embodiment in which the high-resistance liquid is applied to the surface of the resilient layer 368B is appropriate.

A layer thickness of the silicone oil that is transferred from the charging roller 368 to the conveyance belt 28 may be adjusted by altering materials, abutting pressures and the like of the charging roller 368, the first roller 374, the second roller 376 and the regulation blade 380, and is desirably 1 nm to 20 μm and more desirably 10 nm to 2 μm. If the layer of silicone oil on the conveyance belt 28 is excessively thick, amounts adhering to the paper P will be large and various problems will occur, such as problems with adherence of ink droplets to the paper P, it not being possible to apply labels to the paper P after printing, and so forth. On the other hand, if the layer of silicone oil on the conveyance belt 28 is excessively thin, it will not be possible to realize the effect of preventing unusual charging.

Now, in the present exemplary embodiment, because charging is performed with the paper P being nipped by the charging roller 368 and the conveyance belt 28, the silicone oil is applied to the paper P from the charging roller 368. In general, depending on the type of paper P, amounts of silicone oil that are applied to the paper P from the charging roller 368 will be larger than amounts of silicone oil that are applied to the conveyance belt 28 from the charging roller 368. Therefore, it is desirable if an upper limit of the layer thickness of the silicone oil that is transferred from the charging roller 368 to the conveyance belt 28 is adjusted to half of the above-mentioned 20 μm or 2 μm.

Next, the thirteenth exemplary embodiment of the present invention will be described. Note that structures that are the same as in the first to twelfth exemplary embodiments are assigned the same reference numerals, and descriptions thereof are not given.

Figure 38:
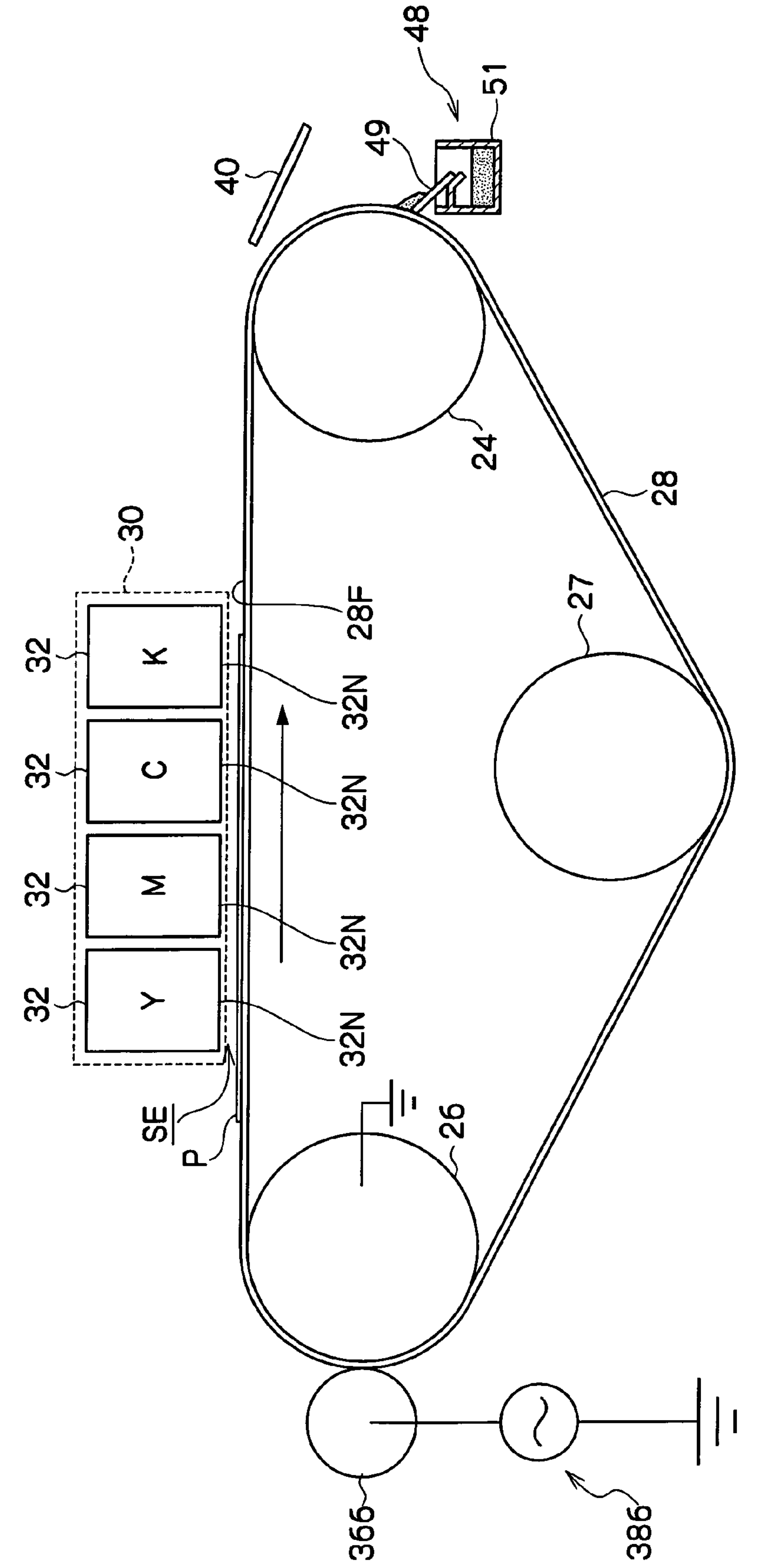
FIG. 38 is a side view showing general structure of a printing section of an inkjet recording device of a thirteenth exemplary embodiment of the present invention.

As shown in FIG. 38, the charging roller 366, to which an AC power supply 386 is connected, abuts against a portion of the conveyance belt 28 that is wound round the driven roller 26, at a lower side of the conveyance path of the paper P. A sine wave of ±2000 V AC with frequency 50 Hz is applied from the AC power supply 386 to the charging roller 366, and a positive-negative alternating electric field, whose period is 7.62 mm, is formed at the conveyance belt 28. Then, the paper P is conveyed on the conveyance belt 28 at which the alternating electric field has been formed, and the paper P is electrostatically adhered to the conveyance belt 28 by this alternating electric field.

If printing is performed continuously over 30 minutes with conditions such as the high-resistance liquid, inks, device functions, the conveyance belt 28 and the like being the same as in the eleventh exemplary embodiment, no jams at all occur. In contrast, if printing is carried out using a charging roller which is not impregnated with silicone oil, with other conditions being the same as in the present exemplary embodiment, positive and negative peak values of electrostatic potentials of the conveyance belt 28 are twice those of the present exemplary embodiment.

Given the above, charging amounts of the conveyance belt 28 may be increased and the TD may be made tighter while avoiding contact between the conveyance belt 28 and the nozzle faces 32N of the recording heads 32. Therefore, impact precision of ink droplets on the paper P may be further improved, whereby image quality may be further improved.

Next, the fourteenth exemplary embodiment of the present invention will be described. Note that structures that are the same as in the first to thirteenth exemplary embodiments are assigned the same reference numerals, and descriptions thereof are not given.

Figure 39:
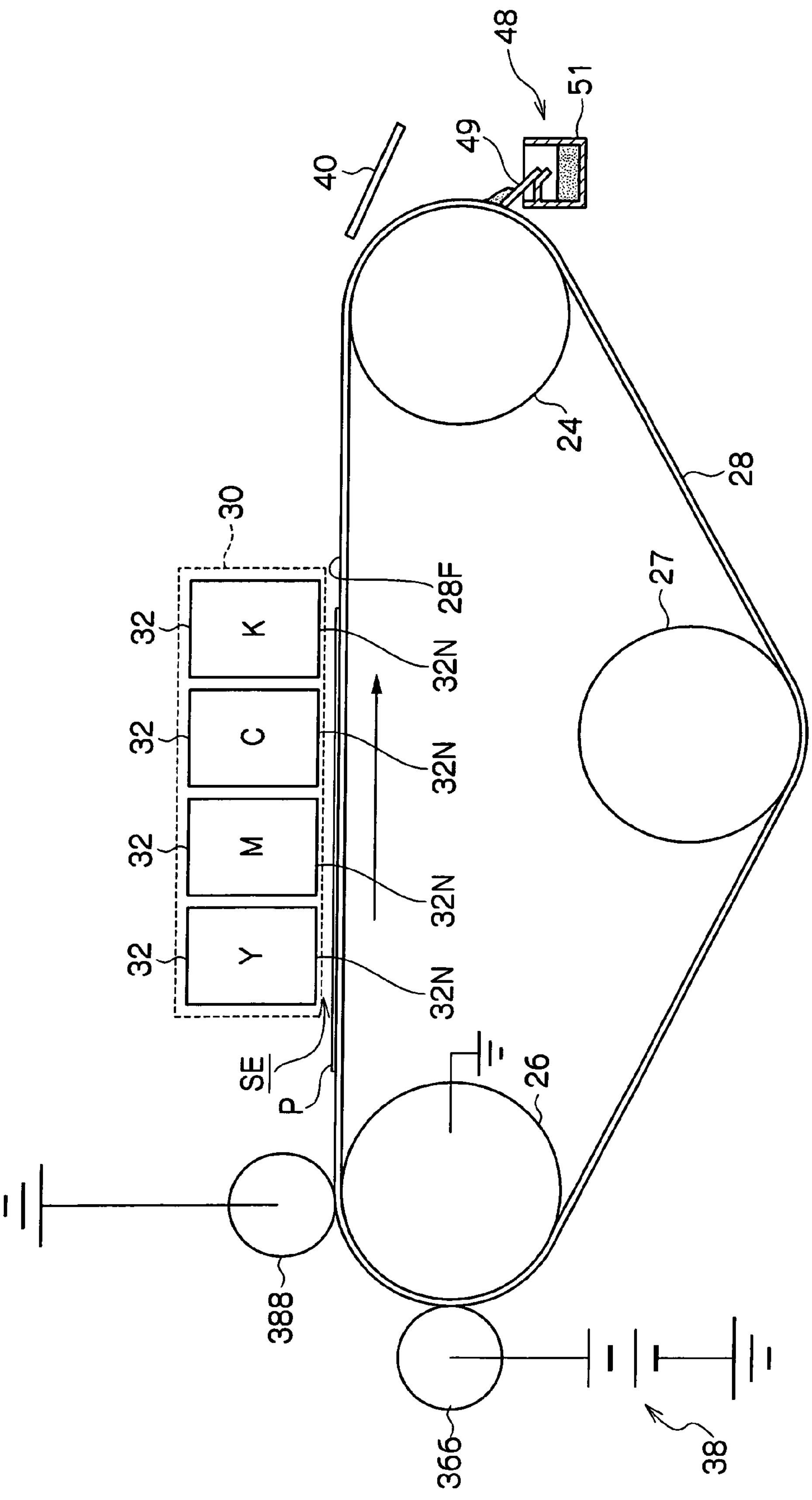
FIG. 39 is a side view showing general structure of a printing section of an inkjet recording device of a fourteenth exemplary embodiment of the present invention.

As shown in FIG. 39, the charging roller 366, to which the power supply 38 is connected, abuts against the portion of the conveyance belt 28 that is wound round the driven roller 26, at the lower side of the conveyance path of the paper P. A voltage of ±1500 V DC is applied from the power supply 38 to this charging roller 366.

In addition, a pressure roller 388, which is connected to earth, is disposed at the upstream side of the recording head array 30. The pressure roller 388 nips the conveyance belt 28 and the paper P between the pressure roller 388 and the driven roller 26 and follows the same, and presses the paper P against the conveyance belt 28. Here, a charge of opposite polarity to the charge of the surface of the conveyance belt 28 is applied to the surface of the paper P. Thus, the paper P is electrostatically adhered to the conveyance belt 28.

If printing is performed continuously over 30 minutes with conditions such as the high-resistance liquid, inks, device functions, the conveyance belt 28 and the like being the same as in the eleventh exemplary embodiment, no jams at all occur. In contrast, if printing is carried out using a charging roller which is not impregnated with silicone oil, with other conditions being the same as in the present exemplary embodiment, electrostatic potential of the conveyance belt 28 is twice that of the present exemplary embodiment.

Given the above, charging amounts of the conveyance belt 28 may be increased and the TD may be made tighter while avoiding contact between the conveyance belt 28 and the nozzle faces 32N of the recording heads 32. Therefore, impact precision of ink droplets on the paper P may be further improved, whereby image quality may be further improved.

Note that the present invention has been described for the first to fourteenth exemplary embodiments taking an inkjet recording device as an example. However, the present invention is not limited to inkjet recording devices, and is applicable to general liquid droplet ejection apparatuses which are employed for various industrial applications, such as fabrication of a color filter for a display, in which colored ink is discharged onto a polymer film, formation of an electroluminescent display panel, in which an organic EL solution is discharged onto a substrate, and so forth.

Further, a "recording medium", which is the object of image recording in the droplet ejection device of the present invention, is broadly defined, as long as the recording medium is a target for the ejection of droplets by a droplet ejection head. Accordingly, the recording medium, beside obviously including recording papers, OHP sheets and suchlike, also includes, for example, polymer films and so forth.

Further again, in the droplet ejection device of the present invention, the "conveyance member" is broadly defined, as long as it is a member which retains and conveys a recording medium. For example, a drum which retains a recording medium at a peripheral face thereof and rotates, a table which retains a recording medium and moves reciprocatingly, and so forth are included.

Further yet, in the first to fourteenth exemplary embodiments, the present invention has been described by taking as an example a structure in which inkjet recording heads shorter than a width of paper P are plurally arranged in the width direction of the paper P to form a unit. However, this is not a limitation. For example, the present invention is also applicable to a structure in which an inkjet recording head which is shorter than the width of the paper P is moved in the width direction of the paper P, and so forth.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the chart. The exemplary embodiments were chosen and described in order to best explain the principles of the invention and its practical applications, thereby enabling others skilled in the art to utilize the invention in various embodiments and with various modifications as are suited to the particular use contemplated. It is intended that the scope of the invention be defined by the following claims and their equivalents.

According to an aspect of the invention, there is provided a droplet ejection device including: a droplet ejection head that ejects droplets; a conveyance member that retains a recording medium and conveys the recording medium to oppose the droplet ejection head; a cleaning unit that cleans the conveyance member; and a coating unit that coats coating liquid, with a characteristic of repelling liquid that is ejected from the droplet ejection head, onto the conveyance member, wherein a surface tension $\gamma_o$ of the coating liquid, a critical surface tension $\gamma_b$ of the conveyance member, and a surface tension $\gamma_i$ of the liquid that is ejected from the droplet ejection head satisfy the following equations (1) and (2):

$$\gamma_o<\gamma_b \quad (1)$$

$$\gamma_o<\gamma_i \quad (2).$$

In the invention relating to the first aspect of the present invention, the recording medium is retained at the conveyance member and conveyed to oppose the droplet ejection head, and the droplet ejection head ejects liquid droplets. Thus, an image or the like is recorded at the recording medium.

The coating liquid is applied to the conveyance member by the coating unit, to form a film of the coating liquid. Because this coating liquid features the characteristic of repelling the liquid that is ejected from the droplet ejection head, liquid that is ejected from the droplet ejection head and adheres on the film of coating liquid agglomerates on the film of coating liquid. As a result, adherence forces between the liquid that has been ejected from the droplet ejection head and the conveyance member may be suppressed, and when the conveyance member is being cleaned by the cleaning unit, the liquid that has been ejected from the droplet ejection head and adhered onto the conveyance member may be separated from the conveyance member with ease.

Now, the objective of suppressing adherence forces between the liquid ejected from the droplet ejection head and the conveyance member is achieved as long as the coating liquid is formed over the whole surface of the conveyance member, and making the film thickness of the coating liquid thicker does not contribute to achieving this objective. Accordingly, quantities of the coating liquid that are supplied to the conveyance member may be reduced. Thus, consumption amounts of the coating liquid may be reduced, and a coating liquid recovery mechanism may be made smaller and simpler. Therefore, costs may be reduced and an increase in size of the device may be suppressed.

With the structure described above, characteristics of cleaning of the conveyance member by the cleaning unit may be improved, and an increase in costs and an increase in size of the device may be restrained.

Further, in the above-described first aspect, a charging unit may be included that, without touching the conveyance member, electrostatically adheres the recording medium to the conveyance member by electrostatically charging the conveyance member and the recording medium.

According to the structure described above, the recording medium is retained at the conveyance member and conveyed to oppose the droplet ejection head, and the droplet ejection head ejects droplets. As a result, an image or the like is recorded at the recording medium. In this case, the conveyance member and the recording medium are charged by the charging unit, and electrostatically adhered together. Thus, uniformity of a distance between the droplet ejection head and the recording medium is enhanced, and accuracy of impact positions of droplets on the recording medium is enhanced.

Further, the coating liquid is coated onto the conveyance member by the coating unit, to form a film of the coating liquid. Because this coating liquid features the characteristic of repelling the liquid that is ejected from the droplet ejection head, the liquid that is ejected from the droplet ejection head and adheres on the film of coating liquid agglomerates on the film of coating liquid. Therefore, adherence forces between the liquid ejected from the droplet ejection head and the conveyance member may be suppressed, and when the conveyance member is being cleaned by the cleaning unit, the liquid that has been ejected from the droplet ejection head may be separated from the conveyance member with ease.

Here, the charging unit is not in contact with the conveyance member, such that the coating liquid on the conveyance member will not adhere to the charging unit. Therefore, alterations in charging characteristics of the charging unit may be suppressed, and stability of charging may be improved. Moreover, degradation due to friction and the like is reduced, and therefore the lifespan of the charging unit is extended.

Furthermore, there is no need to give consideration to the combination of a material of the charging unit and a type of the coating liquid. Thus, a degree of freedom of selection of the material of the coating unit and selection of the coating fluid is broadened, which leads to cost reductions and improvements in charging capability and cleaning capability.

Further still, transfers of charge between the charging unit and the conveyance member are all transfers by discharges. Thus, an unusual rise in surface potential on the conveyance member may be prevented, and in a case in which the conveyance member is a conveyance belt, drawing of the conveyance belt toward the droplet ejection head by electrostatic forces may be suppressed.

According to the structure described above, cleaning capability of the conveyance member by the cleaning unit may be improved, and changes in charging capability of the charging unit which electrostatically adheres the recording medium to the conveyance member may be suppressed.

In the above-described first aspect, a charging unit may be included that electrostatically adheres the recording medium onto the conveyance member by electrostatically charging at least one of the conveyance member and the recording medium on the conveyance member, and the coating liquid may be a high-resistance liquid with a higher volume resistivity than the liquid that is ejected from the droplet ejection head.

According to the structure described above, the recording medium is retained at the conveyance member and conveyed to oppose the droplet ejection head, and the droplet ejection head ejects droplets. As a result, an image or the like is recorded at the recording medium. In this case, at least one of the conveyance member and the recording medium on the conveyance member is charged by the charging unit, and the recording medium is electrostatically adhered to the conveyance member. Thus, uniformity of a distance between the droplet ejection head and the recording medium is enhanced, and accuracy of impact positions of droplets on the recording medium is enhanced.

Here, the high-resistance liquid with higher volume resistivity than the liquid ejected from the droplet ejection head is interposed between the charging unit and the conveyance member. Therefore, a fall in electrical resistance between the charging unit and the conveyance member when the liquid ejected from the droplet ejection head, or liquid droplets or the like, intervenes between the charging member and the conveyance member is restrained. As a result, excessive charging of the conveyance member by the charging unit may be suppressed.

Further, in a case in which the conveyance member is an endless-form belt, there is no need for a force to urge the belt to a side opposite from a side thereof at which the droplet ejection head is disposed, and there is no need for the structure described in the earlier-mentioned JP-A No. 2002-145474. Thus, occurrences of discharges around the belt may be suppressed, and problems due to electromagnetic waves may be suppressed. Furthermore, because occurrences of sparking around the belt may be prevented, damage to the belt may be suppressed, and a reduction in lifespan of the belt may be suppressed.

With the above-described structure, excessive charging of the conveyance member by the charging unit may be suppressed.

What is claimed is:

1. A droplet ejection device comprising:

a droplet ejection head that ejects droplets;

a conveyance member that retains a recording medium and conveys the recording medium to oppose the droplet ejection head;

a cleaning unit that cleans the conveyance member; and a coating unit that coats coating liquid, with a characteristic of repelling liquid that is ejected from the droplet ejection head, onto the conveyance member, wherein a surface tension $\gamma_o$ of the coating liquid, a critical surface tension $\gamma_b$ of the conveyance member, and a surface tension $\gamma_i$ of the liquid that is ejected from the droplet ejection head satisfy the following equations (1) and (2):

$$\gamma_o<\gamma_b \quad (1)$$

$$\gamma_o<\gamma_i \quad (2).$$

2. The droplet ejection device of claim 1, wherein the liquid that is ejected from the droplet ejection head comprises aqueous ink, and the coating liquid includes a water repellent liquid.

3. The droplet ejection device of claim 1, further comprising a web that absorbs the coating liquid and moves while repeatedly abutting against the conveyance member, wherein the coating unit includes a first abutting portion that abuts against the conveyance member at a movement direction upstream side of the web, and coats the coating liquid onto the conveyance member, and the cleaning unit includes a second abutting portion that abuts against the conveyance member downstream in the movement direction of the web, and scrapes off liquid that has adhered to the conveyance member.

4. The droplet ejection device of claim 1, wherein the cleaning unit and the coating unit are integrally structured.

5. The droplet ejection device of claim 4, wherein the cleaning unit includes a first blade that abuts against the conveyance member, and the coating unit includes a second blade that is disposed in parallel with the first blade, a path along which the coating liquid flows being formed between the first blade and the second blade.

6. The droplet ejection device of claim 4, wherein the cleaning unit includes a first blade that abuts against the conveyance member, and the coating unit includes an absorbent body that is joined to the first blade and absorbs the coating liquid.

7. The droplet ejection device of claim 1, wherein the conveyance member comprises an endless belt, and the droplet ejection device further comprises a driving roller round which the belt is wound, wherein the cleaning unit and the coating unit abut against a portion of the belt that is wound round the driving roller.

8. The droplet ejection device of claim 1, wherein the conveyance member comprises an endless belt, and the droplet ejection device further comprises a driving roller round which the belt is wound, wherein one of the cleaning unit or the coating unit abuts against a portion of the belt that is wound round the driving roller, and a distance L between a position at which the other of the cleaning unit or the coating unit abuts against the belt and the portion of the belt that is wound round the driving roller satisfies the following equation (A):

$$0\leqq L<0.01\times E\times t\times w/\Delta F \quad (A)$$

in which $\Delta F$ is an amount of change of load that the belt receives from the other of the cleaning unit or the coating unit (N), E is a longitudinal modulus of elasticity of the belt ($N/mm^2$), t is a thickness of the belt (mm), and w is a width of the belt (mm).

9. The droplet ejection device of claim 1, wherein at least one of the coating unit and the cleaning unit is mountable and removable at a main body of the device.

10. The droplet ejection device of claim 1, further comprising a charging unit that, without touching the conveyance member, electrostatically adheres the recording medium to the conveyance member by electrostatically charging the conveyance member and the recording medium.

11. The droplet ejection device of claim 10, wherein the charging unit comprises a charging roller that is disposed at an upstream side in the conveyance direction of the recording medium relative to the droplet ejection head, so as to not touch the conveyance member and such that a gap between the conveyance member and the charging roller is less than a thickness of the recording medium.

12. The droplet ejection device of claim 11, further comprising a spacer member that includes a circular peripheral surface which abuts against the conveyance member, the spacer member having a larger diameter than the charging roller, the gap being formed by provision of the spacer member at each of two axial direction end portions of the charging roller.

13. The droplet ejection device of claim 11, further comprising a support unit that supports the charging roller to be separated from the conveyance member, the gap being formed by provision of the support unit.

14. The droplet ejection device of claim 13, wherein the support unit supports the charging roller such that the charging roller is movable toward and away from the conveyance member and that increases and reduces the gap by moving the charging roller toward and away from the conveyance member in accordance with thickness of the recording medium.

15. The droplet ejection device of claim 1, further comprising a charging unit that electrostatically adheres the recording medium to the conveyance member by electrostatically charging at least one of the conveyance member and the recording medium on the conveyance member, wherein the coating liquid is a high-resistance liquid with a higher volume resistivity than the liquid that is ejected from the droplet ejection head.

16. The droplet ejection device of claim 15, wherein the charging unit comprises a charging roller which touches the conveyance member and electrostatically charges the recording medium, and the coating unit includes the charging roller.

17. The droplet ejection device of claim 16, wherein the charging roller is formed with a member capable of absorbing liquid, and is impregnated with the coating liquid.

18. The droplet ejection device of claim 16, further comprising a supply unit that supplies the coating liquid to a surface of the charging roller.

19. The droplet ejection device of claim 15, wherein the volume resistivity of the coating liquid is equivalent to or greater than a volume resistivity of the conveyance member.

20. A droplet ejection device comprising:

a droplet ejection head that ejects droplets;

a conveyance member that retains a recording medium and conveys the recording medium to oppose the droplet ejection head; and a charging unit that electrostatically adheres the recording medium to the conveyance member by electrostatically charging at least one of the conveyance member and the recording medium on the conveyance member, wherein a high-resistance liquid is interposed between the charging unit and the conveyance member, a volume resistivity of the high-resistance liquid being higher than liquid that is ejected from the droplet ejection head and equivalent to or greater than a volume resistivity of the conveyance member.

21. The droplet ejection device of claim 20, further comprising a coating unit that coats the high-resistance liquid onto the conveyance member.

22. The droplet ejection device of claim 21, further comprising a cleaning unit that cleans the conveyance member.

23. The droplet ejection device of claim 20, wherein the charging unit comprises a charging roller that touches the conveyance member, electrostatically charges the recording medium, and applies the high-resistance liquid to the conveyance member.

24. The droplet ejection device of claim 23, wherein the charging roller is formed with a member capable of absorbing liquid, and is impregnated with the high-resistance liquid.

25. The droplet ejection device of claim 23, further comprising a supply unit that supplies the high-resistance liquid to a surface of the charging roller.

26. The droplet ejection device of claim 20, wherein the high-resistance liquid is insoluble with respect to the liquid that is ejected from the droplet ejection head.

27. The droplet ejection device of claim 20, wherein the high-resistance liquid includes a characteristic of repelling the liquid that is ejected from the droplet ejection head.

28. The droplet ejection device of claim 20, wherein a surface tension $\gamma_o$ of the high-resistance liquid, a critical surface tension $\gamma_b$ of the conveyance member, and a surface tension $\gamma_i$ of the liquid that is ejected from the droplet ejection head satisfy the following equations (1) and (2):

$$\gamma_o<\gamma_b \quad (1)$$

$$\gamma_o<\gamma_i \quad (2).$$

29. The droplet ejection device of claim 20, wherein the liquid that is ejected from the droplet ejection head comprises aqueous ink, and the high-resistance liquid includes a characteristic of repelling the aqueous ink.

* * * * *